United States Patent
Hamberg et al.

(10) Patent No.: US 7,886,377 B2
(45) Date of Patent: *Feb. 15, 2011

(54) PUSH HANDLE WITH ROTATABLE USER INTERFACE

(75) Inventors: Stephen R. Hamberg, Cincinnati, OH (US); Robert M. Zerhusen, Cincinnati, OH (US); Christian H. Reinke, York, SC (US)

(73) Assignee: Hill-Rom Services, Inc., Wilmington, DE (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/021,346

(22) Filed: Jan. 29, 2008

(65) Prior Publication Data

US 2008/0141459 A1    Jun. 19, 2008

Related U.S. Application Data

(63) Continuation-in-part of application No. 11/865,763, filed on Oct. 2, 2007.

(60) Provisional application No. 60/851,655, filed on Oct. 13, 2006, provisional application No. 60/973,805, filed on Sep. 20, 2007.

(51) Int. Cl.
    *A61G 7/08* (2006.01)
(52) U.S. Cl. ............................. 5/86.1; 5/81.1 R; 5/600
(58) Field of Classification Search ............... 5/81.1 R, 5/86.1, 600, 611; 180/19.3, 65.1; 280/47.11, 280/47.371
    See application file for complete search history.

(56) References Cited

U.S. PATENT DOCUMENTS

| | | | |
|---|---|---|---|
| 813,213 A | 2/1906 | Johnson | |
| 1,110,838 A | 9/1914 | Taylor | |
| 1,118,931 A | 12/1914 | Hasley | |
| 1,598,124 A | 8/1926 | Evans | |
| 1,639,801 A | 8/1927 | Heise | |
| 1,778,698 A | 10/1930 | Walter | |
| 2,224,087 A | 12/1940 | Reichert | |
| 2,599,717 A | 6/1952 | Menzies | |
| 2,635,899 A | 4/1953 | Osbon, Jr. | |

(Continued)

FOREIGN PATENT DOCUMENTS

CA    2010543    9/1990

(Continued)

OTHER PUBLICATIONS

Stryker Medical, 2040 Zoom® Critical Care Bed Maintenance Manual, date unknown.

(Continued)

*Primary Examiner*—Fredrick Conley
(74) *Attorney, Agent, or Firm*—Barnes & Thornburg LLP

(57) ABSTRACT

A patient support apparatus includes a frame, a patient support coupled to the frame, a push handle coupled to the frame and having a handle post, and a user interface coupled to the handle post and having at least one user input. The user interface is rotatable about an axis defined by the handle post between a first position presenting the at least one user input to a caregiver standing at an end of the frame and a second position presenting the at least one user input to a caregiver standing alongside the frame.

26 Claims, 32 Drawing Sheets

U.S. PATENT DOCUMENTS

| | | |
|---|---|---|
| 2,999,555 A | 9/1961 | Stroud et al. |
| 3,004,768 A | 10/1961 | Klages |
| 3,112,001 A | 11/1963 | Wise |
| 3,304,116 A | 2/1967 | Stryker |
| 3,305,876 A | 2/1967 | Hutt |
| 3,380,546 A | 4/1968 | Rabjohn |
| 3,393,004 A | 7/1968 | Williams |
| 3,404,746 A | 10/1968 | Slay |
| 3,452,371 A | 7/1969 | Hirsch |
| 3,544,127 A | 12/1970 | Dobson |
| 3,618,966 A | 11/1971 | Vandervest |
| 3,680,880 A | 8/1972 | Blaauw |
| 3,770,070 A | 11/1973 | Smith |
| 3,802,524 A | 4/1974 | Seidel |
| 3,814,199 A | 6/1974 | Jones |
| 3,820,838 A | 6/1974 | Limpach |
| 3,869,011 A | 3/1975 | Jensen |
| 3,872,945 A | 3/1975 | Hickman et al. |
| 3,876,024 A | 4/1975 | Shieman et al. |
| 3,938,608 A | 2/1976 | Folco-Zambelli |
| 4,137,984 A | 2/1979 | Jennings et al. |
| 4,164,355 A | 8/1979 | Eaton et al. |
| 4,167,221 A | 9/1979 | Edmonson et al. |
| 4,175,632 A | 11/1979 | Lassanske |
| 4,175,783 A | 11/1979 | Pioth |
| 4,221,273 A | 9/1980 | Finden |
| 4,274,503 A | 6/1981 | Mackintosh |
| 4,275,797 A | 6/1981 | Johnson |
| 4,415,049 A | 11/1983 | Wereb |
| 4,415,050 A | 11/1983 | Nishida et al. |
| 4,439,879 A | 4/1984 | Werner |
| 4,444,284 A | 4/1984 | Montemurro |
| 4,475,611 A | 10/1984 | Fisher |
| 4,475,613 A | 10/1984 | Walker |
| 4,511,825 A | 4/1985 | Klimo |
| 4,513,832 A | 4/1985 | Engman |
| 4,566,707 A | 1/1986 | Nitzberg |
| 4,584,989 A | 4/1986 | Stith |
| 4,614,246 A | 9/1986 | Masse et al. |
| 4,629,242 A | 12/1986 | Schrager |
| 4,646,860 A | 3/1987 | Owens et al. |
| 4,723,808 A | 2/1988 | Hines |
| 4,724,555 A | 2/1988 | Poehner et al. |
| 4,759,418 A | 7/1988 | Goldenfeld et al. |
| 4,771,840 A | 9/1988 | Keller |
| 4,807,716 A | 2/1989 | Hawkins |
| 4,811,988 A | 3/1989 | Immel |
| 4,848,504 A | 7/1989 | Olson |
| 4,874,055 A | 10/1989 | Beer |
| 4,895,040 A | 1/1990 | Soederberg |
| 4,922,574 A | 5/1990 | Heiligenthal et al. |
| 4,938,493 A | 7/1990 | Okuda |
| 4,949,408 A | 8/1990 | Trkla |
| 4,979,582 A | 12/1990 | Forster |
| 4,981,309 A | 1/1991 | Froeschle et al. |
| 5,060,327 A | 10/1991 | Celestina et al. |
| 5,060,959 A | 10/1991 | Davis et al. |
| 5,069,465 A | 12/1991 | Stryker et al. |
| 5,083,625 A | 1/1992 | Bleicher |
| 5,084,922 A | 2/1992 | Louit |
| 5,094,314 A | 3/1992 | Hayata |
| 5,117,521 A | 6/1992 | Foster et al. |
| 5,121,806 A | 6/1992 | Johnson |
| 5,156,226 A | 10/1992 | Boyer et al. |
| 5,181,762 A | 1/1993 | Beumer |
| 5,187,824 A | 2/1993 | Stryker |
| 5,193,633 A | 3/1993 | Ezenwa |
| 5,201,819 A | 4/1993 | Shiraishi et al. |
| 5,222,567 A | 6/1993 | Broadhead et al. |
| 5,232,065 A | 8/1993 | Cotton |
| 5,244,225 A | 9/1993 | Frycek |
| 5,251,429 A | 10/1993 | Minato et al. |
| 5,255,403 A | 10/1993 | Ortiz |
| 5,279,010 A | 1/1994 | Ferrand et al. |
| 5,284,218 A | 2/1994 | Rusher, Jr. |
| 5,293,950 A | 3/1994 | Marliac |
| 5,307,889 A | 5/1994 | Bohannan |
| 5,322,306 A | 6/1994 | Coleman |
| 5,337,845 A | 8/1994 | Foster et al. |
| 5,348,326 A | 9/1994 | Fullenkamp et al. |
| 5,358,265 A | 10/1994 | Yaple |
| 5,366,036 A | 11/1994 | Perry |
| 5,381,572 A | 1/1995 | Park |
| 5,388,294 A | 2/1995 | Reeder |
| 5,406,778 A | 4/1995 | Lamb et al. |
| 5,439,069 A | 8/1995 | Beeler |
| 5,445,233 A | 8/1995 | Fernie et al. |
| 5,447,317 A | 9/1995 | Gehlsen et al. |
| 5,447,935 A | 9/1995 | Hubele et al. |
| 5,450,639 A | 9/1995 | Weismiller et al. |
| 5,477,935 A | 12/1995 | Chen |
| 5,495,904 A | 3/1996 | Zwaan et al. |
| 5,526,890 A | 6/1996 | Kadowaki |
| 5,531,030 A | 7/1996 | Dale, Jr. |
| 5,535,465 A | 7/1996 | Hannant |
| 5,542,690 A | 8/1996 | Kozicki |
| 5,562,091 A | 10/1996 | Foster et al. |
| 5,570,483 A | 11/1996 | Williamson |
| 5,580,207 A | 12/1996 | Kiebooms et al. |
| 5,613,252 A | 3/1997 | Yu et al. |
| 5,669,086 A | 9/1997 | Garman |
| 5,687,437 A | 11/1997 | Goldsmith |
| 5,690,185 A | 11/1997 | Sengel |
| 5,697,623 A | 12/1997 | Bermes et al. |
| 5,711,521 A * | 1/1998 | Reist .......................... 271/225 |
| 5,737,782 A | 4/1998 | Matsuura et al. |
| 5,749,424 A | 5/1998 | Reimers |
| 5,775,456 A | 7/1998 | Reppas |
| 5,778,996 A | 7/1998 | Prior et al. |
| 5,806,111 A | 9/1998 | Heimbrock et al. |
| 5,809,755 A | 9/1998 | Velke et al. |
| 5,826,670 A | 10/1998 | Nan |
| 5,839,528 A | 11/1998 | Lee |
| 5,906,017 A | 5/1999 | Ferrand et al. |
| 5,915,487 A | 6/1999 | Splittstoesser et al. |
| 5,921,338 A | 7/1999 | Edmondson |
| 5,927,414 A | 7/1999 | Kan et al. |
| 5,934,694 A | 8/1999 | Schugt et al. |
| 5,937,959 A | 8/1999 | Fujii et al. |
| 5,937,961 A | 8/1999 | Davidson |
| 5,944,131 A | 8/1999 | Schaffner et al. |
| 5,964,313 A | 10/1999 | Guy |
| 5,964,473 A | 10/1999 | Degonda et al. |
| 5,971,091 A | 10/1999 | Kamen et al. |
| 5,983,425 A | 11/1999 | DiMucci et al. |
| 5,987,671 A | 11/1999 | Heimbrock et al. |
| 5,988,304 A | 11/1999 | Behrendts |
| 5,996,149 A | 12/1999 | Heimbrock et al. |
| 6,000,486 A | 12/1999 | Romick et al. |
| 6,016,580 A | 1/2000 | Heimbrock et al. |
| 6,035,561 A | 3/2000 | Paytas et al. |
| 6,050,356 A | 4/2000 | Takeda et al. |
| 6,059,060 A | 5/2000 | Kanno et al. |
| 6,059,301 A | 5/2000 | Skarnulis |
| 6,062,328 A | 5/2000 | Campbell et al. |
| 6,065,555 A | 5/2000 | Yuki et al. |
| 6,070,679 A | 6/2000 | Berg et al. |
| 6,073,285 A | 6/2000 | Ambach et al. |
| 6,076,208 A | 6/2000 | Heimbrock et al. |
| 6,076,209 A | 6/2000 | Paul |
| 6,098,732 A | 8/2000 | Romick et al. |
| 6,105,348 A | 8/2000 | Turk et al. |
| 6,125,957 A | 10/2000 | Kauffmann |
| 6,131,690 A | 10/2000 | Galando et al. |

| | | | |
|---|---|---|---|
| 6,148,942 A | 11/2000 | Mackert, Sr. | |
| 6,154,690 A | 11/2000 | Coleman | |
| 6,173,799 B1 | 1/2001 | Miyazaki et al. | |
| 6,178,575 B1 | 1/2001 | Harada | |
| 6,179,074 B1 | 1/2001 | Scharf | |
| 6,209,670 B1 | 4/2001 | Fernie et al. | |
| 6,256,812 B1 | 7/2001 | Bartow et al. | |
| 6,286,165 B1 | 9/2001 | Heimbrock et al. | |
| 6,330,926 B1 | 12/2001 | Heimbrock et al. | |
| 6,343,665 B1 | 2/2002 | Eberlein et al. | |
| 6,390,213 B1 | 5/2002 | Bleicher | |
| 6,474,434 B1 | 11/2002 | Bech | |
| 6,505,359 B2 | 1/2003 | Heimbrock et al. | |
| 6,668,402 B2 | 12/2003 | Heimbrock | |
| 6,668,965 B2 | 12/2003 | Strong | |
| 6,725,956 B1 | 4/2004 | Lemire | |
| 6,749,034 B2 | 6/2004 | Vogel et al. | |
| 6,752,224 B2 | 6/2004 | Hopper et al. | |
| 6,772,850 B1 | 8/2004 | Waters et al. | |
| 6,877,572 B2 | 4/2005 | Vogel et al. | |
| 6,945,697 B2 | 9/2005 | Schuster | |
| 7,011,172 B2 | 3/2006 | Heimbrock et al. | |
| 7,014,000 B2 | 3/2006 | Kummer et al. | |
| 7,083,012 B2 | 8/2006 | Vogel et al. | |
| 7,090,041 B2 | 8/2006 | Vogel et al. | |
| 7,195,253 B2 | 3/2007 | Vogel et al. | |
| 7,273,115 B2 | 9/2007 | Kummer et al. | |
| 7,284,626 B2 | 10/2007 | Heimbrock et al. | |
| 7,419,019 B1 * | 9/2008 | White et al. | 180/19.3 |
| 7,594,284 B2 * | 9/2009 | Schuchardt | 5/86.1 |
| 2002/0138905 A1 | 10/2002 | Bartlett et al. | |
| 2002/0152555 A1 | 10/2002 | Gallant et al. | |
| 2003/0102172 A1 | 6/2003 | Kummer et al. | |
| 2004/0133982 A1 | 7/2004 | Horitani et al. | |
| 2005/0199430 A1 | 9/2005 | Vogel et al. | |
| 2006/0059623 A1 | 3/2006 | Karmer, Jr. et al. | |
| 2008/0263769 A1 * | 10/2008 | Newkirk et al. | 5/503.1 |

FOREIGN PATENT DOCUMENTS

| | | |
|---|---|---|
| CA | 2294761 | 1/1999 |
| CA | 2589811 | 6/2006 |
| DE | 1 041 210 | 10/1958 |
| DE | 94 20 429 | 12/1994 |
| DE | 295 18 502 U1 | 1/1997 |
| DE | 199 21 503 | 4/2000 |
| EP | 0 062 180 A2 | 10/1982 |
| EP | 0 093 700 A2 | 11/1983 |
| EP | 0 204 637 A1 | 12/1986 |
| EP | 0 329 504 B1 | 8/1989 |
| EP | 0 352 647 B1 | 1/1990 |
| EP | 0 403 202 B1 | 12/1990 |
| EP | 0 420 263 A1 | 4/1991 |
| EP | 0 630 637 A1 | 12/1994 |
| EP | 0 653 341 A1 | 5/1995 |
| EP | 0 776 637 A1 | 6/1997 |
| EP | 0 776 648 A1 | 6/1997 |
| EP | 991529 B1 | 4/2000 |
| EP | 1 911 429 A2 | 4/2008 |
| FR | 2 714 008 | 6/1995 |
| FR | 2 735 019 | 12/1996 |
| FR | 2 746 060 | 9/1997 |
| GB | 415450 | 8/1934 |
| GB | 672557 | 5/1952 |
| GB | 1 601 930 | 11/1981 |
| GB | 2 285 393 A | 7/1995 |
| JP | 46-31490 | 9/1971 |
| JP | 47-814 | 8/1972 |
| JP | 47-17495 | 10/1972 |
| JP | 47-44792 | 6/1973 |
| JP | 48-44792 | 6/1973 |
| JP | 48-44793 | 6/1973 |
| JP | 48-54494 | 7/1973 |
| JP | 48-54495 | 7/1973 |
| JP | 49-29855 | 3/1974 |
| JP | 51-20491 | 2/1976 |
| JP | 53-9091 | 1/1978 |
| JP | 53-96397 | 8/1978 |
| JP | 56-68523 | 6/1981 |
| JP | 56-68524 | 6/1981 |
| JP | 56-73822 | 6/1981 |
| JP | 57-157325 | 10/1982 |
| JP | 57-187521 | 11/1982 |
| JP | 58 06357 | 4/1983 |
| JP | 59-37946 | 3/1984 |
| JP | 59-38176 | 3/1984 |
| JP | 59-183756 | 10/1984 |
| JP | 59-186554 | 10/1984 |
| JP | 60-12058 | 1/1985 |
| JP | 60-12059 | 1/1985 |
| JP | 60-21751 | 2/1985 |
| JP | 60-31749 | 2/1985 |
| JP | 60-31750 | 2/1985 |
| JP | 60-31751 | 2/1985 |
| JP | 60-122561 | 7/1985 |
| JP | 60-188152 | 9/1985 |
| JP | 60-188153 | 9/1985 |
| JP | 61 88727 | 8/1986 |
| JP | 61-188727 | 11/1986 |
| JP | 62-60433 | 4/1987 |
| JP | 64-17231 | 1/1989 |
| JP | 2-84961 | 3/1990 |
| JP | 3-31063 | 2/1991 |
| JP | 4-108525 | 9/1992 |
| JP | 6-50631 | 7/1994 |
| JP | 6-237959 | 8/1994 |
| JP | 7-136215 | 5/1995 |
| JP | 7 328074 | 12/1995 |
| JP | 8-112244 | 5/1996 |
| JP | 8-317953 | 12/1996 |
| JP | 9-24071 | 1/1997 |
| JP | 9-38154 | 2/1997 |
| JP | 9-38155 | 2/1997 |
| JP | 10-146364 | 6/1998 |
| JP | 10-181609 | 7/1998 |
| JP | 10-305705 | 11/1998 |
| JP | 200-118407 | 4/2000 |
| JP | 2000-107230 | 4/2000 |
| JP | 2000-175974 | 6/2000 |
| WO | WO 82-01313 | 4/1982 |
| WO | WO 87/07830 | 12/1987 |
| WO | WO 94/16935 | 8/1994 |
| WO | WO 94/21505 | 9/1994 |
| WO | WO 95/20514 | 8/1995 |
| WO | WO 96/07555 | 3/1996 |
| WO | WO 96/33900 | 10/1996 |
| WO | WO 97/39715 | 10/1997 |
| WO | WO 99/01298 | 1/1999 |
| WO | WO 00/37222 | 6/2000 |
| WO | WO 00/51830 | 8/2000 |
| WO | WO 01/19313 | 3/2001 |
| WO | WO 01/85084 | 11/2001 |
| WO | 2004112675 | 12/2004 |
| WO | WO 2005/028243 | 3/2005 |
| WO | WO 2005/068276 A1 | 7/2005 |
| WO | WO 2006/059200 A2 | 6/2006 |
| WO | 2007/121376 A2 | 10/2007 |

OTHER PUBLICATIONS

Motorvator 3 Product Features Webpage, May 10, 2000.
Stryker Corporation Zoom® drive brochure, Mar. 2000.
Midmark 530 Stretcher Information, Midmark Catalog, p. 14.
Tri-Flex II by Burke, Inc., "Operation Manual Impulse Drive System," (2004).

European Search Report dated Sep. 26, 2008, on European Application EP07254040.

European search report dated Mar. 19, 2010 from EP 09 25 0210.

* cited by examiner

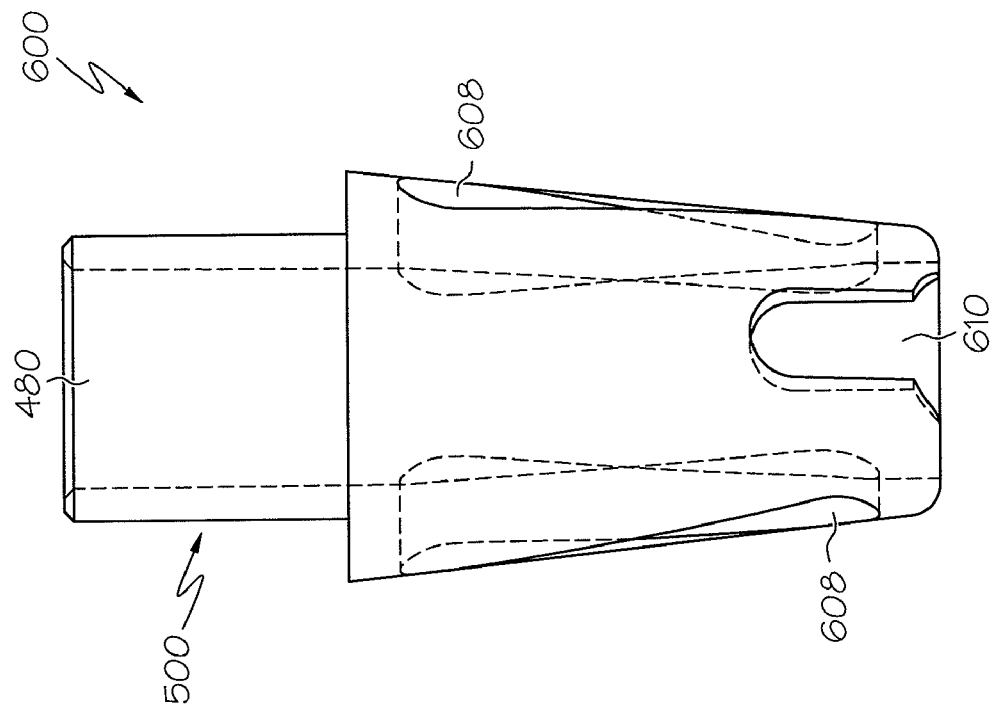
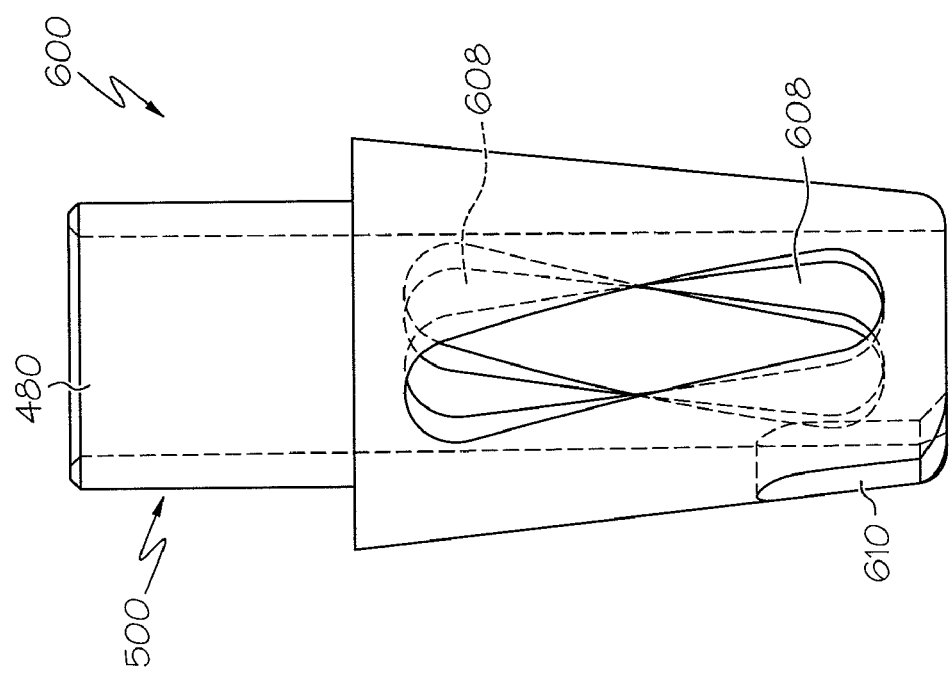

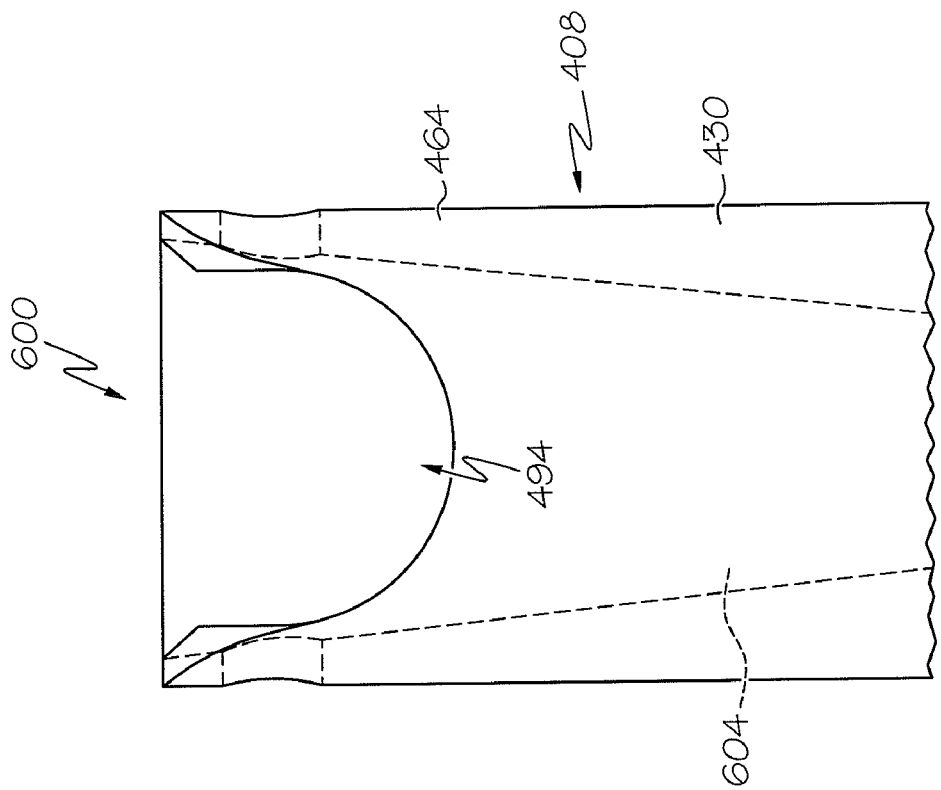
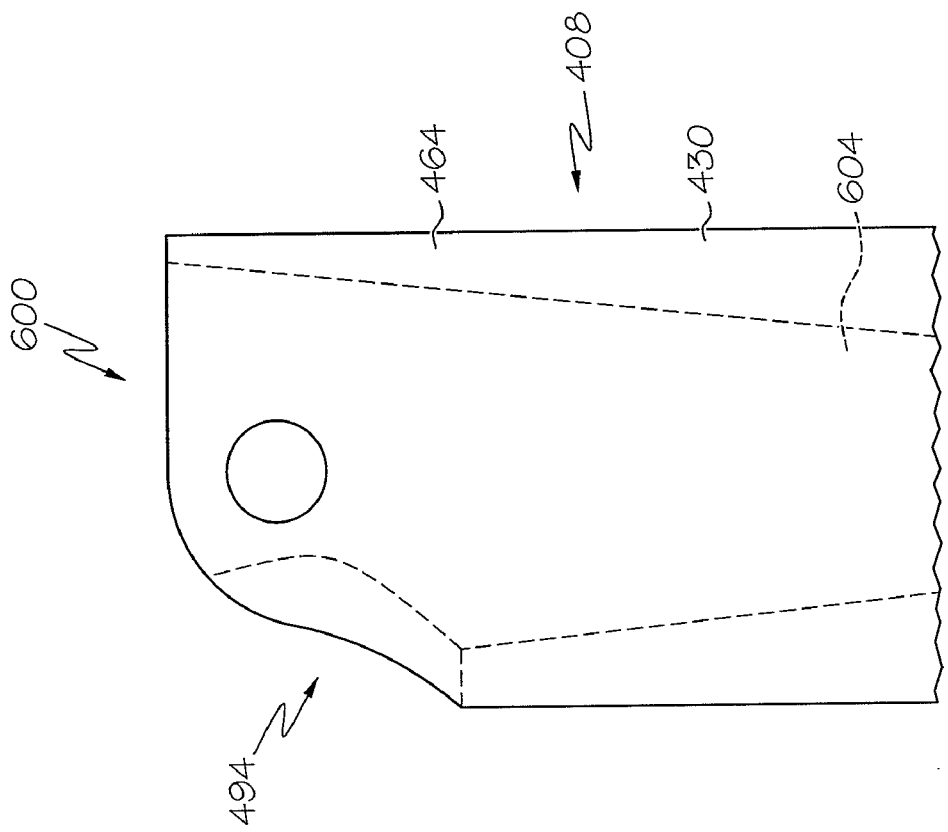
FIG. 25
FIG. 24

PUSH HANDLE WITH ROTATABLE USER INTERFACE

CROSS REFERENCE TO RELATED APPLICATIONS

This application is a continuation-in-part of U.S. patent application Ser. No. 11/865,763, filed Oct. 2, 2007, which claims the benefit of a U.S. Provisional Patent Application No. 60/851,655, filed Oct. 13, 2006, and a U.S. Provisional Patent Application No. 60/973,805, filed on Sep. 20, 2007, all of which are hereby expressly incorporated by reference herein.

BACKGROUND

The present disclosure relates to patient support apparatuses, such as hospital beds or stretchers, and particularly to patient support apparatuses having powered transport devices such as motorized wheels or motorized traction drives to propel the patient support apparatus along a floor. More particularly, the present disclosure relates to user interfaces and control systems for such transport devices.

Some patient support apparatuses, such as hospital beds or stretchers, have powered transport devices that propel the patient support apparatus along a floor. See, for example, U.S. Pat. Nos. 7,090,041; 7,083,012; 7,021,407; 7,011,172; 7,007,765; 6,902,019; 6,877,572; 6,772,850; 6,752,224; 6,749,034; 6,725,956; 6,588,523; 6,390,213; 6,330,926; and 5,083,625. It is common for such devices to have controllers that are programmed to sense a plurality of conditions before a motor will be activated to propel the patient support apparatus along a floor. For example, such devices usually sense whether or not casters are braked, whether or not an enable switch or other safety switch is engaged by a user, whether or not a battery has sufficient power to activate the motor, and whether or not an AC power plug of the patient support apparatus is plugged into an electrical outlet. If the caster brakes are set, if the enable switch is not engaged, if the battery power is too low, or if the AC power plug is plugged in, the powered transport devices will typically be disabled from propelling the associated patient support apparatus.

Most of the known prior art transport devices of hospital beds and stretchers are configured to propel the bed only in forward and reverse directions. Such prior art transport devices usually include some type of electrical input device, such as a potentiometer or a load cell with a strain gage output, for providing a signal that controls the speed at which the bed or stretcher is propelled. These electrical input devices are generally infinitely adjustable between upper and lower limits to provide for an infinite number of speed settings between upper and lower limits. However, these electrical input devices are relatively expensive and it can sometimes be difficult for users to apply a consistent force to a load cell, through a handle or other structure, especially when there is a tendency for the bed or stretcher to drive away from the user after application of the initial driving force by the user, or to keep a potentiometer rotated to a consistent position given the fact that such devices are usually biased toward a neutral position in which the powered transport device is not activated. Thus, in such patient support apparatuses, the powered transport may feel "jerky" to the users and to any patients on the patient support apparatuses.

It has also been proposed to have a powered transport device that will allow the wheel or traction drive to be re-oriented relative to the patient support apparatus to allow for side-to-side or lateral transport in addition to forward and reverse transport. See, for example, PCT Publication No. WO 2006/059200 A2. Having traction drives that can propel a patient support apparatus forwardly, rearwardly, and side-to-side introduces additional complexities that need to be dealt with in connection with user interfaces and control algorithms of such transport devices.

SUMMARY

The present invention comprises a patient support apparatus having one or more of the features recited in the appended claims and/or one or more of the following features, which alone or in any combination may comprise patentable subject matter:

The patient support apparatus may have a frame. A patient support, such as a single section or multi-section mattress support deck, may be coupled to the frame and may support a mattress. A plurality of casters and a wheel may also be coupled to the frame. A motor may be coupled to the wheel and may be operable to rotate the wheel to propel the patient support apparatus along a floor. The patient support apparatus also may have an electrical system comprising a battery, recharging circuitry for the battery, an AC power plug that is pluggable into a power outlet to provide electrical power for recharging the battery, and a controller to control operation of the motor. The controller may be configured to signal operation of the motor to rotate the wheel to propel the patient support apparatus along the floor even when the AC power plug is plugged into a power outlet.

The patient support apparatus may be provided with a wheel support assembly that couples the wheel to the frame. The wheel support assembly may be operable to raise the wheel off of the floor and to lower the wheel into contact with the floor. Additionally or alternatively, the wheel support assembly may be operable to move the wheel between a first orientation in which the motor is operable to propel the patient support apparatus substantially parallel with a longitudinal dimension of the frame and a second orientation in which the motor is operable to propel the patient support apparatus substantially parallel with a lateral dimension of the frame.

The electrical system may have a first user input engageable to selectively toggle among a plurality of discrete speed settings at which the motor is operable. The plurality of discrete speed settings may comprise three speed settings, such as a slow speed setting, a medium speed setting, and a fast speed setting. The plurality of discrete speed settings may comprise less than three or more than three speed settings. At least one of the slow speed setting, the medium speed setting, and the fast speed setting may be faster in the forward direction than the corresponding speed setting is in the reverse direction. Each of the plurality of discrete speed settings may correspond to a threshold speed up to which the motor is accelerated to reach over time. The acceleration profile may be of any geometry, such as a linear ramp, discrete steps, curved, or combinations thereof.

The electrical system may have two other user inputs that are engaged simultaneously to signal the controller to operate the motor at the discrete speed setting selected by the first user input. Before the controller actually operates the motor, the controller may determine via received signals that the casters are unbraked and that the battery is sufficiently charged. The patient support apparatus may have a push handle which is grippable by a user to maneuver the patient support apparatus along the floor. The two other user inputs that are engaged simultaneously to signal the controller to operate the motor may be coupled to the push handle. The first user input for selecting the discrete speed setting may also be coupled to the push handle. One or more of the user inputs may comprises switches such as membrane switches, rocker switches, push buttons, toggle switches, or any other type of switch, including multi-position switches.

Additionally or alternatively, the electrical system may comprise further user inputs adjacent to one or both sides of the frame to signal the controller to operate the motor to propel the patient support apparatus laterally when the wheel is in the appropriate orientation for lateral or side-to-side powered transport. These further user inputs may be coupled to siderails which are mounted to the frame. These further user inputs may also be used to propel the patient support apparatus in forward and/or reverse directions. The user inputs coupled to the push handles, typically located at the head end of the frame, may also be usable to propel the patient support apparatus in left and right lateral directions and in forward and reverse longitudinal directions. Additionally or alternatively, the electrical system may comprise another set of user inputs located at the foot end of the frame, such as on a foot end frame member. The user inputs at the foot end of the frame also may be used to propel the patient support apparatus in left and right lateral directions and in forward and reverse longitudinal directions.

One or more of the user inputs located at the ends and/or sides of the patient support apparatus may further comprise at least one additional switch that is engaged to signal the controller to move the wheel between the first orientation and the second orientation. One or more of the user inputs located at the ends and/or sides of the patient support apparatus may have a forward switch, a reverse switch, a left switch and a right switch that, when engaged simultaneously with a respective additional switch (sometimes referred to by those skilled in the art as a "deadman switch"), signal the controller to operate the motor to propel the patient support apparatus in the forward, reverse, left, and right directions, respectively.

A patient support apparatus may comprise a frame, a patient support coupled to the frame, a push handle coupled to the frame and having a handle post, and a user interface coupled to the handle post and having at least one user input. The user interface may be rotatable about an axis defined by the handle post between a first position presenting the at least one user input to a caregiver standing at an end of the frame and a second position presenting the at least one user input to a caregiver standing alongside the frame.

The patient support apparatus may further comprise a power transport system coupled to the frame and operable to propel the patient support apparatus along a floor. The at least user interface may be engageable to provide a signal to the power transport system to propel the patient support apparatus along the floor.

Additional features, which alone or in combination with any other feature(s), such as those listed above, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

FIG. 22 is a front elevation view of the tapered sleeve showing the helical slots in the opposite sidewalls of the tapered sleeve, the helical slot in the back wall being shown in phantom;

FIG. 23 is an end elevation view of the tapered sleeve showing a pair of cutouts or reliefs in the opposite sidewalls of the tapered sleeve for allowing the wires from the push handle enable switch and the wires from the push handle user interface to pass through when the push handle is folded down;

FIG. 24 is a front elevation view of the upper portion of the strain gage assembly showing the tapered socket in phantom;

FIG. 25 is an end elevation view of the upper portion of the strain gage assembly showing a cutout or relief formed in the upper portion of the strain gage assembly to allow the push handle to pivot downwardly to the folded stowed position;

DETAILED DESCRIPTION OF THE DRAWINGS

Figure 1:
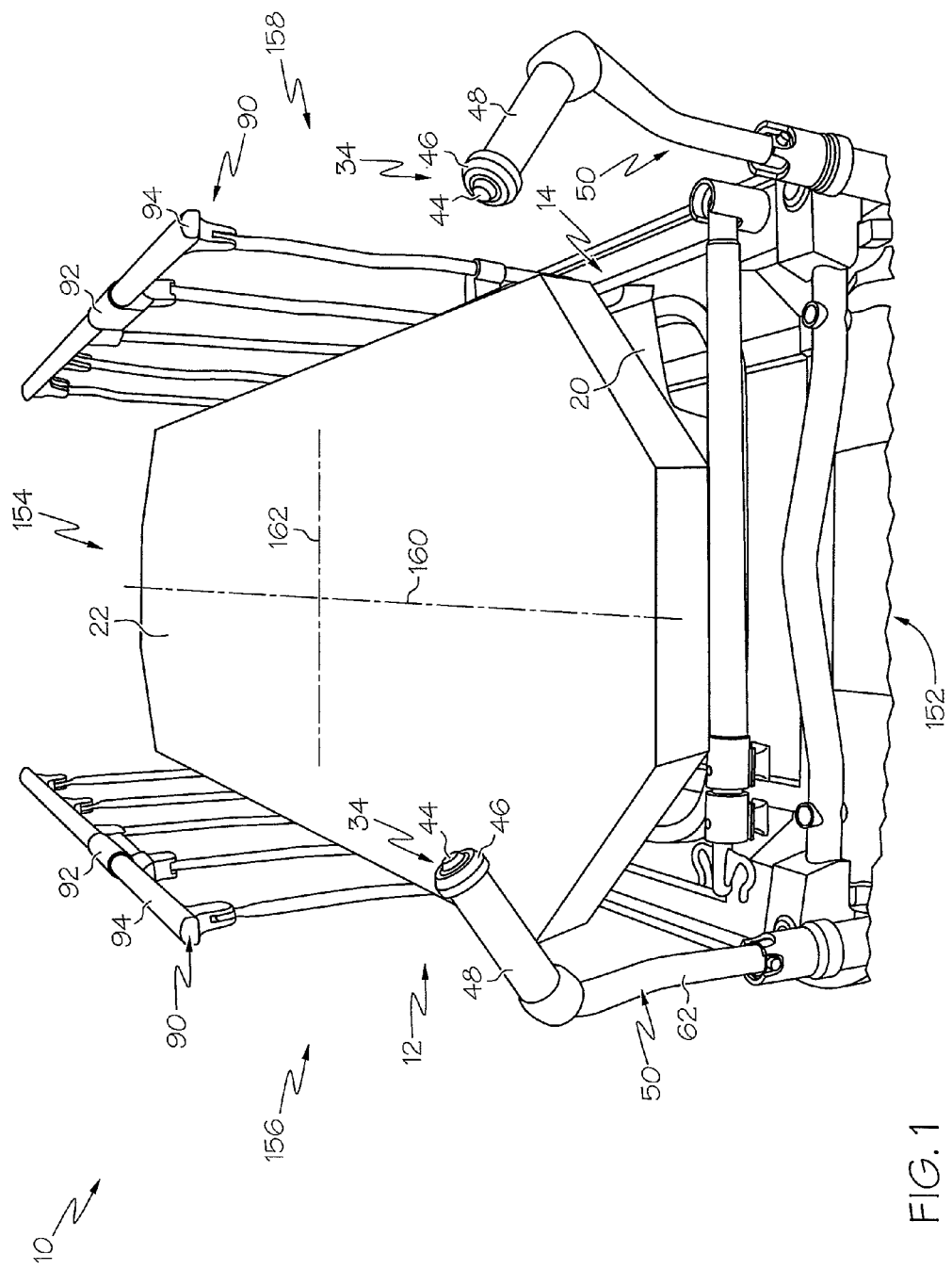
FIG. 1 is a front perspective view of a patient support apparatus showing a pair of push handles coupled to a head end of a frame, the frame supporting a mattress and mattress support deck underlying the mattress, a pair of siderails along the sides of the frame moved to raised positions, and push buttons of an electrical system of the patient support apparatus coupled to distal ends of the push handles.
Figure 2:
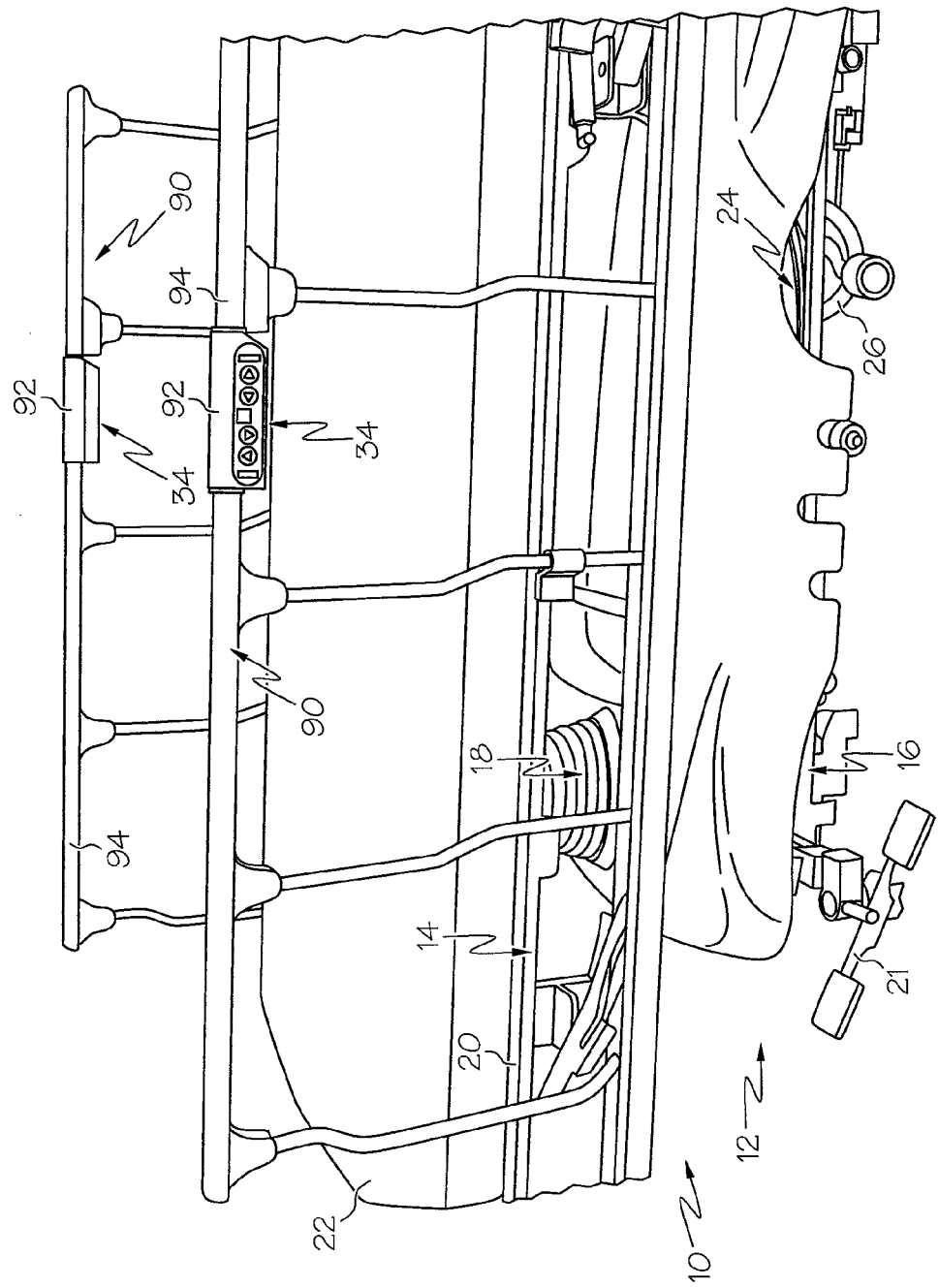
FIG. 2 is a side perspective view of the patient support apparatus of FIG. 1 showing a motorized drive wheel of a powered transport device situated beneath a shroud which covers a base frame portion of the frame and showing a user interface coupled to one of the siderails.
Figure 4:
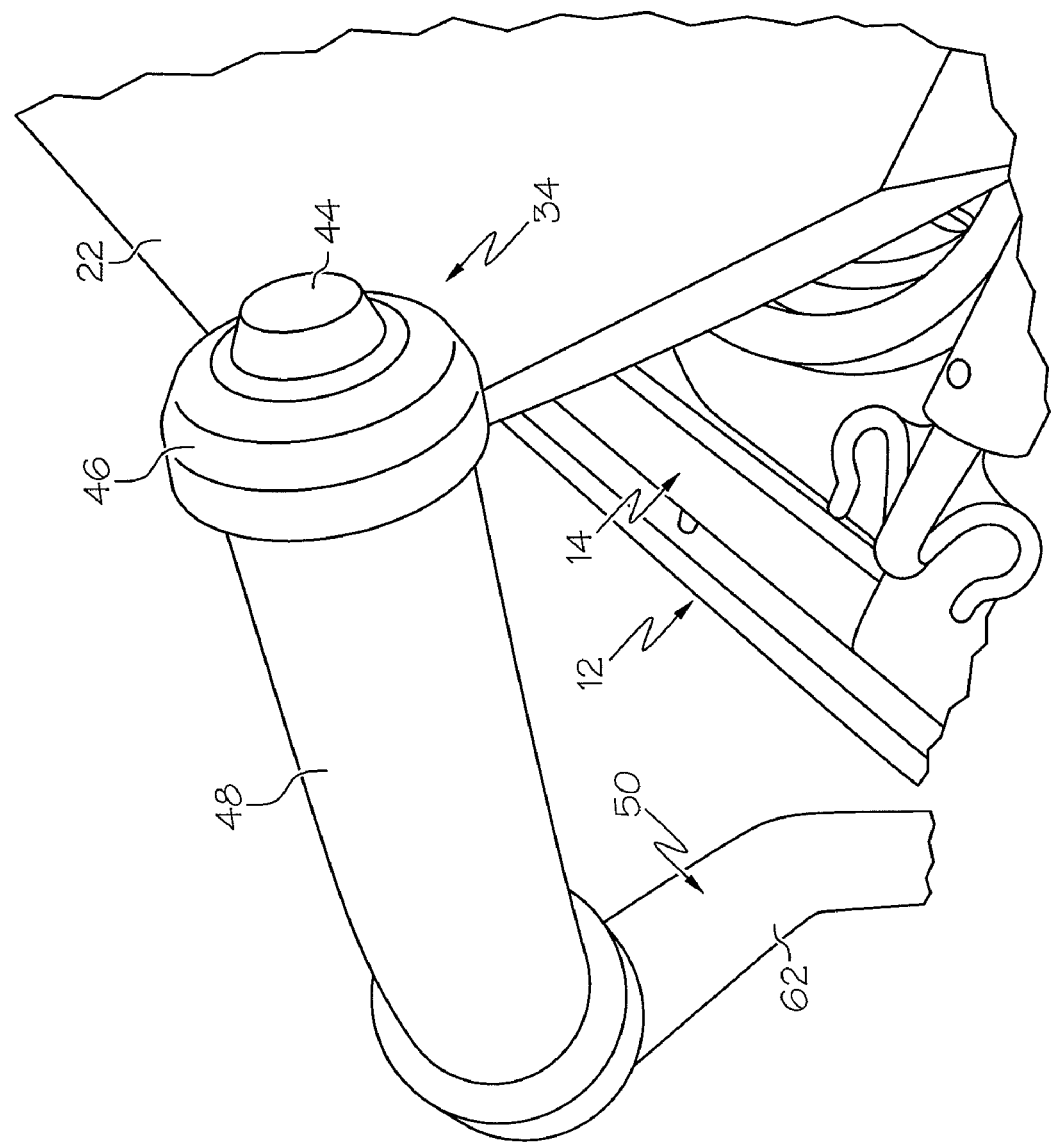
FIG. 4 is an enlarged perspective view of a grip handle area of one of the push handles.
Figure 9:
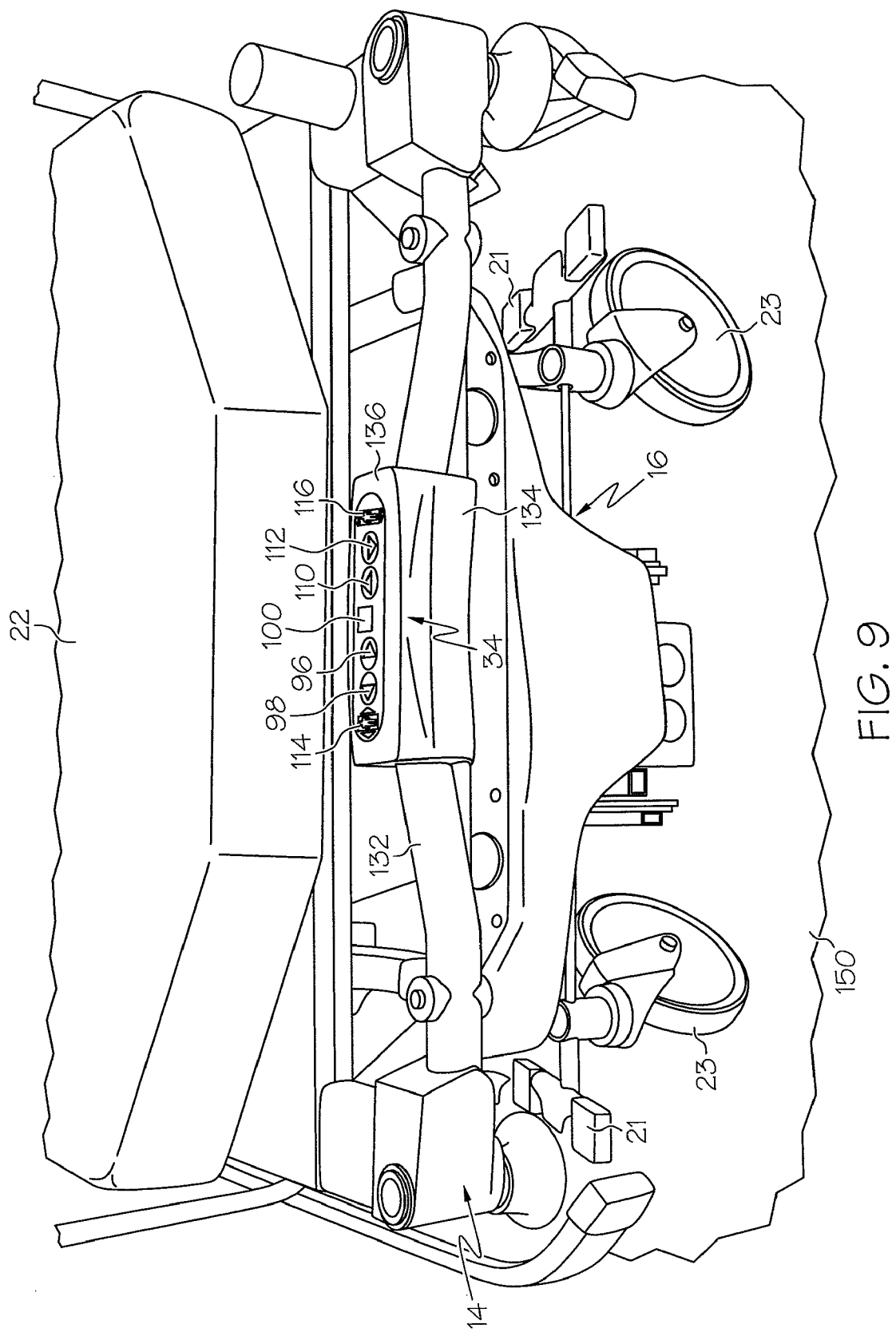
FIG. 9 is an end perspective view of the patient support apparatus showing an additional user interface coupled to a frame member at a foot end of the frame.
Figure 32:
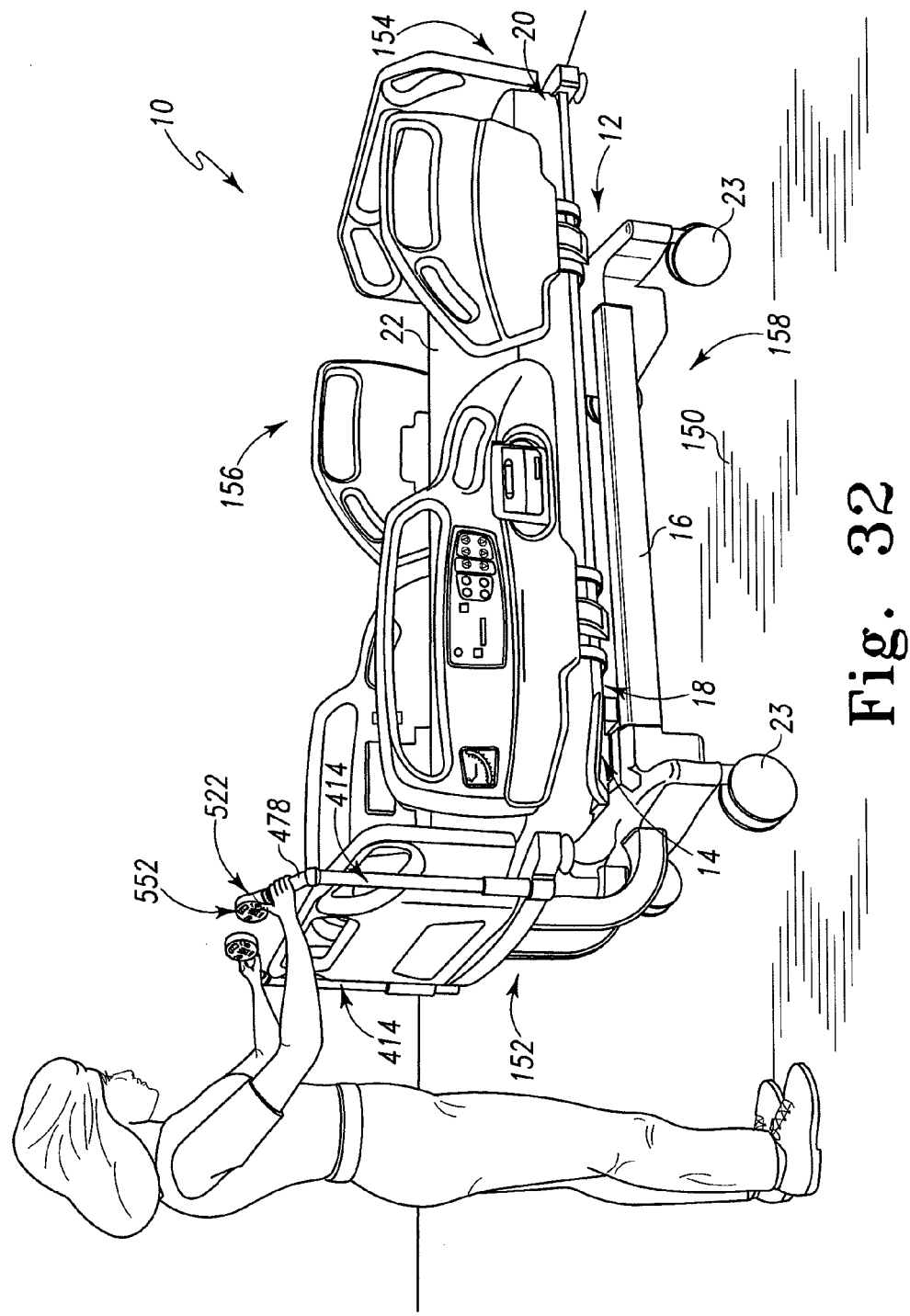
FIG. 32 is a perspective view of the apparatus showing a caregiver standing at the head end of the apparatus with her hands on the handle posts of the push handles so that she can operate the controls on one of the user interfaces with her thumb.
Figure 33:
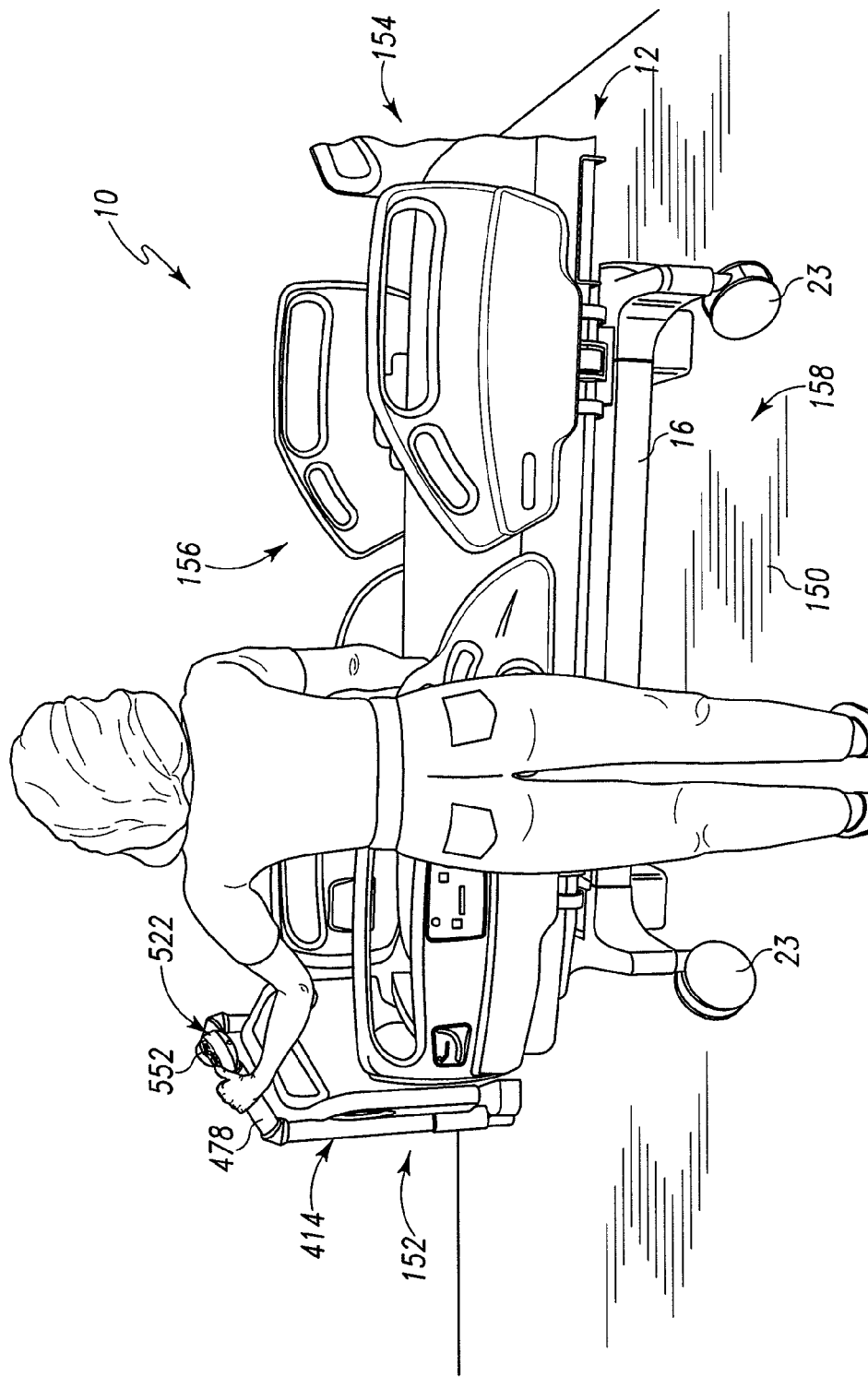
FIG. 33 is a perspective view, similar to FIG. 32, of the apparatus showing a caregiver standing alongside the right side of the apparatus with her left hand on the handle post of the push handle so that she can operate the controls on the user interface with her thumb.

As shown in FIGS. 1-2 and 4, a patient support apparatus 10, such as a stretcher shown in FIGS. 1-2 or a hospital bed shown in FIGS. 32-33, includes a frame 12 which has an upper frame 14 and a base frame or lower frame 16 interconnected by elevation adjustment mechanisms 18 that are operable to raise, lower, and tilt upper frame 14 relative to the lower frame 16 as shown in FIGS. 1 and 2. A patient support 20, such an articulating deck, is coupled to upper frame 14. A mattress 22 is carried by patient support 20. A plurality of casters 23 are coupled to base frame 16 and are in contact with the underlying floor 150 as shown in FIG. 9. Casters 23 include braking mechanisms (not shown) which are well known in the art and apparatus 10 has a set of brake/steer pedals 21 which are movable to brake and unbrake the casters 23 via manipulation of the associated caster braking mechanisms. The apparatus 10 has a head end 152, a foot end 154, a left side 156, a right side 158, a longitudinal axis 160, and a transverse or lateral axis 162.

A powered transport device 24 is coupled to base frame 16 and includes a wheel 26 that is motor driven to propel apparatus 10 along a floor. In one embodiment, device 24 is of the type available from Borringia Industrie AG of Ettingen, Switzerland, one version of which is marketed as the COMPASS™ drive. Such a device 24, therefore, may be constructed in accordance with the teachings of PCT Patent Application No. PCT Publication No. WO 2006/059200 A2 which is hereby incorporated by reference herein and which has a motor driven wheel that can be raised out of contract with the floor, lowered into contact with the floor, and swiveled by ninety degrees between a first orientation in which apparatus 10 is propelled in the longitudinal direction (i.e., parallel with the longitudinal or long dimension 160 of frame 12) and a second orientation in which apparatus 10 is propelled side-to-side or in the lateral direction (i.e., parallel with the lateral or short dimension 162 of frame 12).

An electrical system 28 of apparatus 10 includes a controller 30 and an optional main power switch 32, one or more user interfaces 34, a power supply 36, a raise/lower actuator 38, a swivel actuator 40, a drive motor 42, and a caster brake position sensor 44, each of which is coupled to the controller 30. Controller 30 comprises logic-based circuitry such as a microprocessor, a microcontroller, a field programmable gate array, or even discrete logic gates or the like, along with all associated circuitry such as memory, analog-to-digital converters, digital-to-analog converters, input/output circuitry and so on. The circuitry of controller 30 may be located on a plurality of circuit boards or be included in various modules that couple together. For example, controller 30 may include a logic controller portion which receives input signals regarding various conditions of apparatus 10 and a drive controller portion that is coupled to the logic controller portion and that controls voltage and/or current application to motor 42 and actuators 38, 40 of system 28 in response to an output signal received from the logic controller portion. In those embodiments having main power switch 32, this switch 32 is used to turn the transport device 24 on and off. In those embodiments without main power switch 32, then transport device may be on continually, although the system may power down into a sleep mode after a period of inactivity. In some embodiments, when off or when in the sleep mode, transport device 24 have wheel 26 in a raised position spaced from the underlying floor.

Figure 3:
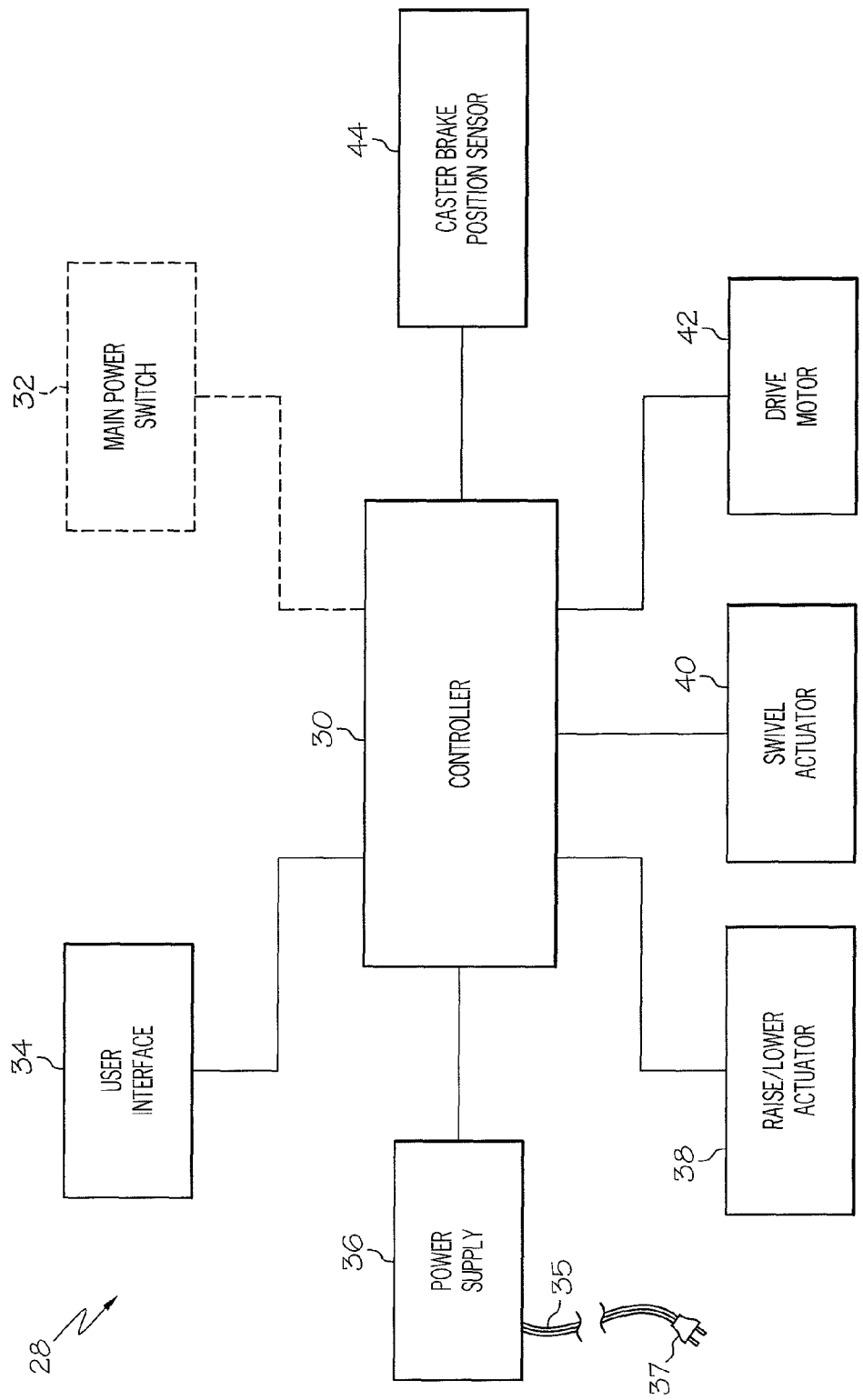
FIG. 3 is a block diagram of the electrical system of the patient support apparatus showing a controller and an optional main power switch, a user interface, a power supply, a raise/lower actuator, a swivel actuator, a drive motor, and a caster brake position sensor each coupled to the controller.

As shown in FIG. 3, the one or more user interfaces 34 include user inputs, as will be further described below, that are engaged by a user to signal controller 30 as to the manner in which transport device 24 is to be operated. Power supply 36 comprises a battery, battery recharging circuitry, an AC power cord 35 having an AC power plug 37, AC-to-DC conversion circuitry and other circuit components involved in powering the remainder of system 28. Actuator 38 is operable in response to command signals from controller 30 to raise wheel 26 off of the underlying floor and to lower wheel 26 into contact with the floor. Actuator 40 is operable in response to command signals from controller 30 to swivel wheel 26 between the first and second orientations. Drive motor 42 is operable in response to command signals from controller 30 to rotate wheel 26 thereby to propel apparatus 10 along the floor.

Assuming controller 30 receives signals from user interface 34 indicating that a user desires powered transport of apparatus 10, controller 30 determines whether other conditions are met prior to activating motor 42 to drive wheel 26. For example, controller 30 will first determine that battery power of power supply 36 meets or exceeds a threshold level and will also determine whether casters 23 are unbraked before applying power to drive motor 42 to rotate wheel 26. Caster brake position sensor 44 provides a signal to controller regarding whether casters 23 are braked or unbraked. Contrary to the teachings of all known prior art patient support apparatuses that have powered transport systems and that have AC power plugs, controller 30 does not require that the power plug of power supply 36 of apparatus 10 be unplugged prior to applying power to drive motor 42 to rotate wheel 26 to propel apparatus 10 along the floor. This creates the possibility that apparatus 10 can be power driven with the power plug still plugged into an electrical outlet resulting in the power plug being ripped out of the electrical outlet as apparatus 10 is driven away. However, by allowing motor 42 to be driven even when the AC power plug is plugged into an electrical outlet, powered transport device 24 can be used to make minor adjustments in the positioning of apparatus within its location. This is especially useful when obese or morbidly obese (also known as, bariatric) patients are supported on apparatus 10.

Figure 5B:
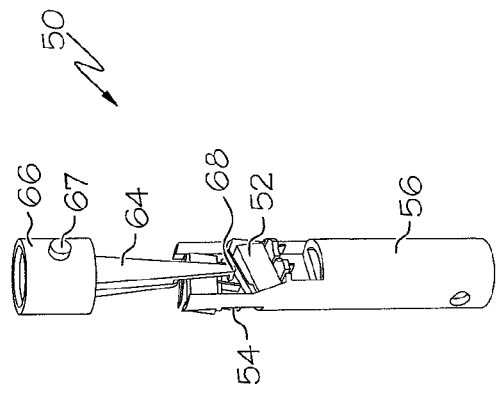
FIG. 5B is an enlarged perspective view, with portions broken away, showing the actuator lever received in the switch housing tube and having a lower end that interfaces with the forward switch and the reverse switch.
Figure 5A:
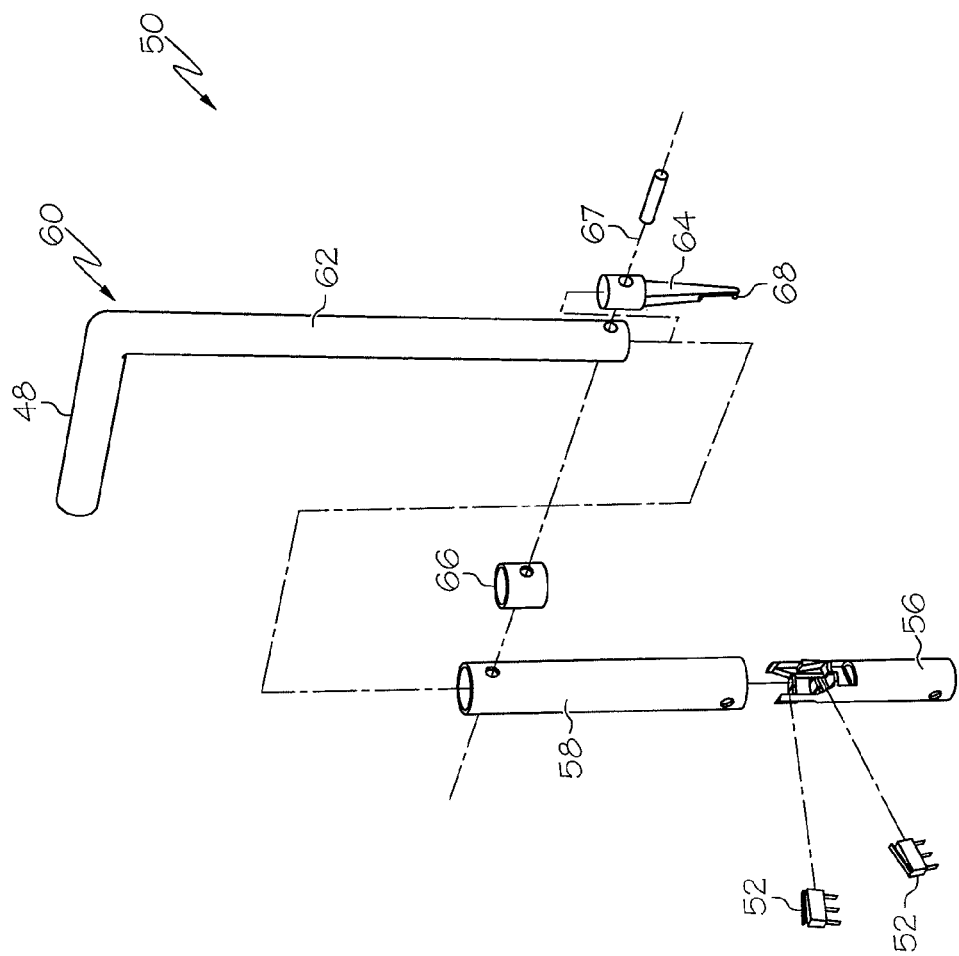
FIG. 5A is an exploded perspective view of one of the push handle assemblies showing a forward switch and a reverse switch arranged for coupling to a switch housing, a switch housing tube above the switch housing, a compression gasket to the right of the upper region of the switch housing tube, a bent handle tube to the right of the compression gasket, an actuator lever to the right of the bottom region of the bent handle tube, and a pivot pin arranged for insertion through respective apertures in the actuator lever, the bent handle tube, the compression gasket and the switch housing tube.

In the illustrative embodiment, apparatus 10 has user interfaces 34 at the head end 152, foot end 154, and both sides 156, 158 of the frame 12. In other embodiments, user interfaces 34 may be provided at lesser locations, including having user interface 34 at only one such location. User interface 34 at the head end of apparatus 10 includes a pair of first switches 44, shown in FIGS. 1 and 4, that extend from distal ends 46 of hand grip portions 48 of respective push handles 50 that are coupled to upper frame 14. User interface 34 at the head end of apparatus 10 further includes a forward switch 52 and a reverse switch 54 that are situated within an interior region of the associated push handle 50 as shown in FIGS. 5A and 5B. Although only one push handle 50 is shown in FIGS. 5A and 5B, it is understood that both push handles 50 are constructed similarly with one push handle 50 being substantially the mirror image of the other one. Thus, the description that follows of one push handle 50 is applicable to both.

Push handle 50 has a switch housing 56 to which switches 52, 54 are coupled as shown in FIGS. 5A and 5B. Electrical wires (not shown) extending from switches 44, 52, 54 are routed out of push handle 50 through the bottom of switch housing 56 and are routed to controller 30 along portions of frame 12. Switch housing 56 is received in a lower region of a switch housing tube 58. Handle 50 includes a bent tube 60, part of which comprises gripping portion 48 and part of which comprises a generally vertical portion 62. An actuator lever 64 is coupled to the bottom region of vertical portion 62 of push handle 50. Lever 64 and the bottom region of vertical portion 62 of push handle 50 are received in the upper portion of the interior region of switch housing tube 58 with an annular compression gasket 66 situated between the bottom region of vertical portion 62 of handle 50 and upper region of tube 58. A pivot pin 67 extends through associated apertures in tube 58, portion 62, lever 64, and compression gasket 66 to couple these elements together. Actuator lever 64 extends downwardly from portion 62 within compression gasket 66 and is sized such that a tip 68 of lever 64 interfaces with switches 52, 54 as shown in FIGS. 5A and 5B.

Bent tube 60 is pivotable by a slight amount about pin 67 relative to switch housing tube 58. Compression gasket 66 keeps tube 60 from too loosely rattling within tube 58, but is compressible to allow the pivoting movement of tube 60 relative to tube 58 when a user applies a sufficient amount of force to gripping portion 48 of push handle 50. When the user pushes gripping portion 48 in a forward direction, tip 68 of lever 64 engages switch 52 to turn it from an off position to an on position. When the user pulls gripping portion 48 in a rearward direction, tip 68 of lever 64 engages switch 54 to turn it from an off position to an on position. When the user lets go of gripping portion 48, compression gasket 66 returns tube 60 to a neutral position having both switches 52, 54 in the respective off positions.

To propel apparatus in a forward direction (i.e., having the foot end of apparatus 10 leading the way), a user must press at least one of the two switches 44 extending from ends 46 of gripping portions 48 of push handles 50 while simultaneously applying sufficient pushing force to at least one of handles 50 to cause the associated lever 64 to turn switch 52 to the respective on position. If all other necessary conditions are met, as determined by controller 30, then controller 30 will apply power to motor 42 to rotate wheel 26 in a first direction to propel apparatus 10 forwardly in response to one of switches 44 and one of switches 52 of user interface 34 at the head end of apparatus 10 being simultaneously engaged or turned on by the user.

To propel apparatus in a rearward direction (i.e., having the head end of apparatus 10 leading the way), a user must press at least one of the two switches 44 extending from ends 46 of gripping portions 48 of push handles 50 while simultaneously applying sufficient pulling force to at least one of handles 50 to cause the associated lever 64 to turn switch 54 to the respective on position. If all other necessary conditions are met, as determined by controller 30, then controller 30 will apply power to motor 42 to rotate wheel 26 in a second direction, opposite the first direction, to propel apparatus 10 rearwardly in response to one of switches 44 and one of switches 54 of user interface 34 at the head end of apparatus being simultaneously engaged or turned on by the user.

Figure 6:
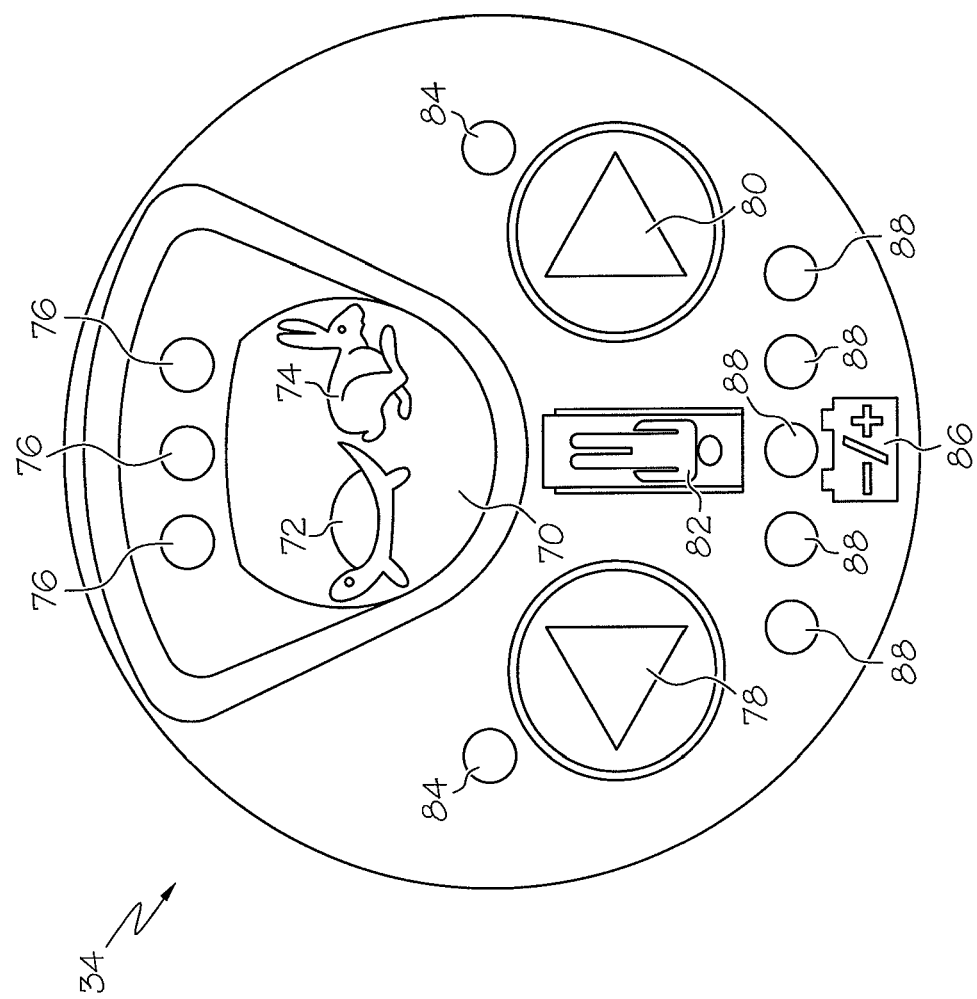
FIG. 6 is an enlarged front plan view of a user interface that couples to one of the push handles showing the user interface having a speed selection button beneath three horizontally arranged speed indicator LED's near the top of the user interface, a left direction button and a right direction button beneath the speed selection button, and five horizontally arranged battery power indicator LED's beneath the left and right arrow buttons.

Referring now to FIG. 6, the user interface 34 at the head end of apparatus 10 also includes a speed selection button 70. Subsequent presses of button 70 selectively toggles among a plurality of discrete speed settings at which the motor 42 is operable. In the illustrative embodiment, button 70 has a tortoise indicia 72 and a hare indicia 74 over portions of button 70. Button 70 can be pressed over the tortoise indicia 72 to toggle the speed down, while button 70 can be pressed over the hare indicia 74 to toggle the speed up. In other embodiments, button 70 may simply scroll in one direction and then cycle back to the beginning of the series after the highest, or lowest, setting is reached. In some embodiments, button 70 comprises a membrane switch or a pair of membrane switches, one for toggling the speed up and one for toggling the speed down.

In the illustrative example, the plurality of discrete speed settings includes a slow speed setting, a medium speed setting, and a fast speed setting. As such, the user interface 34 shown in FIG. 6 has three speed indicator LED's 76 to visually indicate the selected speed setting. For example, in the slow speed setting, the left-most LED 76 is on or lit and the other two LED's are off or unlit; in the medium speed setting the left-most LED 76 and the middle LED 76 are on and the right-most LED 76 is off; and in the high speed setting, all three LED's are on. Of course, if there are more or less then three speed settings, a corresponding number of lesser or greater LED's 76 are provided on the associated user interface 76. In some embodiments, however, user interface 34 includes a numeric display to visually indicate the selected speed setting.

With regard to the forward/reverse operation of powered transport device 24 in some embodiments, at least one of the slow speed setting, the medium speed setting, and the fast speed setting results in apparatus 10 being propelled faster in the forward direction than the corresponding speed setting results in apparatus 10 being propelled in the reverse direction. In such embodiments, therefore, controller 30 signals drive motor 42 to operate more slowly for a particular speed setting in the reverse direction than in the forward direction. In other embodiments, the slow, medium, and fast speed settings may have substantially the same respective speeds in the forward and reverse directions. It will be appreciated that each of the plurality of discrete speed settings corresponds to a threshold speed up to which motor 42 is accelerated to reach over time. The acceleration profile may be of any geometry, such as a linear ramp, discrete steps, curved, or combinations thereof.

The user interface 34 shown in FIG. 6 also includes a left direction button 78 and a right direction button 80 that are both positioned generally beneath speed selection button 70. Assuming all of the other necessary conditions are met, including pressing one of switches 44, then pressing button 78 results in apparatus 10 being propelled by powered transport device 24 laterally in the left direction, whereas pressing button 80 results in apparatus 10 being propelled by powered transport device 24 laterally in the right direction. The left and right directions are determined from the vantage point of a user standing adjacent a head end of apparatus 10 and facing toward the apparatus or from the vantage point of a patient lying in a supine or face up position on mattress 22 with their head near the head end of apparatus 10. A stretcher orientation indicia 82 is provided between buttons 78, 80 to provide the user with a visual indication as to the direction that apparatus 10 will be propelled in response to buttons 78, 80 being pressed as shown in FIG. 6.

If wheel 26 is in the first orientation when one of buttons 78, 80 is pressed simultaneously with switch 44, then controller 30 will command swivel actuator 40 to move wheel 26 from the first orientation to the second orientation prior to commanding motor 42 to rotate wheel 26 to propel apparatus 10 leftward or rightward as the case may be. Similarly, if wheel 26 is in the second orientation when one of switches 52, 54 is actuated simultaneously with switch 44, then controller 30 will command swivel actuator 40 to move wheel 26 from the second orientation to the first orientation prior to commanding motor 42 to rotate wheel 26 to propel apparatus forward or rearward as the case may be. Two LED's 84 are located adjacent respective buttons 78, 80 and are on or lit when the corresponding button 78, 80 is pressed to provide a feedback to the user.

In some embodiments, however, LED's 84 are on or lit when wheel 26 is in the second orientation and are off when wheel 26 is in the first orientation. In such embodiments, LED's 84 provide a visual indication as to the orientation of wheel 26. Based on the status of LED's 84, a user can determine whether to expect a slight delay after attempting to propel apparatus 10 due to wheel 26 being re-oriented from the first orientation to the second orientation, or vice versa. In some embodiments, the speed setting in the left and right directions defaults to the low speed setting regardless of what speed setting is otherwise selected using button 70 for the forward and reverse directions. Of course, having slow, medium, and fast settings for the left and right directions are contemplated by this disclosure.

The user interface 34 shown in FIG. 6 has a battery indicia 86 and five LED's 88 that are lit from left to right to indicate the amount of charge in the battery of power supply 36. When all five LED's 88 are lit, the battery is fully charged and when no LED's 88 are lit, the battery is essentially drained of charge. In other embodiments, more or less LED's 88 than five may be provided, including having no LED's 88 at all. In some embodiments, however, user interface 34 shown in FIG. 6 includes a numeric display to visually indicate the amount of charge in the battery of power supply 36.

In some embodiments, the user interface 34 of FIG. 6 is provided on an interface housing (not shown) that is coupled to one of push handles 50, such as being coupled to grip handle portion 48 near, or on, the distal end 46 thereof. To allow for this, switch 44 is moved to a different location on grip handle portion 48, such as being positioned on the bottom surface of portion 48 or on the surface of portion 48 that faces toward the foot end of apparatus 10. By locating switch 44 at one of these alternative locations on grip handle portion 48 and by locating the interface housing adjacent distal end 46 of grip handle portion 48, a user is able to grasp portion 48 with his or her fingers and engage switch 44 while also using his or her thumb to engage buttons 70, 78, 80 as desired.

In some embodiments, the interface housing coupled to handle 50 is configured so that the user interface 34 of FIG. 6 faces away from mattress 22 and toward a user standing at the head end of apparatus 10. In other embodiments, the user interface 34 of FIG. 6 may be coupled to a portion of upper frame 12 at the head end of apparatus 10 rather than being coupled to one of push handles 50.

Figure 7:
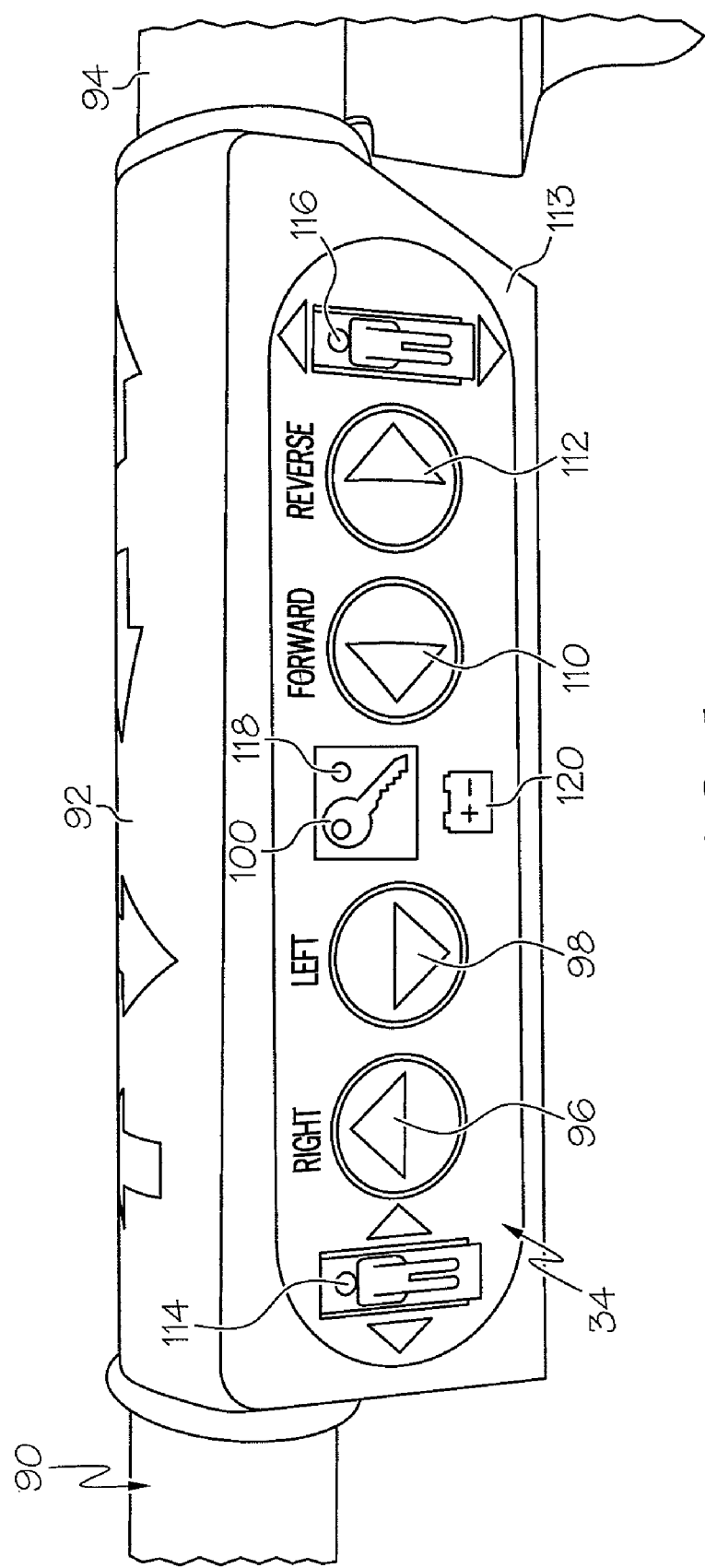
FIG. 7 is an enlarged side plan view of the user interface coupled to the siderail of the patient support apparatus showing this user interface having a right button, a left button, an enable key button, a forward button, and a reverse button on a generally vertically oriented surface of a button housing of the user interface.

As shown in FIGS. 2 and 7, apparatus 10 has left and right siderails 90 and an additional user interface 34 coupled to each of the siderails 90. The user interfaces 34 on siderails 90 are provided on respective user interface housings 92 that are coupled to associated top rails 94 of the respective siderails 90. Only one of the user interfaces 34 coupled to siderails 90 is described below, it being understood that both user interfaces 34 coupled to siderails 90 are substantially similar.

User interface 34 coupled to siderail 90 includes a right direction button 96, a left direction button 98, an enable key button 100, a forward direction button 110, and a reverse direction button 112 on a generally vertical surface 113 of housing 92 as shown in FIG. 7. In the illustrative embodiment, each of buttons 96, 98, 100, 110, 112 comprises a membrane switch. It is within the scope of this disclosure for other types of buttons or switches to be used, such as rocker switches, toggle switches, push button switches, and so on, as well as using a touchscreen or other type of touch sensor, in lieu of the membrane switches that embody buttons 96, 98, 100, 110, 112 in the illustrative example.

In some embodiments, by simultaneously pressing or engaging the enable key button 100 along with one of the other direction buttons 96, 98, 110, 112, apparatus 10 will be propelled by device 24 in the associated direction assuming all other necessary conditions are met. Thus, simultaneous engagement of buttons 96, 100 signals controller 30 to propel apparatus 10 laterally to the right; simultaneous engagement of buttons 98, 100 signals controller 30 to propel apparatus 10 laterally to the left; simultaneous engagement of buttons 100, 110 signals controller 30 to propel apparatus 10 forwardly; and simultaneous engagement of buttons 100, 112 signals controller 30 to propel apparatus 10 rearwardly.

A first stretcher orientation indicia 114 is located near one end of the user interface 34 of FIG. 7 to provide the user with a visual indication as to the direction that apparatus 10 will be propelled in response to buttons 96, 98 being pressed along with button 100. A second stretcher orientation indicia 116 is located near the other end of the user interface 34 of FIG. 7 to provide the user with a visual indication as to the direction that apparatus 10 will be propelled in response to buttons 110, 112 being pressed along with button 100. In some embodiments, such as the illustrative embodiment, a momentary press of button 100 may set a time period, such as 2 to 5 seconds, within which pressing any of buttons 96, 98, 110, 112 individually signals controller 30 to propel apparatus 10 in the associated direction. An LED 118 is provided on button 100 and is on or lit during the time period that buttons 96, 98, 110, 112 are usable to propel apparatus 10 in the corresponding direction. A battery charge indicator 120 is also included in the user interface 34 of FIG. 7 and is lit in an appropriate manner, such as via a set of vertically stacked bars, to indicate the amount of charge in the battery of power supply 36.

Figure 8:
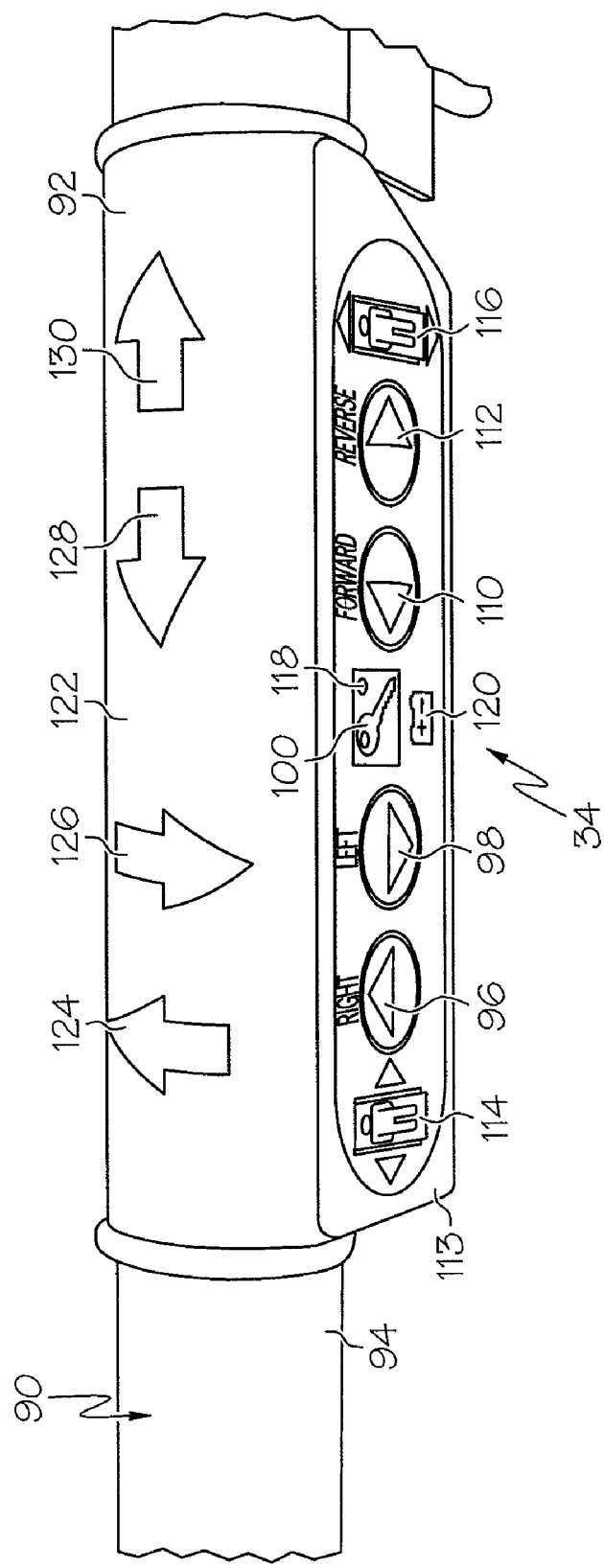
FIG. 8 is a top perspective view of a the user interface of FIG. 7 showing an upwardly facing surface of the button housing of the user interface having left, right, forward, and reverse indicia generally aligned with the corresponding left, right, forward, and reverse buttons that are on the vertically oriented surface of the button housing.

Referring now to FIG. 8, an upwardly facing surface 122 of interface housing 92 has a right direction indicia 124, a left direction indicia 126, a forward direction indicia 128, and a reverse direction indicia 130. Each indicia 124, 126, 128, 130 is generally aligned with the corresponding left, right, forward, and reverse direction buttons 96, 98, 110, 112 that are on the generally vertical surface 113 of housing 92. Therefore, indicia 124, 126, 128, 130 provides a visual indication to a user standing alongside siderail 90 and looking downwardly at housing 92 as to the general location of buttons 96, 98, 110, 112.

In the illustrative example, no provision is made on the user interface 34 coupled to siderail 90 for any type of speed adjustment. In other embodiments, a speed selection button, similar to button 70 of the user interface at the head end of apparatus 10, may be provided on the user interface 34 coupled to siderail 90. Users propelling apparatus 10 when standing alongside one of siderails 90 may not have as much control over the maneuverability and steering of apparatus 10 as users propelling apparatus 10 when gripping push handles 50. Thus, in some embodiments, when the user interface 34 coupled to siderail 90 is used to propel apparatus 10, controller 30 defaults to the slow speed setting regardless of what speed setting may have otherwise been selected with button 70 at the head end of apparatus 10. In other embodiments, with regard to the user interface 34 on siderail 90, the medium speed setting may be the default setting for the forward and reverse directions, whereas the low speed setting may be the default setting for the left and right directions.

Figure 10:
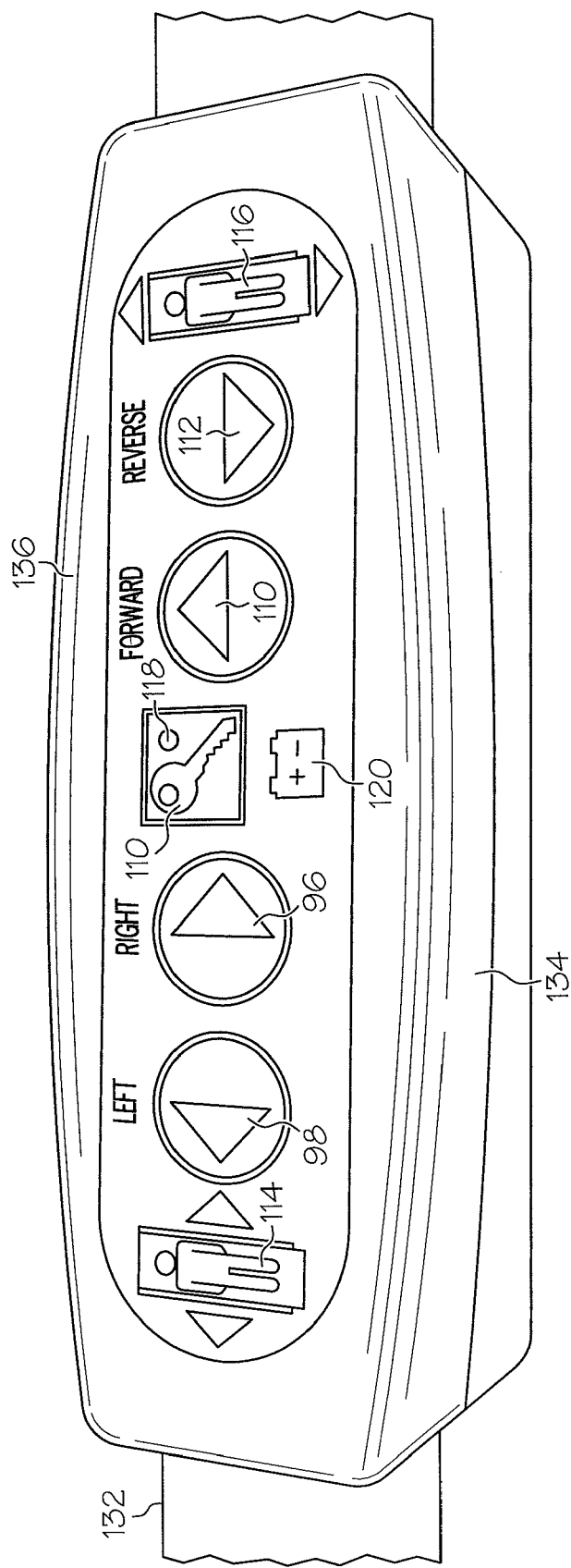
FIG. 10 is an enlarged top plan view of the additional user interface showing an upwardly facing surface of a button housing of this user interface having a left button, a right button, an enable key button, a forward button, and a reverse button.

As shown in FIGS. 9 and 10, upper frame 14 of apparatus 10 has a laterally extending frame member 132 located near the foot end of apparatus 10 and yet another user interface 34 is coupled to this frame member 132. The user interface 34 at the foot end of apparatus 10 is provided on a user interface housing 134 that is coupled to frame member 132. The user interface 34 coupled to frame member 132 is substantially the same as the user interface 34 coupled to siderail 90. Thus, like reference numerals are used to denote like elements of these user interfaces 34 and the description above of the user interface 34 of FIGS. 2 and 7 is equally applicable to the user interface of FIGS. 9 and 10 and is not repeated. One main difference between the user interface 34 of FIGS. 9 and 10 is that it is located on an upwardly facing surface 136 of interface housing 134, whereas user interface 34 of FIGS. 2 and 7 is located on generally vertical surface 113 of interface housing 92. Another difference is that there is no direction arrow indicia on housing 134 like that found on surface 122 of housing 92.

Figure 11:
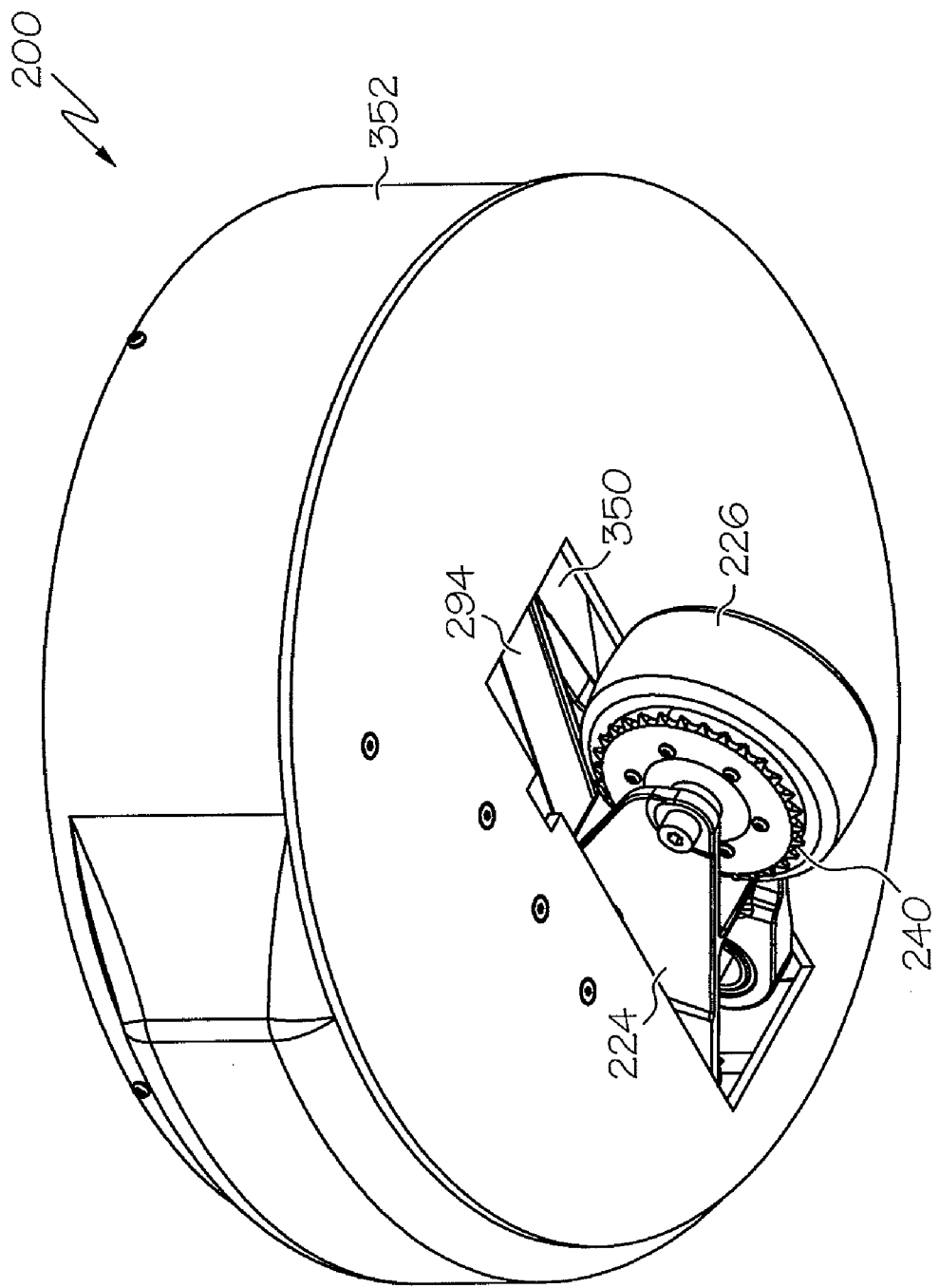
FIG. 11 is a perspective view of another embodiment of the powered transport device of FIG. 2 showing a drive wheel extending through an opening in a cover of the powered transport device.
Figure 12A:
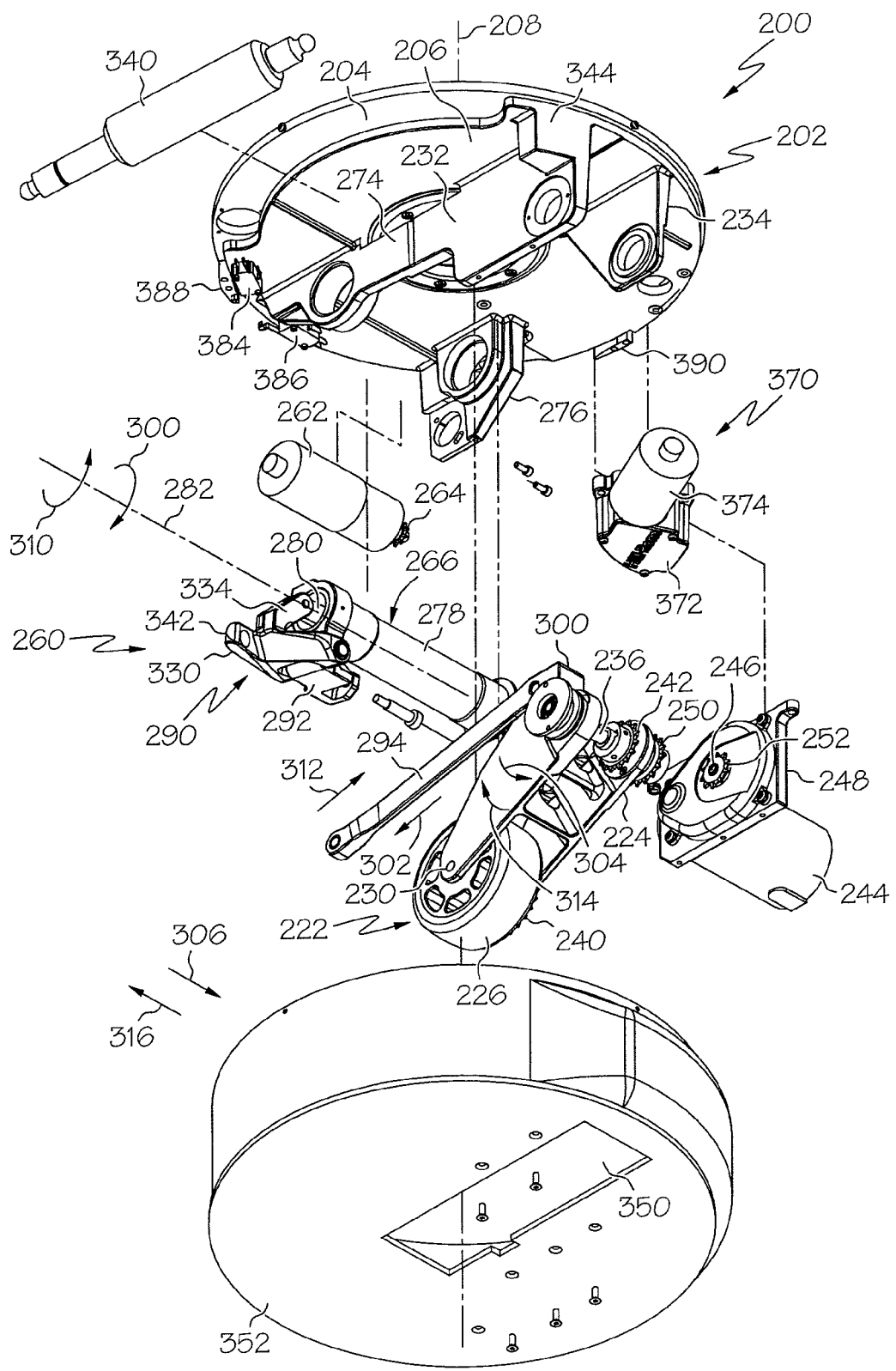
FIG. 12A is an exploded perspective view of the powered transport device of FIG. 11 showing the cover, a drive wheel assembly including the drive wheel above the cover, a drive wheel motor to the right of the drive wheel assembly, a drive wheel raise/lower assembly to the left of the drive wheel assembly, a raise/lower motor above the drive wheel raise/lower assembly, a swivel assembly including an indexing motor to the right of the raise/lower motor, a mounting plate assembly above the raise/lower motor and the swivel assembly, and a gas spring to the left of the mounting plate assembly.
Figure 12B:
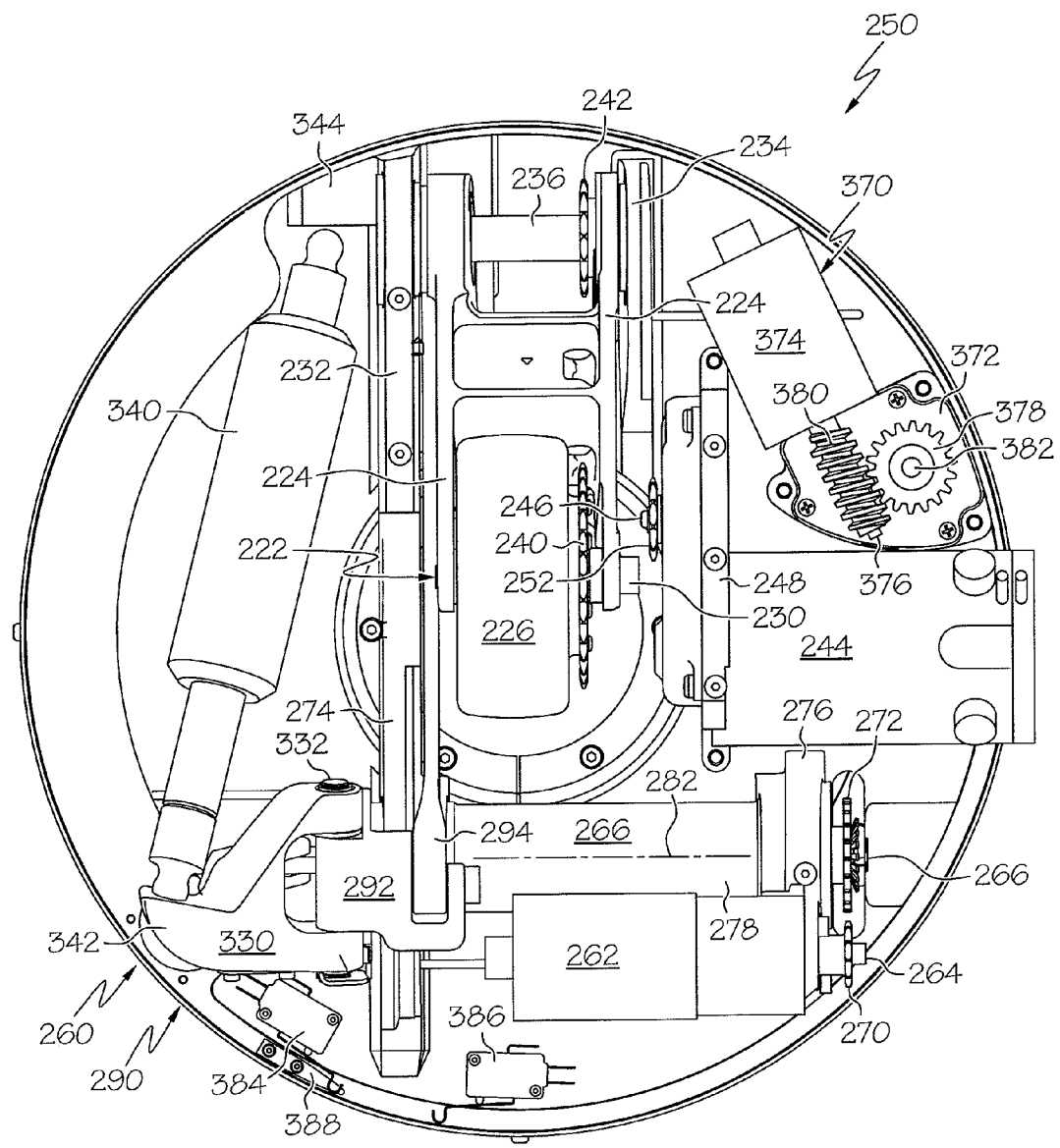
FIG. 12B is a bottom view, with the cover removed, of the powered transport device of FIGS. 11-12.

As indicated above, the powered transport device or system 24 (FIG. 2) has the motor driven wheel 26 that can be raised out of contract with the floor 150, lowered into contact with the floor 150, and swiveled by ninety degrees between the first orientation in which apparatus 10 is propelled in the longitudinal direction 160 and the second orientation in which apparatus 10 is propelled side-to-side or in the lateral direction 162. An alternative powered transport device 200 is shown in FIGS. 11, 12A, and 12B. The device 200 comprises a mounting assembly 202 that includes a stationary mounting plate 204 coupled to the underside of the lower frame 16 of the apparatus 10 and a rotatable platform 206 coupled to the underside of the mounting plate 204 for pivoting movement about a generally vertical axis 208.

With the exception of a ring gear (not shown) and stops 388, 390 (FIG. 12A) attached to the stationary mounting plate 204, the components of the device 200 are supported by the rotatable platform 206 for rotation therewith about the vertical axis 208 between a first orientation in which the device 200 is operable to propel the apparatus 10 substantially parallel with the longitudinal dimension 160 of the frame 12 and a second orientation in which the device 200 is operable to propel the apparatus 10 substantially parallel with the lateral dimension 162 of the frame 12. In the illustrative embodiment, both the mounting plate 204 and the rotatable platform 206 are generally circular. In other embodiments, however, the mounting plate 204 and the rotatable platform 206 may have other shapes, such as square, rectangular, triangular, oval, etc.

As shown in FIGS. 12A, and 12B, the device 200 includes a drive wheel assembly 222 that extends downwardly from the rotating platform 206 and coupled thereto for rotation therewith about the vertical axis 208. The drive wheel assembly 222 includes a wheel-mounting bracket 224 that carries a drive wheel 226 at a first end for rotation about a generally horizontal first shaft 230 (FIG. 12B). At a second end, the wheel-mounting bracket 224 is coupled to a pair of vertically-extending spaced-apart flanges 232, 234 for pivoting movement about a generally horizontal second shaft 236, which is generally parallel to the first shaft 230. As shown in FIG. 12A, the flanges 232, 234 extend downwardly from the rotatable platform 206. An endless chain (not shown) is trained about respective sprockets 240, 242 mounted on associated shafts 230, 236 to establish a driving connection therebetween.

The drive wheel assembly 222 further includes a drive wheel motor 244 that has an output shaft 246. The drive wheel motor 244 is supported by a vertically-extending flange 248 that extends downwardly from the rotating platform 206 and coupled thereto for rotation therewith. An endless chain (not shown) is trained about respective sprockets 250, 252 mounted on associated shafts 236, 246 to establish a driving connection therebetween. The drive wheel motor 244 is operable in response to command signals from the controller 30 (FIG. 3) to rotate the wheel 226 to propel the apparatus 10 along the floor 150.

When the rotating platform 206 is in the first or longitudinal orientation, the wheel 226, which is supported by the rotating platform 206, is also in the first or longitudinal orientation. When the wheel 226 is in the first or longitudinal orientation, the device 200 is operable to propel the apparatus 10 substantially parallel with the longitudinal dimension of the frame 12. Also, when the rotating platform 206 and the wheel 226 are in their respective first or longitudinal orientations, the shafts 230, 236, 246 extend laterally or transversely relative the frame 12. On the other hand, when the rotating platform 206 is in the second or lateral orientation, the wheel 226 is also in the second or lateral orientation. When the wheel 226 is in the second or lateral orientation, the device 200 is operable to propel the apparatus 10 substantially parallel with the lateral dimension of the frame 12. In addition, when the rotating platform 206 and the wheel 226 are in their respective second or lateral orientations, the shafts 230, 236, 246 extend longitudinally relative the frame 12.

Referring to FIGS. 12A, and 12B, the device 200 includes a drive wheel raise/lower assembly 260 that extends downwardly from the rotating platform 206 and coupled thereto for rotation therewith about the vertical axis 208. The raise/lower assembly 260 is operable in response to command signals from the controller 30 (FIG. 3) to move the wheel 226 between a storage position spaced from the underlying floor and a use position in engagement with the underlying floor. The raise/lower assembly 260 includes a raise/lower motor 262 having an output shaft 264 and a linear actuator 266 having an input shaft 268. The two shafts 264, 268 of the raise/lower assembly 260 are generally parallel to each other and parallel to the shafts 230, 236, 246 of the drive wheel assembly 222 as shown in FIG. 12B. An endless chain (not shown) is trained about respective sprockets 270, 272 mounted on associated shafts 264, 268 to establish a driving connection therebetween. The raise/lower motor 262 and the actuator 266 are supported by a pair of vertically-extending spaced-apart flanges 274, 276 that extend downwardly from the rotating platform 206. The actuator 266 includes a cylindrical housing 278 that is rotatable relative to the flanges 274, 276 about a central axis 282 of the housing 278. In addition, the actuator 266 has an output member 280 that extends out of and retracts into the housing 278 in response to the operation of the raise/lower motor 262. The extension and retraction of the output member 280 is converted into an up/down motion of the wheel-mounting bracket 224, and, in turn, an up/down motion of the wheel 226, via a linkage 290.

Continuing reference to FIGS. 12A and 12B, the linkage 290 includes a rotatable flapper mount 292 and a connecting link 294. The mount 292 is coupled to the housing 278 of the actuator 266 for rotation therewith about the axis of rotation 282 of the housing 278. The connecting link 294 is pivotably coupled at a first end to the mount 292 and pivotably coupled at a second end to a lug 300 (FIG. 12A) that extends upwardly from the wheel mounting bracket 224. Referring to FIG. 12A, when the housing 278 pivots in a clockwise direction 300 (when viewed from the left hand side in FIG. 12A), the connecting link 294 moves in a leftward direction 302 away from the wheel mounting bracket 224, the wheel mounting bracket 224 pivots in a counterclockwise direction 304 (when viewed from the left hand side in FIG. 12A), thereby moving the wheel 226 in a downward direction 306 to engage the floor. On the other hand, when the housing 278 pivots in a counterclockwise direction 310 (when viewed from the left hand side in FIG. 12A), the connecting link 294 moves in a rightward direction 312 toward the wheel mounting bracket 224, the wheel mounting bracket 224 pivots in a clockwise direction 314 (when viewed from the left hand side in FIG. 12A), thereby moving the wheel 226 in an upward direction 316 above the floor.

As shown in FIG. 12B, the linkage 290 includes a flapper 330 coupled to the mount 292 for pivoting movement about a pivot pin 332 that extends generally perpendicularly to the axis of rotation 282 of the mount 292 between a raised position that corresponds to a raised position of the wheel 226 and a lowered position that corresponds to a lowered position of the wheel 226. A bent link 334 (FIG. 12A) has a first end pivotably coupled to the flapper 330 and a second end pivotably coupled to the output member 280. As the output member 280 moves between retracted and extended positions, the flapper 330 moves between the raised and lowered positions through an intermediate overcenter position.

As shown in FIGS. 12A and 12B, the linkage 290 further includes a gas spring 340 that is held in a state of compression between a lug portion 342 (FIG. 12B) of the flapper 330 and a flange 344 (FIG. 12A) that extends downwardly from the rotating platform 206. The lug portion 342 is above the axis 282 of the housing 278 of the rotatable actuator 266 when the flapper 330 is raised. On the other hand, the lug portion 342 is below the axis 282 of the housing 278 when the flapper 330 is lowered. Referring to FIG. 12A, when the flapper 330 is between the raised position and the overcenter position, the gas spring 340 biases the flapper mount 292 in the counterclockwise direction 310, the connecting link 294 in the rightward direction 312 toward the wheel mounting bracket 224, the wheel mounting bracket 224 in a clockwise direction 314, and the wheel 226 in the upward direction 316. On the other hand, when the flapper 330 is between the overcenter position and the lowered position, the gas spring 340 biases the flapper mount 292 in the clockwise direction 300, the connecting link 294 in the leftward direction 302 away from the wheel mounting bracket 224, the wheel mounting bracket 224 in the counterclockwise direction 304, and the wheel 226 in the downward direction 306.

When the output member 280 of the actuator 266 is retracted, the flapper 330 is raised, the gas spring 340 biases the flapper mount 292 in the counterclockwise direction 310. When the flapper mount 292 is biased in the counterclockwise direction 310, the connecting link 294 is biased in the rightward direction 312 toward the wheel mounting bracket 224, the wheel mounting bracket 224 is biased in the clockwise direction 314, and the wheel 226 is biased in the upward direction 316 away from the floor 150. As the output member 280 extends out of the housing 278 in response to the operation of the motor 262, the flapper 330 moves from the raised position to the lowered position. As the flapper 330 moves past the overcenter position toward the lowered position, the gas spring 340 biases the flapper mount 292 in the clockwise direction 300, instead of the counterclockwise direction 310. When the flapper mount 292 is biased in the clockwise direction 310, the connecting link 294 is biased in the leftward direction 302 away from the wheel mounting bracket 224, the wheel mounting bracket 224 is biased in the counterclockwise direction 304, and the wheel 226 is biased in the downward direction 306 toward the floor 150. To raise the wheel 226, the sequence is reversed. Thus, the raise/lower motor 262 is operable in response to command signals from the controller 30 to raise the wheel 226 off of the underlying floor 150 and to lower the wheel 226 into contact with the floor 150. When the wheel 226 is lowered, it extends through a slot 350 in a cover 352 of the device 200 as shown, for example, in FIG. 11.

After the wheel 226 is lowered into contact with the floor 150, the raise/lower motor 262 continues to operate for a specified time interval to compress the gas spring 340 to increase the downward force exerted by the wheel 226 against the floor 150 to ensure good traction in order to be able to move the apparatus 10, even when the apparatus 10 is transporting a heavy patient. By varying the time interval during which the raise/lower motor 262 continues to operate after the wheel 226 makes initial contact with the floor 150, the downward force of the driving wheel 226 against the floor 150 may be adjusted. Too little engagement force may result in the slippage of the driving wheel 226. On the other hand, too much engagement force may lift the apparatus 10 off the floor 150. In one embodiment, the downward force exerted by the wheel 226 against the floor 150 is increased to about 350 lbs. In another embodiment, the armature current of the drive wheel motor 244 is used to adjust the downward force of the wheel 226 against the floor 150. When the wheel 226 is lowered into contact with the floor 150, the contact point of the wheel 226 coincides with a point at which the axis of rotation 208 of the rotating platform 206 intersects the floor 150.

Referring to FIGS. 12A and 12B, the device 200 includes a drive wheel swivel assembly 370 that has a housing 372 coupled to the rotating platform 206 for rotation therewith. The swivel assembly 370 includes a swivel motor 374 that is carried by the housing 372 and that operates in response to command signals from the controller 30 (FIG. 3). The motor 374 has an output shaft 376 that drives a pinion 378 through a worm 380. The pinion 378 is mounted on a vertically-extending shaft 382 that carries another pinion (not shown) which engages a ring gear (not shown) attached to the stationary mounting plate 204. The swivel assembly 370 includes limit switches 384, 386 mounted on the rotating platform 206. The limit switches 384, 386 are activated by associated stops 388, 390, which are 90° apart, carried by the stationary mounting plate 204. The positions of the two stops 388, 390 correspond to the two orientations of the rotating platform 206, namely, the longitudinal orientation and the lateral orientation. The activation of the limit switches 384, 386 stops the operation of the swivel motor 374. The device 200 is generally of the type available from Borringia Industrie AG of Ettingen, Switzerland.

Figure 13:
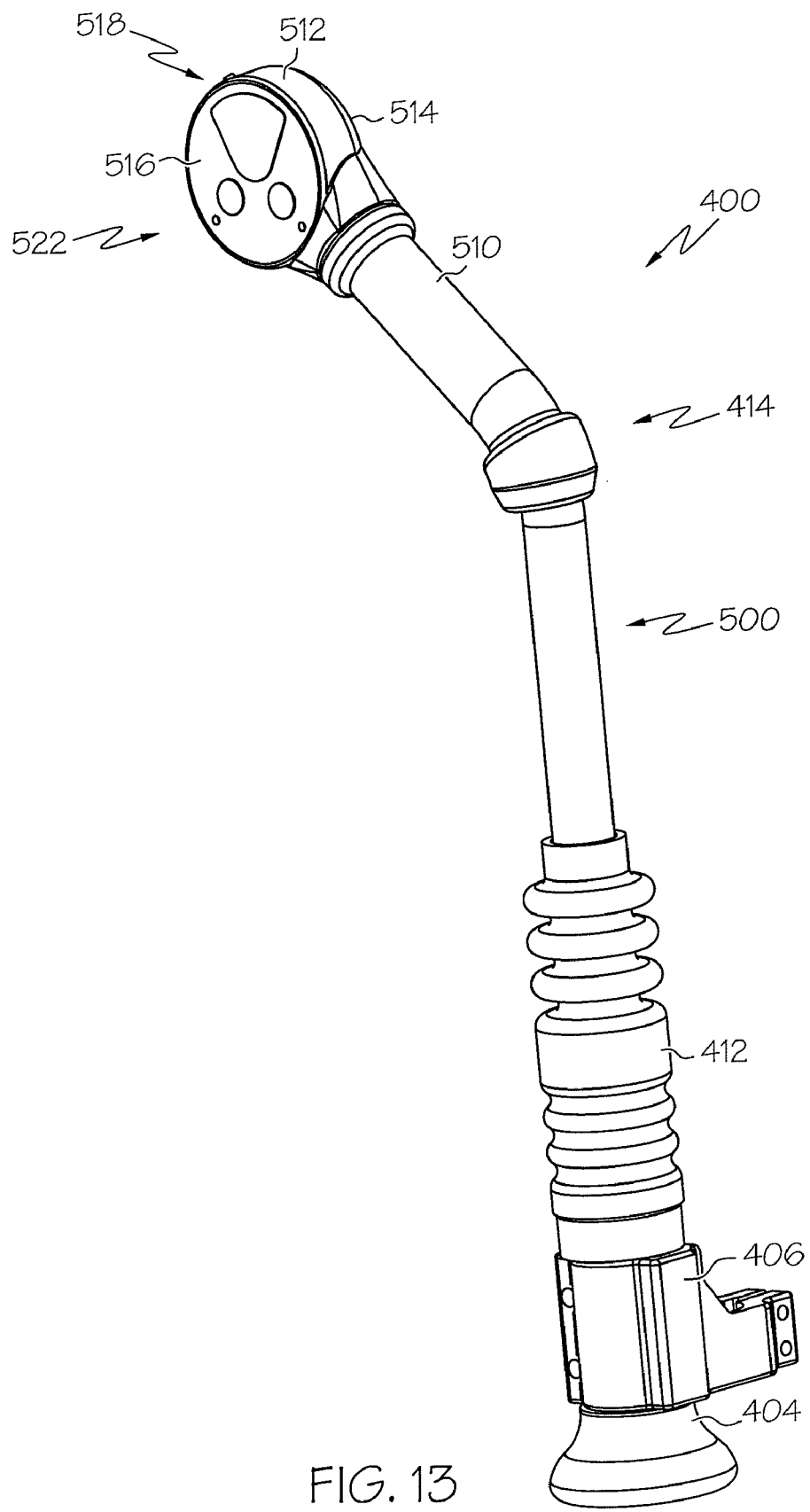
FIG. 13 is a perspective view of another embodiment of the push handle assembly of FIGS. 5A and B.
Figure 14:
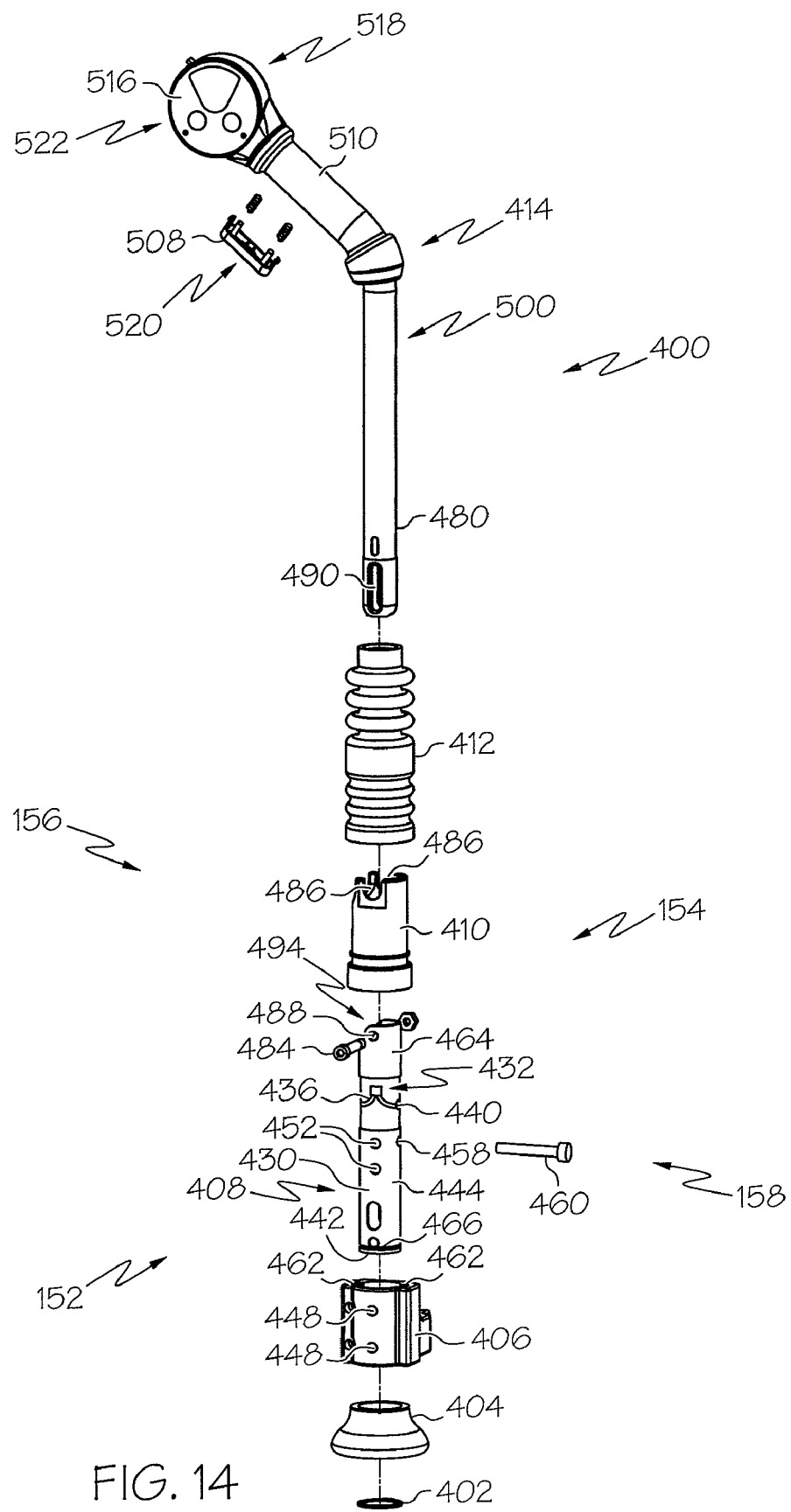
FIG. 14 is an exploded perspective view of the push handle assembly of FIG. 13 showing a bumper, a mounting bracket above the bumper that couples to the upper frame of the patient support apparatus, a strain gage assembly above the mounting bracket, a strain gage assembly shield above the strain gage assembly, bellows above the strain gage assembly shield, a push handle above the bellows, a longitudinally-extending pivot pin to the left of a top portion of the strain gage assembly and arranged for insertion through the upwardly-opening slots in the shield, through the apertures in the strain gage assembly and then through elongated slots in the push handle, an enable switch actuator to the left of a bent portion of the push handle, and a push handle user interface coupled to an upper end of the bent portion of the push handle.
Figure 15:
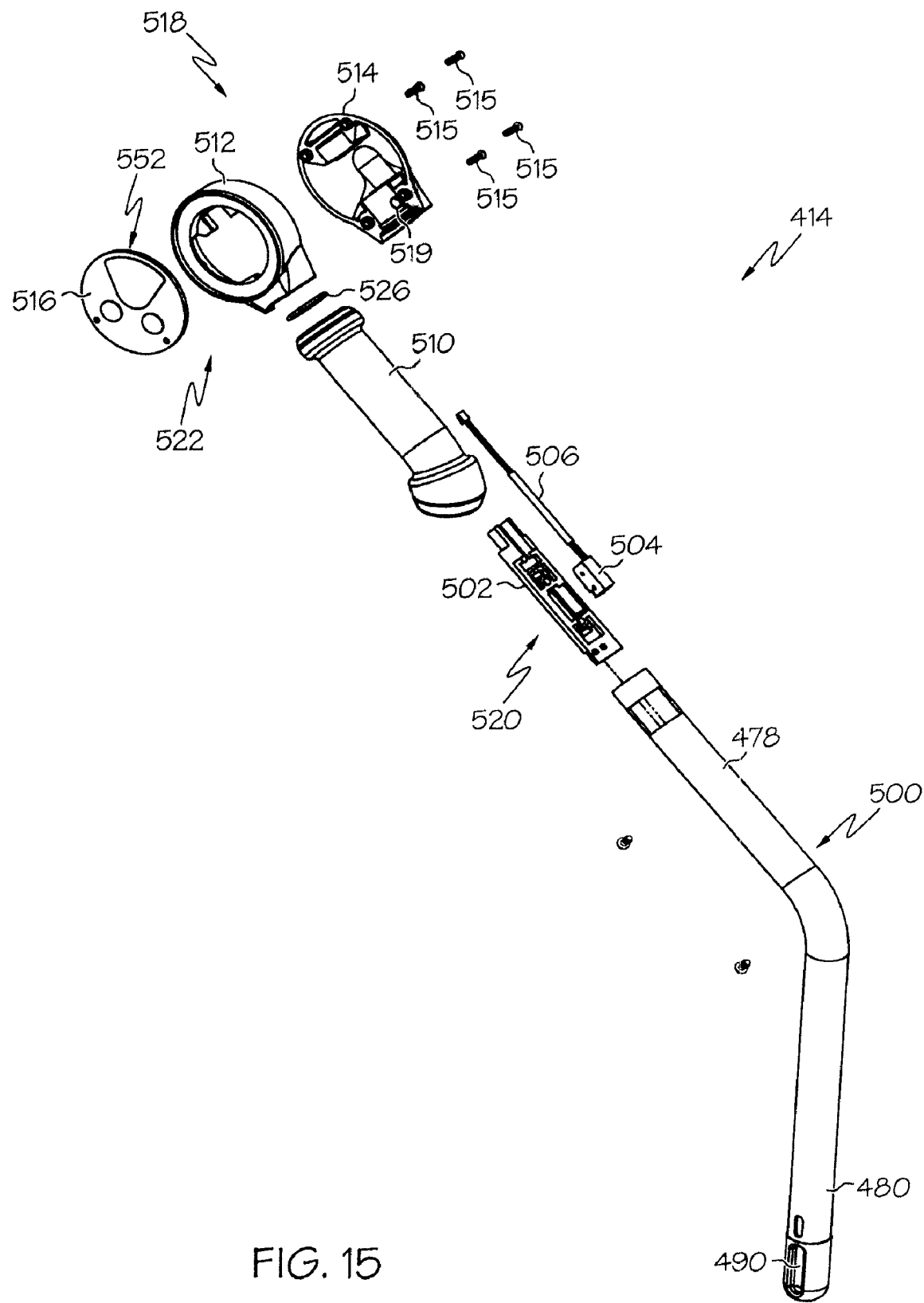
FIG. 15 is an exploded perspective view of the push handle of FIGS. 13-14 showing a bent tube, an enable switch housing above a bent portion of the bent tube, an enable switch and a connector to the right of the enable switch housing, a handle grip above the enable switch housing, a push handle user interface top housing above the handle grip, a push handle user interface bottom housing to the right of the user interface top housing, and a push handle user interface overlay to the left of the user interface top housing.

As indicated above, the user interface 34 at the head end of apparatus 10 includes, for example, the enable switch 44 (FIG. 4) that extends from the distal end 46 of each push handle assembly 50, the forward and reverse switches 52 and 54 (FIGS. 5A and 5B) that are situated within an interior region of each push handle assembly 50, and the buttons and indicators 70, 76, 78, 80, 82, 84, 86, 88 (FIG. 6) that are coupled to the handgrip 48 of each push handle assembly 50. An alternative push handle assembly 400 is shown in FIGS. 13-15. As shown in FIG. 14, each push handle assembly 400 comprises a retaining ring 402, a protective bumper 404, a mounting bracket 406 that couples to the upper frame 14 (FIG. 1) of the apparatus 10, a strain gage assembly 408, a strain gage assembly shield 410, flexible bellows 412, and a push handle 414. The strain gage assembly 408, the shield 410, the bellows 412, and the push handle 414 are all generally cylindrical elongate tubular members. Although only one push handle assembly 400 is shown in FIGS. 13-15, it is understood that both push handles assemblies 400 are constructed similarly with one push handle assembly 400 being substantially the mirror image of the other one. Thus, the description that follows of one push handle assembly 400 is applicable to both.

Referring to FIG. 14, the strain gage assembly 408 includes a mounting tube 430 and a load cell 432 mounted on the opposite sidewalls of the mounting tube 430. The load cell 432 performs a function similar to the forward and reverse switches 52, 54 (FIGS. 5A and B). The load cell 432 includes four strain gauges or resistors (not shown), which are electrically connected to form a Wheatstone bridge. Two of the resistors forming the load cell 432 are located on an inner sidewall of the mounting tube 430 and are referred to herein as inner resistors. Two of the resistors forming the load cell 432 are located on an outer sidewall of the mounting tube 430 and are referred to herein as outer resistors. The inner and outer resisters forming the load cell 432 are longitudinally aligned relative to the frame 12. The inner and outer directions are determined from the vantage point of a user standing adjacent the head end 152 of apparatus 10 and facing toward the apparatus. A load cell 432 of this type is disclosed in U.S. Pat. No. 7,090,041, which is hereby entirely incorporated by reference herein.

Electrical wires 436 extend from the load cell 432 (FIG. 20) to a circuit board (not shown) that is situated within an interior region of the mounting tube 430. The wires 436 are routed through a pair of laterally-aligned openings 440 in the opposite sidewalls of the mounting tube 430. Electrical wires (not shown) extending from the circuit board are routed out of a lower end 442 of mounting tube 430 and are then routed to the controller 30 (FIG. 3) along portions of the frame 12. A lower portion 444 of the mounting tube 430 is received in an interior region 446 of the mounting bracket 406. In the illustrative embodiment, the mounting tube 430 is rigidly secured to the mounting bracket 406 by a pair of longitudinally-extending bolts (not shown) that extend through associated longitudinally-aligned openings 448 in the opposite sidewalls of the mounting bracket 406 and longitudinally-aligned openings 452 in the opposite sidewalls of the mounting tube 430. The mounting bracket 406 is, in turn, fixedly attached to the upper frame 14 by suitable fasteners.

Opposite ends of a laterally-extending pivot pin 460 that extends through a pair of laterally-aligned openings 458 in the sidewalls of the mounting tube 430 are received in a pair of laterally-aligned upwardly-opening slots 462 in the opposite sidewalls of the mounting bracket 406. An upper portion 464 of the mounting tube 430 is pivotable or bendable by a slight amount about the laterally-extending pin 460 relative to the lower portion 444 of the mounting tube 430 when the push handle 414 is pushed forwardly to propel the apparatus 10 forwardly or when the push handle 414 is pulled rearwardly to propel the apparatus 10 rearwardly. When the push handle 414 is pushed forwardly, the inner resistors forming the load cell 432 are compressed and the outer resistors forming the load cell 432 are stretched to send a first input signal to the controller 30 (FIG. 3). On the other hand, when the push handle 414 is pulled rearwardly, the inner resistors forming the load cell 432 are stretched and the outer resistors forming the load cell 432 are compressed to send a second input signal to the controller 30 (FIG. 3). The mounting tube 430 returns to a neutral position when the user lets go of push handle 414.

The bumper 404 is sleeved over the lower portion 444 of the mounting tube 430 and held in place by the retaining ring 402 that is captured in a circumferential groove 466 formed near the lower end 442 the mounting tube 430. The bumper 404 protects the components of the push handle assembly 400 from accidental or incidental contact with other equipment, such as a push cart. The strain gage assembly shield 410 is sleeved over the upper portion 464 of the mounting tube 430. Illustratively, the mounting tube 430 is made from alloy steel seamless tubing and the bumper 404 is made from suitable elastomeric material. The strain gage assembly 408 shown in FIGS. 13-15 is generally of the type that is available from Long Wen Co. of Changzhou, China.

As shown in FIG. 15, the push handle 414 includes a bent tube 500, an enable switch housing 502, an enable switch 504, an enable switch connector 506, an enable switch actuator 508 (FIG. 14), a handgrip 510, a push handle user interface top housing 512, a push handle user interface bottom housing 514, and a push handle user interface overlay 516. The handgrip 510 is sleeved over a bent portion 478 of the bent tube 500 (hereinafter the handle post 478) and coupled thereto by suitable fasteners, such as screws. Referring to FIG. 14, a lower portion 480 of the bent tube 500 is received in an upper portion of the interior region of the mounting tube 430. A longitudinally-extending pivot pin 484 (FIG. 14) extends through a pair of longitudinally-aligned upwardly-opening slots 486 in the opposite sidewalls of the strain gage shield 410, extends through a pair of longitudinally-aligned openings 488 in the opposite sidewalls of the mounting tube 430, and extends through a pair of longitudinally-aligned elongated slots 490 in the opposite sidewalls of the lower portion 480 of the bent tube 500.

To pivot the push handle 414 downwardly to an out-of-the-way stowed position, the push handle 414 is first pulled upwardly wherein the longitudinally-extending pin 484 slides within the elongated slots 490 in the lower portion 480 of the bent tube 500. The push handle 414 is then folded downwardly into an inwardly-facing clearance notch 494 formed in the upper portion 464 of the mounting tube 430 as shown, for example, in FIG. 20. To move the push handle 414 back to an upright use position, the sequence of steps is reversed. The bellows 412 are sleeved over the lower portion 480 of the bent tube 500, the shield 410 and an upper portion of the mounting bracket 406. The bellows 412 cover portions of the push handle assembly 400 without interfering with pivotal movement of the push handle 414 between the folded stowed position and the upright use position.

Referring to FIGS. 14-15, the enable switch housing 502, the enable switch 504, the enable switch connector 506, the enable switch actuator 508 cooperate to form a push handle enable switch 520, similar to the push handle enable switch 44 shown in FIGS. 1 and 4. The user interface top and bottom housings 512, 514 cooperate to form a user interface housing 518. The user interface overlay 516 and the membrane switches 530, 540, 542 (FIG. 16) are coupled to the user interface housing 518 to form a push handle user interface 522 (FIGS. 13-15), similar to the push handle user interface 34 shown in FIG. 6. In the illustrative embodiment, the membrane switches 530, 540, 542 are located on the underside of the user interface overlay 516.

In the illustrative embodiment, the top and bottom housings 512, 514 are arranged on opposite sides of the handle post 478 and coupled together by suitable fasteners, such as screws 515 (FIG. 15). As explained later in conjunction with FIGS. 34-35, the housing 518 has a post or lug 519 (FIG. 34) that is received in a radial slot 479 (FIG. 35) formed in the handle post 478 to limit the rotation of user interface housing 518 relative to the handle post 478 (about 90° in the illustrative embodiment) and to prevent the user interface housing 518 from slipping off the end of the handle post 478. An O-Ring 526 (FIG. 15) is interposed between the top and bottom housings 512, 514 of the user interface 522 and the handle post 478 to provide resistance to the rotation of the user interface 522 relative to the handle post 478. In the illustrative embodiment, the user interfaces 522 rotate about 90° relative to the respective handle posts 478. In other embodiments, however, the user interface housing 518 may rotate less than or more than 90° relative to the handle post 478.

Figure 36:
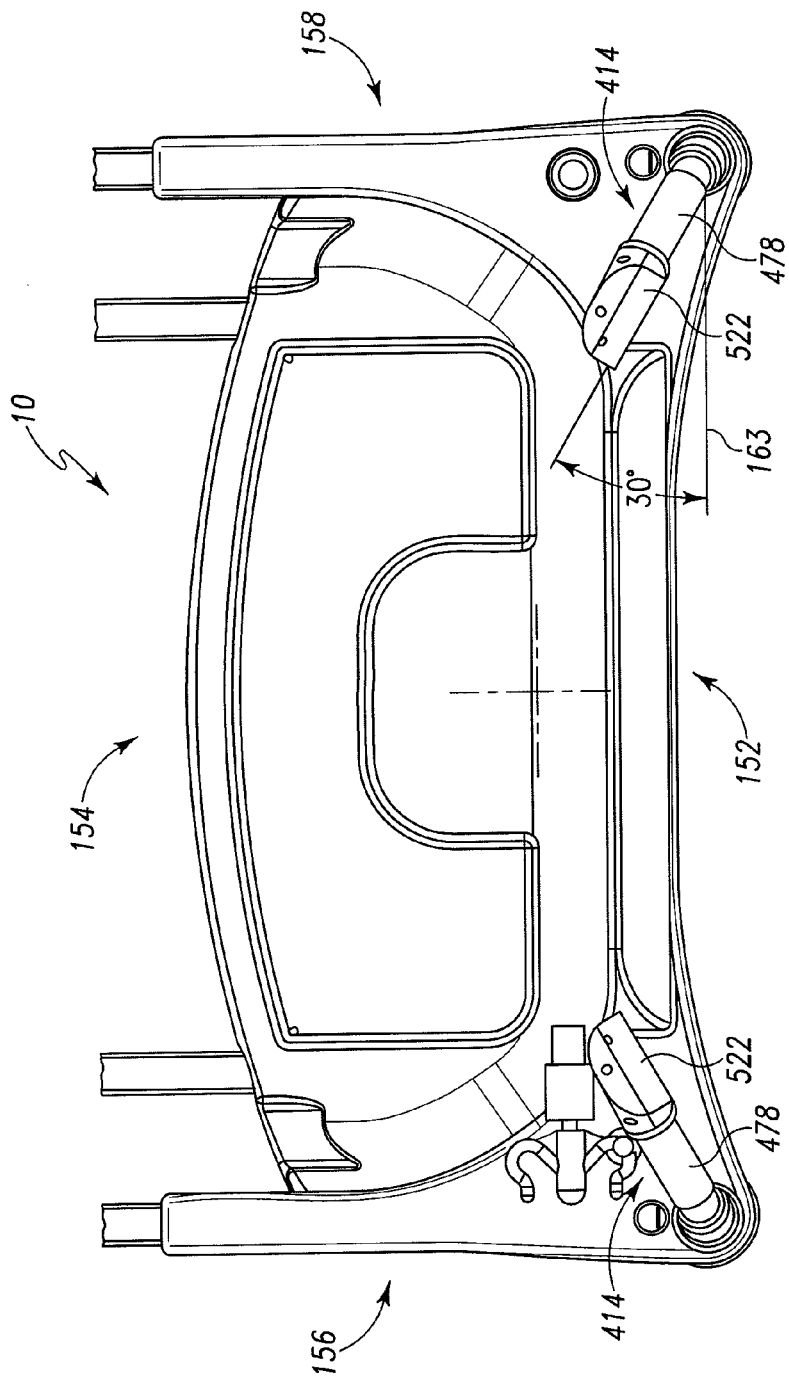
FIGS. 36-38 are top, end and side views showings the angles between the handle post carrying the user interface and the lateral, horizontal and longitudinal axes.
Figure 37:
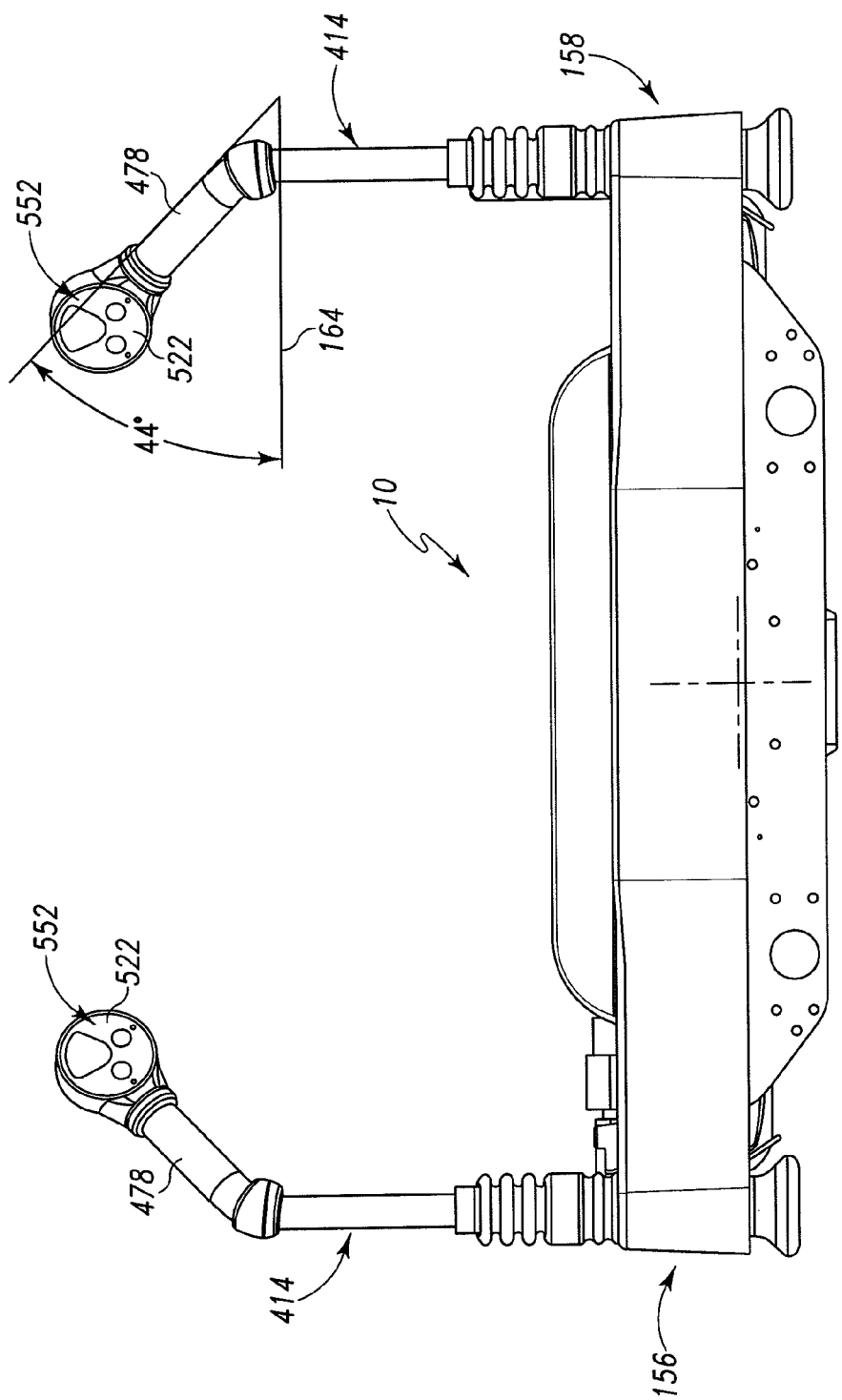
Figure 38:
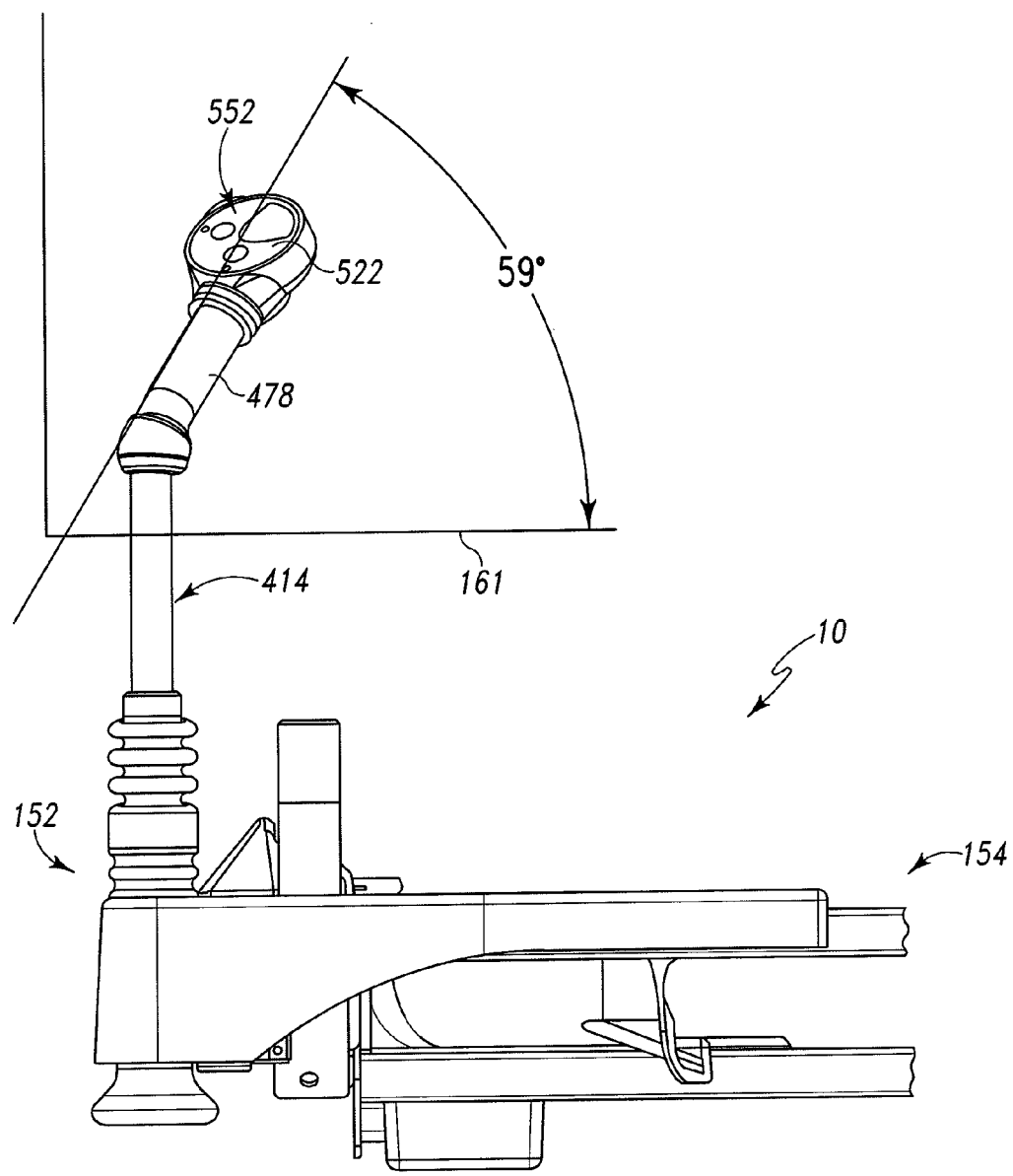

As indicated above, each handle post 478 carries the associated user interface 522 at its distal end. In the illustrative embodiment, 1) in the plan view, the angle between each handle post 478 and a lateral axis 163 is about 30° as shown in FIG. 36, 2) in the end view, the angle between each handle post 478 and a horizontal axis 164 is about 44° as shown in FIG. 37, and 3) in the side view, the angle between each handle post 478 and a longitudinal axis 161 is about 59° as shown in FIG. 38. In other embodiments, these angles may be different. In FIGS. 36-37, the user interface 522 is facing rearwardly toward a caregiver standing at the head end 152 of the apparatus 10. In FIG. 38, however, the user interface is facing upwardly so that a caregiver standing alongside the right side 158 of the apparatus 10 has access to the user interface controls 552.

Figure 31:
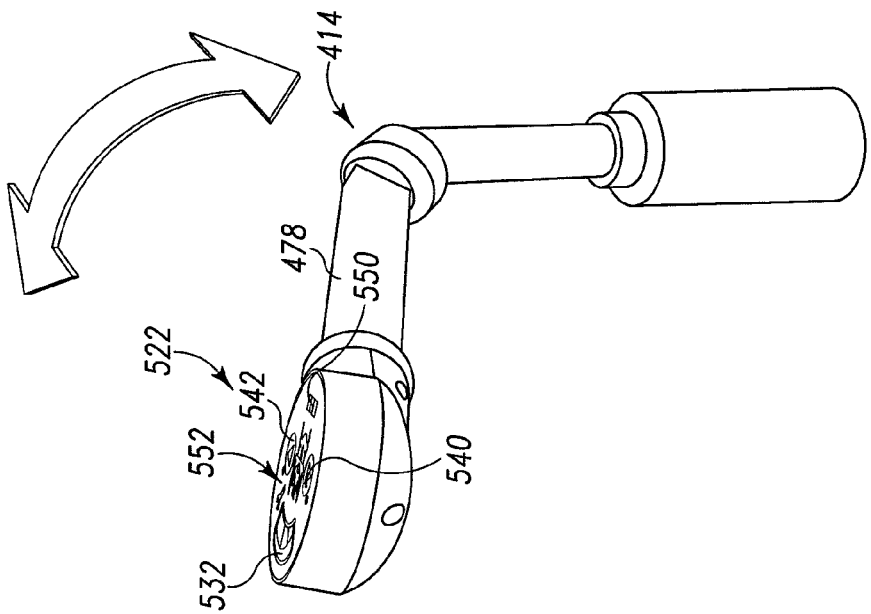
FIG. 31 is a perspective view, similar to FIG. 30, showing the push handle user interface facing generally upwardly so that a caregiver standing alongside the right side of the apparatus can grasp the handle post with her left hand as shown, for example, in FIG. 33 and operate the controls on the right hand user interface with her left thumb.

In the illustrative embodiment, the user interfaces 522 are rotatably mounted to respective handle posts 478. The user interfaces 522 are rotatable about 90° between a position where the user interfaces 522 face generally rearwardly, as shown in FIGS. 30 and 36-38, and a position where the user interfaces 522 face generally upwardly, as shown in FIGS. 31 and 38. As used in the subject specification and claims, the user interface 522 is facing generally "rearwardly" when the user interface 522 is facing a caregiver standing at the head end of the apparatus 10 and facing toward the apparatus 10.

As explained later in conjunction with FIGS. 30-33, when the user interfaces 522 are facing generally rearwardly, as shown in FIGS. 30 and 36-38, a caregiver standing at the head end 152 of the apparatus 10 can grasp one or both handle posts 478 with her hands as shown, for example, in FIG. 32 and operate the membrane switches 530, 540, 542 (collectively hereinafter referred to as the push handle user interface controls 552) on one of the push handle user interfaces 522 with her thumb. Likewise, when the user interfaces 522 are facing generally upwardly, as shown in FIGS. 31 and 38, a caregiver standing alongside one of the sides 156, 158 of the apparatus 10 can grasp the associated handle post 478 with her hand (as shown, for example, in FIG. 33 with respect to the right handle post 478) and operate the controls 552 on the push handle user interface 522 with her thumb from the associated side 156, 158 (as shown, for example, in FIG. 33 with respect to the right side 158). Thus, the rotatable push handle user interfaces 522 allow access to the user interface controls 552 from both the head end 152 and the sides 156, 158 of the apparatus 10.

Figure 16:
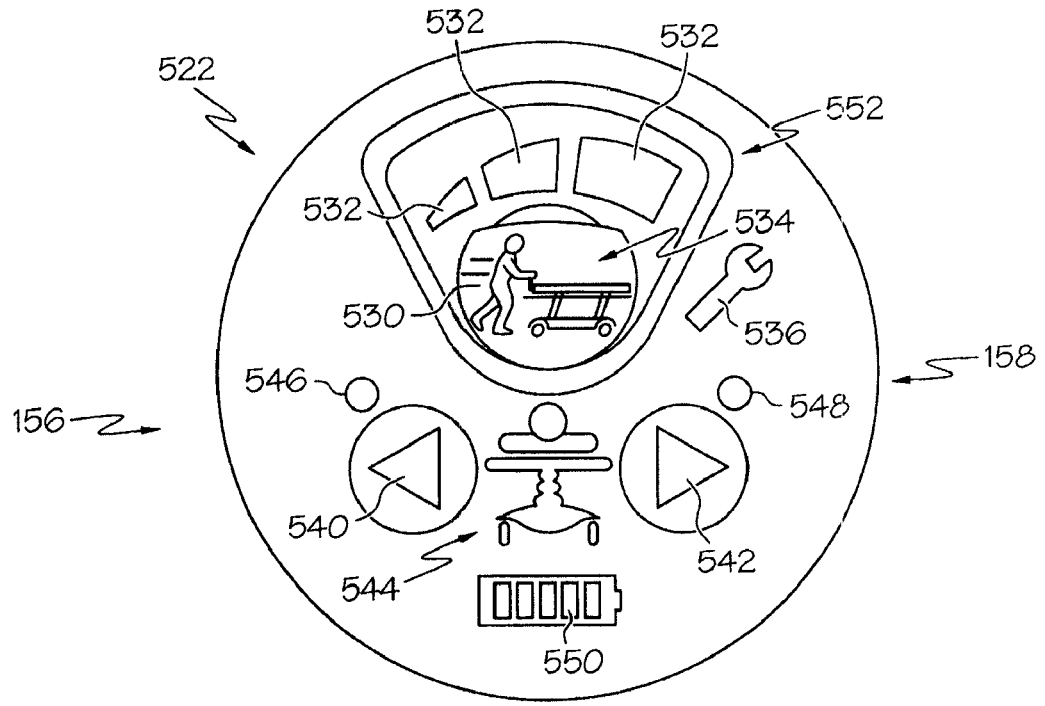
FIG. 16 is an enlarged front plan view of another embodiment of the push handle user interface of FIG. 6 showing the user interface having a speed selection button beneath three arcuately arranged speed indicator LED's near the top of the user interface, the speed selection button having an indicia showing a caregiver pushing a stretcher, a service required LED to the right of the speed selection button, a left direction button and a right direction button beneath the speed selection button, a stretcher orientation indicia between the left and right direction buttons, two LED's adjacent the respective left and right direction buttons, and battery power indicator LED's beneath the left and right direction buttons.

As shown in FIG. 16, the push handle user interface 522 includes a speed selection button 530 beneath three arcuately arranged speed indicator LED's 532 near the top of the user interface 522. The speed selection button 530 has an indicia 534 showing a caregiver pushing a stretcher. A service required LED 536 is situated to the right of the speed selection button 530. Left and right direction buttons 540, 542 are located beneath the speed selection button 530. A stretcher orientation indicia 544 is arranged between the left and right direction buttons 540, 542. Two LED's 546, 548 are provided adjacent the respective left and right direction buttons 540, 542. The battery power indicator LED's 550 are located beneath the left and right direction buttons 540, 542. Illustratively, the LED's 550 are lit from left to right to indicate the amount of charge in the battery of power supply 36 (FIG. 3).

When all LED's 550 are lit, the battery is fully charged and when no LED's 550 are lit, the battery is essentially drained of charge.

In the illustrative embodiment, each of buttons 530, 540, 542 comprises a membrane switch. It is within the scope of this disclosure, however, for other types of buttons or switches to be used, such as rocker switches, toggle switches, push button switches, and so on, as well as using a touch-screen or other type of touch sensor, in lieu of the membrane switches that embody buttons 530, 540, 542 in the illustrative example. As indicated above, the membrane switches 530, 540, 542 are located between the user interface overlay 516 and the housing 518.

Assuming all of the other necessary conditions are met, including pressing one of the push handle enable switches 520, then pushing one or both push handles 414 forwardly results in the stretcher 10 being propelled forwardly by the powered transport device 200 (FIGS. 11, 12A, and 12B), whereas pulling one or both push handles 414 rearwardly results in the stretcher 10 being propelled rearwardly by the powered transport device 200. Subsequent Presses of the speed selection button 530 (FIG. 16) selectively toggles the speed among a plurality of discrete speed settings at which the drive wheel motor 244 is operable.

Illustratively, in the disclosed example, there are three discrete speed settings, namely, a slow speed setting, a medium speed setting, and a fast speed setting. As such, the user interface 522 has three speed indicator LED's 532 to visually indicate the selected speed setting. For example, in the slow speed setting, the left-most LED 532 is on or lit and the other two LED's 532 are off or unlit. In the medium speed setting, the left-most LED 532 and the middle LED 532 are on and the right-most LED 532 is off. In the high speed setting, all three LED's 532 are on. Of course, if there are more or less than three speed settings, a corresponding number of lesser or greater LED's are included. In the illustrative embodiment, the speed selection button 530 simply scrolls in one direction and then cycles back to the beginning of the series after the highest, or the lowest, setting is reached.

Similarly, assuming all of the other necessary conditions are met, including pressing one of the push handle enable switches 520, then pressing the left direction button 540 results in the apparatus 10 being propelled by the powered transport device 200 laterally in the left direction, whereas pressing the right direction button 542 results in the apparatus 10 being propelled by the powered transport device 24 laterally in the right direction. In the illustrated example, the left and right directions are determined from the vantage point of a user standing adjacent a head end of the apparatus 10 and facing toward the apparatus 10 or from the vantage point of a patient lying in a supine or face up position on the mattress 22 with his head near the head end of the apparatus 10. The stretcher orientation indicia 544, located between the direction buttons 540, 542, provides the user with a visual indication as to the direction that the apparatus 10 will be propelled in response to the buttons 540, 542 being pressed as shown in FIG. 16.

Figure 17:
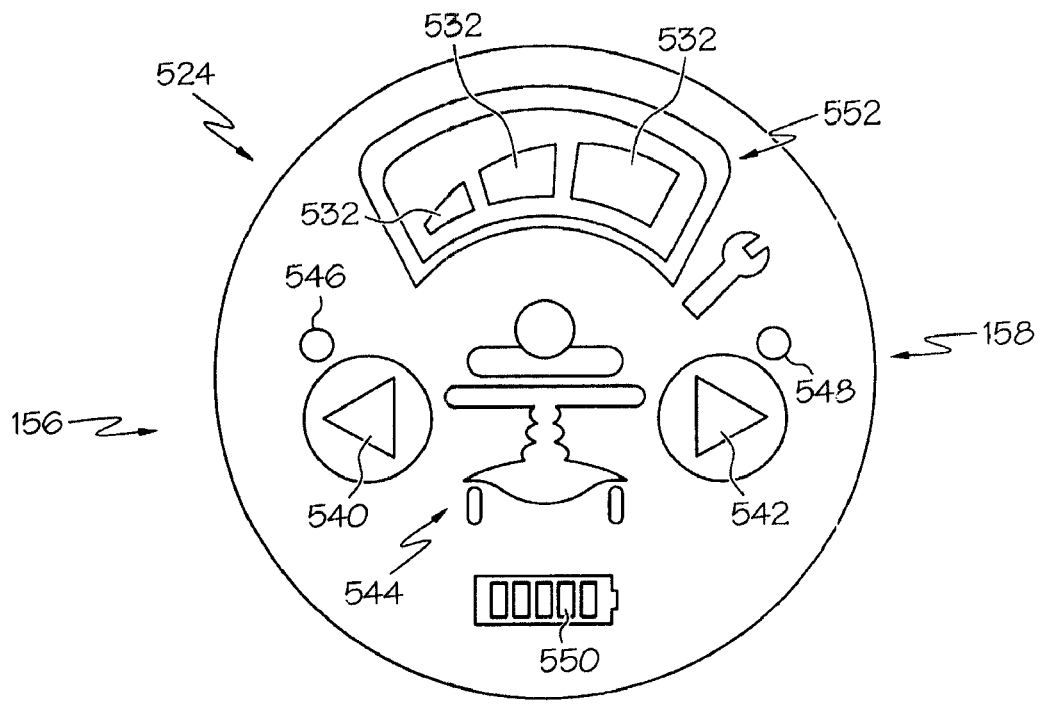
FIG. 17 is an enlarged front plan view of still another embodiment of the push handle user interface similar to the push handle user interface in FIG. 16, except that the speed selection button is omitted in the user interface of FIG. 17.

In some embodiments, only one of the two push handle assemblies 400, such as the push handle assembly 400 on the right side 158, has the push handle user interface 522 while both push handle assemblies 400 have the push handle enable switch 520 and the strain gage assembly 408. FIG. 17 shows an alternative push handle user interface 524, which is similar to the push handle user interface 522 shown in FIG. 16, except that the speed selection button 530 is omitted in the push handle user interface 524 of FIG. 17. In the FIG. 17 embodiment, the speed of the drive wheel motor 244 is proportional to the force with which one or both push handles 414 (FIG. 12A) are pushed forwardly or pulled rearwardly.

Figure 18:
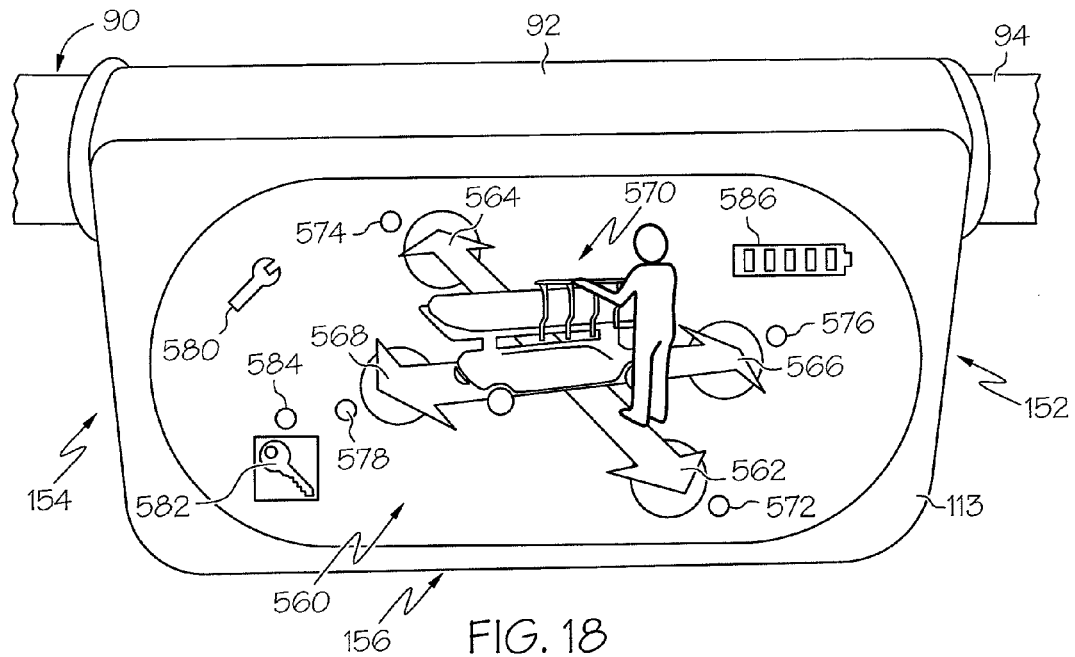
FIG. 18 is a front plan view of another embodiment of the left siderail user interface of FIG. 7 showing the user interface having left, right, forward, and reverse direction buttons arranged about an indicia showing a caregiver standing adjacent one of the sides of a stretcher, four LED's adjacent the respective left, right, forward and reverse direction buttons, a service required LED to the upper left of the left, right, forward and reverse direction buttons, an enable key button to the lower left of the left, right, forward and reverse direction buttons, an LED adjacent the enable key button, battery power indicator LED's to the upper right of the left, right, forward and reverse direction buttons, the buttons and the indicia being arranged on a generally vertically oriented surface of a user interface housing coupled to the associated siderail.
Figure 19:
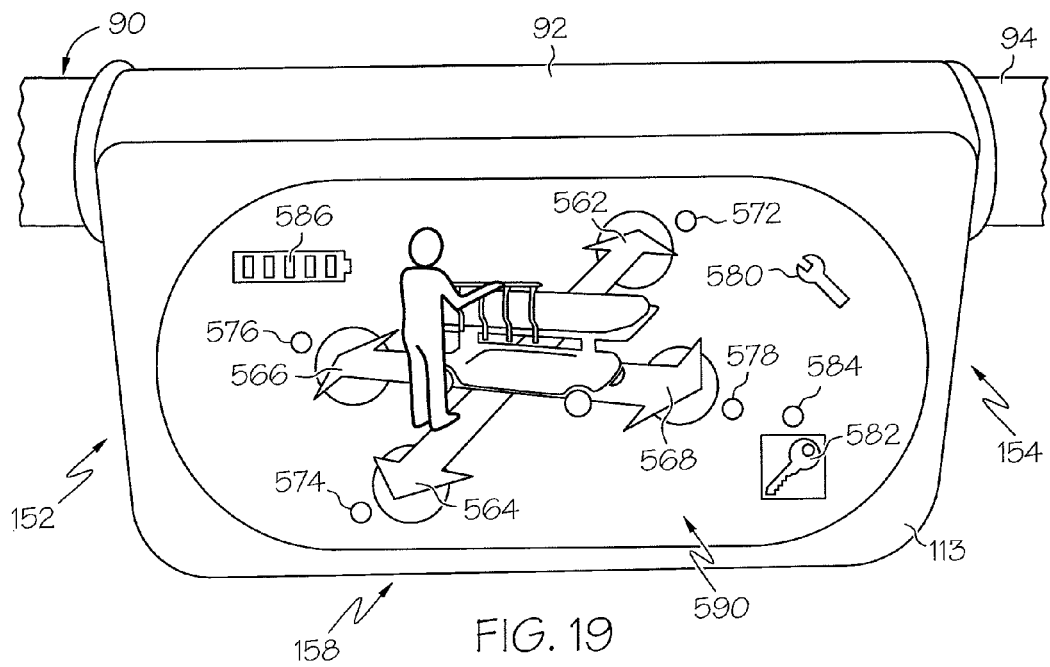
FIG. 19 is a front plan view of a right siderail user interface similar to the left siderail user interface of FIG. 18.

FIG. 18 shows an alternative left siderail user interface 560, which is similar to the left siderail user interface 34 shown in FIG. 7. The left siderail user interface 560 includes left, right, forward, and reverse direction buttons 562, 564, 566, 568 arranged about an indicia 570 showing a caregiver standing adjacent a left side 156 of the apparatus 10 near a head end 152 thereof. Four LED's 572, 574, 576, 578 are located adjacent the respective left, right, forward and reverse direction buttons 562, 564, 566, 568. A service required LED 580 is situated to the upper left of the left, right, forward and reverse direction buttons 562, 564, 566, 568. An enable key button 582 is arranged to the lower left of the left, right, forward and reverse direction buttons 562, 564, 566, 568. An LED 584 is provided adjacent the enable key button 582. A battery power indicator LED's 586 is situated to the upper right of the left, right, forward and reverse direction buttons 562, 564, 566, 568. Illustratively, the LED's 586 are lit from left to right to indicate the amount of charge in the battery of power supply 36 (FIG. 3). When all LED's 586 are lit, the battery is fully charged and when no LED's 550 are lit, the battery is essentially drained of charge. The buttons 562, 564, 566, 568, 582, the indicia 570, and the LED's 572, 574, 576, 578, 580, 584, 586 are all arranged on a generally vertically oriented surface 113 of a user interface housing 92 coupled to the associated siderail 90. FIG. 19 shows a right siderail user interface 590 which is mirror image of the left siderail user interface 560 of FIG. 18.

Assuming all of the other necessary conditions are met, including pressing one of the push handle enable switches 520, then pressing the left direction button 562 results in the stretcher 10 being propelled by the powered transport device 200 laterally in the left direction, whereas pressing the right direction button 564 results in the stretcher 10 being propelled by the powered transport device 200 laterally in the right direction. Likewise, assuming all of the other necessary conditions are met, including pressing one of the push handle enable switches 520, then pressing the forward direction button 566 results in the stretcher 10 being propelled forwardly by the powered transport device 200, whereas pressing the rearward direction button 568 results in the stretcher 10 being propelled rearwardly by the powered transport device 200. The stretcher orientation indicia 570, located between the buttons 562, 564, 566, 568, provides the user with a visual indication as to the direction that the stretcher 10 will be propelled in response to the direction buttons 562, 564 being pressed as shown in FIGS. 18 and 19.

If the drive wheel 226 is in the first orientation when one of the left and right direction buttons 540, 542 on the associated push handles 414 is pressed simultaneously with the push handle enable switch 520, then the controller 30 will command the swivel assembly 370 to move the drive wheel 226 from the first orientation to the second orientation prior to commanding the drive wheel motor 244 to rotate the wheel 226 to propel the stretcher 10 leftward or rightward, as the case may be. Likewise, if the drive wheel 226 is in the first orientation when one of the left and right direction buttons 562, 564 on a siderail 90 is pressed simultaneously with the siderail enable key button 582, then the controller 30 will command the swivel assembly 370 to move the wheel 226 from the first orientation to the second orientation prior to commanding the drive wheel motor 244 to rotate the wheel 226 to propel the stretcher 10 leftward or rightward, as the case may be.

Similarly, if the drive wheel 226 is in the second orientation when one of the push handles 414 is pushed forwardly or pulled rearwardly simultaneously with engaging the push handle enable switch 520, then the controller 30 will command the swivel assembly 370 to move the drive wheel 226 from the second orientation to the first orientation prior to commanding the drive wheel motor 244 to rotate the wheel 226 to propel the stretcher 10 forwardly or rearwardly, as the case may be. Likewise, if the drive wheel 226 is in the second orientation when one of the forward and rearward direction buttons 566, 568 on a siderail 90 is pressed simultaneously with the siderail enable key button 582, then the controller 30 will command the swivel assembly 370 to move the drive wheel 226 from the second orientation to the first orientation prior to commanding the drive wheel motor 244 to rotate the wheel 226 to propel the stretcher 10 forwardly or rearwardly, as the case may be.

In some embodiments, the push handle direction buttons 540, 542 (FIGS. 16-17) include an enable switch layer so that when one of the push handle direction buttons 540, 542 is activated, the enable switch incorporated therein is also activated simultaneously therewith. In such embodiments, the push handle direction buttons 540, 542 operate independently of the push handle enable switch 520. In other words, in such embodiments, there is no need to activate the push handle enable switch 520 simultaneously with the activation of a push handle direction button 540, 542. In some embodiments, activation of a siderail enable key button 582 (FIGS. 18-19) starts a timer, nominally 10 seconds, during which time the controller 30 (FIG. 3) will respond to activations of the siderail direction buttons 562, 564, 566, 568 (FIGS. 18-19). Activating a single siderail direction button 562, 564, 566, 568 while the timer is running causes the controller 30 to signal the device 200 with that direction and low speed. Simultaneous activation of multiple direction buttons 562, 564, 566, 568 causes the controller 30 to signal the device 200 to stop motion. Similarly, the release of all siderail direction buttons 562, 564, 566, 568 causes the controller 30 to signal the device 200 to stop motion. Activation of any of the siderail direction buttons 562, 564, 566, 568 before the timer expires will restart the timer. If the timer expires, subsequent activation of siderail direction buttons 562, 564, 566, 568 will not cause the controller 30 to signal the device 200 to command motion.

Two LED's 546, 548 are located adjacent the respective left and right direction buttons 540, 542 on the push handles 414 and are on or lit when the corresponding button 540, 542 is pressed. Likewise, two LED's 572, 574 are located adjacent the respective left and right direction buttons 562, 564 on the siderails 90 and are on or lit when the corresponding button 562, 564 is pressed. Similarly, two LED's 576, 578 are located adjacent the respective forward and rearward direction buttons 566, 568 on the siderails 90 and are on or lit when the corresponding button 566, 568 is pressed.

In some embodiments, however, LED's 546, 548 located adjacent the respective left and right direction buttons 540, 542 on the push handles 414 are on or lit when the drive wheel 226 is in the second orientation and are off when the wheel 226 is in the first orientation. Likewise, LED's 572, 574 located adjacent the respective left and right direction buttons 562, 564 on the siderails 90 are on or lit when the drive wheel 226 is in the second orientation and are off when the wheel 226 is in the first orientation. Similarly, LED's 576, 578 located adjacent the respective forward and rearward direction buttons 566, 568 on the siderails 90 are on or lit when the drive wheel 226 is in the first orientation and are off when the wheel 226 is in the second orientation.

In such embodiments, LED's 546, 548, 572, 574, 576, 578 provide a visual indication as to the orientation of the drive wheel 226. Based on the status of the LED's 546, 548, 572, 574, 576, 578, a user can determine whether to expect a slight delay after attempting to propel the apparatus 10 due to the wheel 226 being re-oriented from the first orientation to the second orientation, or vice versa. In some embodiments, the speed setting in the left and right directions defaults to the low speed setting regardless of what speed setting is otherwise selected using the speed selection button 530 (FIG. 16) for the forward and reverse directions. Of course, having slow, medium, and fast settings for the left and right directions are contemplated by this disclosure.

Figure 20:
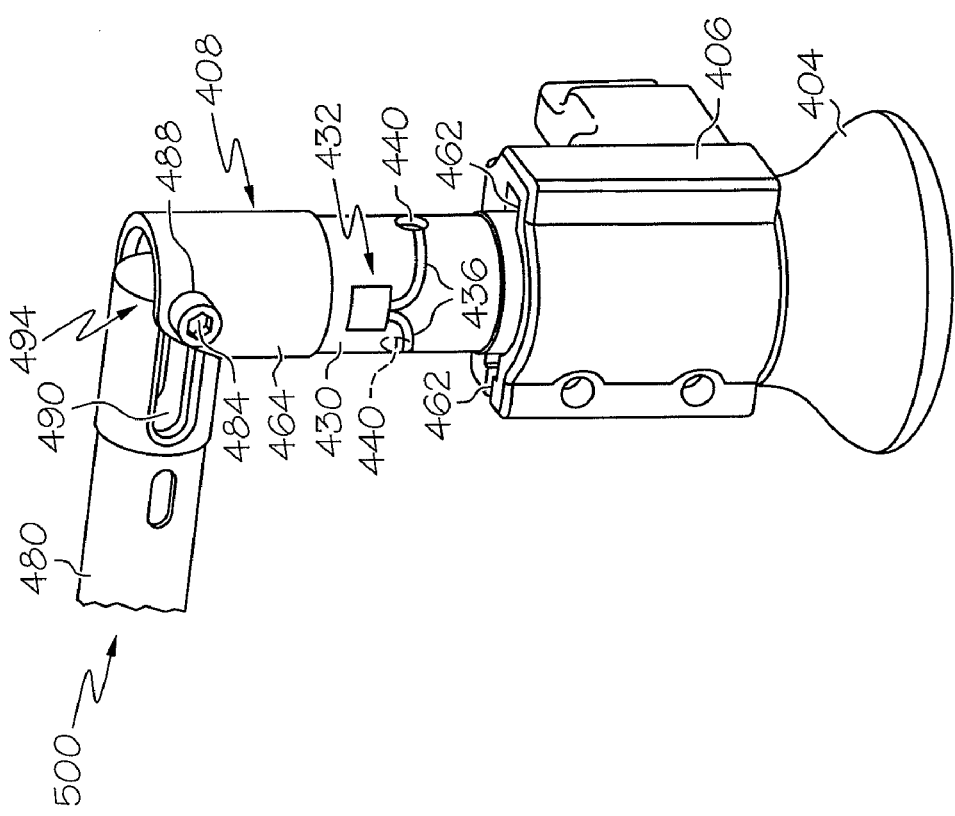
FIG. 20 is a perspective view, with portions broken away, of the push handle assembly of FIGS. 13-15 showing the push handle folded downwardly about a pivot pin to a stowed position after the push handle is first pulled upwardly.
Figure 26:
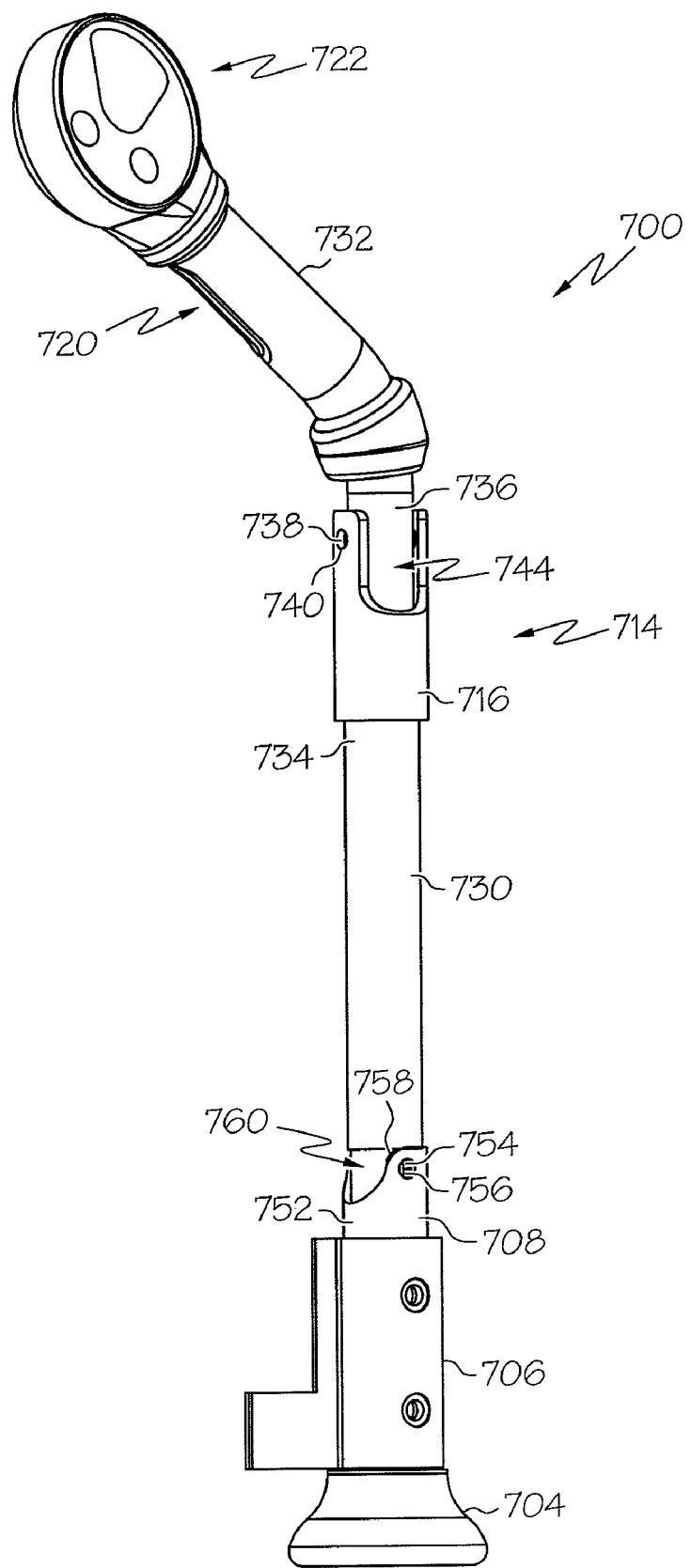
FIG. 26 is a perspective view of still another embodiment of the push handle assembly of FIGS. 13-15.

As indicated above with reference to the push handle assembly 400 shown in FIGS. 13-15, to pivot the push handle 414 downwardly to the out-of-the-way stowed position as shown, for example, in FIG. 20, the push handle 414 is first pulled upwardly wherein the longitudinally-extending pivot pin 484 slides within the elongated vertically-extending straight slots 490 in the lower portion 480 of the bent tube 500 of the push handle 414. The push handle 414 is then folded downwardly into the inwardly-facing clearance notch 494 formed in the upper portion 464 of the mounting tube 430 of the strain gage assembly 408. The sequence of steps is reversed to move the push handle 414 back to the upright use position. FIGS. 21-25 show portions of an alternative push handle assembly 600, which is substantially similar to the push handle assembly 400 shown in FIGS. 13-15, with a few exceptions described below. For example, the push handle 414 has helical slots 608, (FIGS. 21-23) instead of straight slots 490 (FIGS. 14-15 and 20). Like reference numerals are used to denote like elements of these push handle assemblies 400, 600. The strain gage shield 410 is omitted in FIGS. 20-25 to promote clarity.

Figure 21:
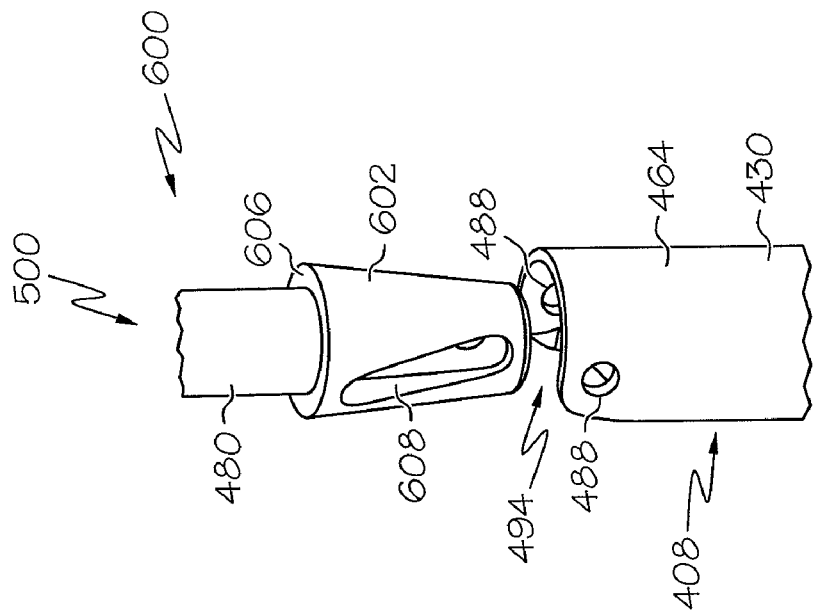
FIG. 21 is a perspective view, with portions broken away, of another embodiment of the push handle assembly of FIGS. 13-15 showing a lower end of the push handle having a tapered sleeve which is configured to be received in a tapered socket formed in an upper region of the strain gage assembly, the opposite sidewalls of the tapered sleeve of the push handle having elongated generally helical slots for receiving the longitudinally-extending pivot pin extending through the opposite sidewalls of the strain gage assembly, the pivot pin sliding within the elongated generally helical slots to allow the push handle to be pulled upwardly and then folded downwardly to a folded stowed position and to allow the push handle to be pivoted upwardly and then lowered downwardly into the socket to an upright use position, the push handle turning inwardly about a vertical axis into a more ergonomic position for a caregiver as the push handle is lowered into the socket to the upright use position after it is first moved to a generally vertical position from the folded stowed position.

As shown in FIGS. 21-23, the push handle assembly 600 includes a tapered sleeve 602 coupled to the lower end 480 of the bent tube 500 of the push handle 414. The tapered sleeve 602 is configured to be received in a tapered socket 604 (FIGS. 21 and 24-25) formed in the upper portion of the interior region of the mounting tube 430 of the strain gage assembly 408. The tapered sleeve 602 and the tapered socket 604 have non-locking taper angles, such as, for example, 12°. The reception of the tapered sleeve 602 having a non-locking taper in the tapered socket 604 also having non-locking taper reduces rattling between the push handle 414 and the mounting tube 430 when the push handle 414 is moved to the upright use position while allowing easy separation of the tapered sleeve 602 from the tapered socket 604 when the push handle 414 is pulled upwardly so that it can be folded downwardly to the stowed position.

Opposite sidewalls 606 of the tapered sleeve 602 are formed to include a pair of elongated generally helical slots 608 as shown in FIGS. 21-23. The longitudinally-extending pivot pin 484 (FIG. 20) extends through the openings 488 in the opposite sidewalls of the mounting tube 430 and extends through the helical slots 608 in the tapered sleeve 602 attached to the lower end 480 of the bent tube 500 of the push handle 414. As the push handle 414 is lowered into the tapered socket 604 to the upright use position after it is first moved to a generally vertical position from the folded stowed position, the handgrip 510 of the push handle 414 is turned inwardly about a generally vertical axis into a more ergonomic position for a caregiver. On the other hand, the handgrip 510 of the push handle 414 is turned outwardly about the generally vertical axis when the push handle 414 is pulled upwardly before it is pivoted downwardly to the folded-down stowed position. As shown in FIGS. 22-23, an inwardly-facing cutout 610 is formed in a sidewall 606 of the tapered sleeve 602 attached to the lower end 480 of the bent tube 500 of the push handle 414 for allowing the wires from the push handle enable switch 520 and the wires from the push handle user interface 522 to pass through when the push handle 414 is folded down.

FIGS. 26-29 show an alternative push handle assembly 700, which is substantially similar to the push handle assembly 400 of FIGS. 13-15, with a few exceptions. For example, each push handle assembly 700 includes a single pole double throw (SPDT) switch assembly 702 instead of the strain gage assembly 408 and the shield 410. The SPDT switch assembly 702 performs a function generally similar to the function performed by the forward and reverse switches 52, 54 (FIGS. 5A and 5B) situated within an interior region of the associated push handle 50. For example, as indicated above in connection with the switches 52, 54, when the push handle 50 is pushed forwardly, the forward switch 52 is moved to an on position from an off position. On the other hand, when the push handle 50 is pulled rearwardly, the reverse switch 54 is moved to an on position from an off position. When the user lets go of the push handle 50, it returns to a neutral position having both switches 52, 54 in the respective off positions.

As shown in FIGS. 26-29, each push handle assembly 700 comprises the SPDT switch assembly 702, a bumper 704, a mounting bracket 706 that couples to the upper frame 14 (FIG. 1) of the apparatus 10, a mounting tube 708, bellows (similar to the bellows 412 in FIG. 14), a push handle 714, a pivot tube 716, a handgrip 718, a push handle enable switch 720 (similar to the push handle enable switch 520 shown in FIGS. 14-15), and a push handle user interface 722 (similar to the push handle user interface 522 shown in FIGS. 14-16). The push handle 714 includes a lower straight tube 730 and an upper bent tube 732.

The pivot tube 716 is coupled to an upper portion 734 of the straight tube 730. The switch assembly 702 is received in an interior region of a lower portion 736 of the bent tube 732. The lower portion 736 of the bent tube 732 is, in turn, received in an interior region of the pivot tube 716. A laterally-extending pivot pin 738 extends through a pair of laterally-aligned openings 740 in the opposite sidewalls of the pivot tube 716, extends through a pair of laterally-aligned openings 742 in the opposite sidewalls of the lower portion 736 of the bent tube 732, and extends through a laterally-extending opening 778 in the switch housing 770. The pivot tube 716 and lower portion 736 of the bent tube 732 are sized so that the bent tube 732 is pivotable by a slight amount about the laterally-extending pivot pin 738 when the push handle 714 is pushed forwardly to propel the apparatus 10 forwardly or pulled rearwardly to propel the apparatus 10 rearwardly. As explained below, the bent tube 732, and the switch assembly 702 coupled thereto, are biased to return to a neutral position when the user lets go of the push handle 714. A pair of longitudinally-aligned cutouts 744 are formed in the opposite sidewalls of the pivot tube 716 to allow the slight pivoting movement of the bent tube 732 relative to the straight tube 730.

A lower portion 750 of the straight tube 730 of the push handle 714 is received in an interior region of an upper portion 752 of the mounting tube 708. A longitudinally-extending pivot pin 754 extends through a pair of longitudinally-aligned openings 756 in the opposite sidewalls of the mounting tube 708 and extends through a pair of longitudinally-aligned elongated slots 758 in the opposite sidewalls of the lower portion 750 of the straight tube 730. To pivot the push handle 714 downwardly to an out-of-the-way stowed position, the push handle 714 is first pulled upwardly wherein the pin 754 slides within the elongated slots 758 in the lower portion 750 of the straight tube 730. The push handle 714 is then folded downwardly into an inwardly-facing clearance notch 760 formed in the upper portion 752 of the mounting tube 708. To move the push handle 714 back to an upright use position, the sequence of steps is reversed.

Figure 27:
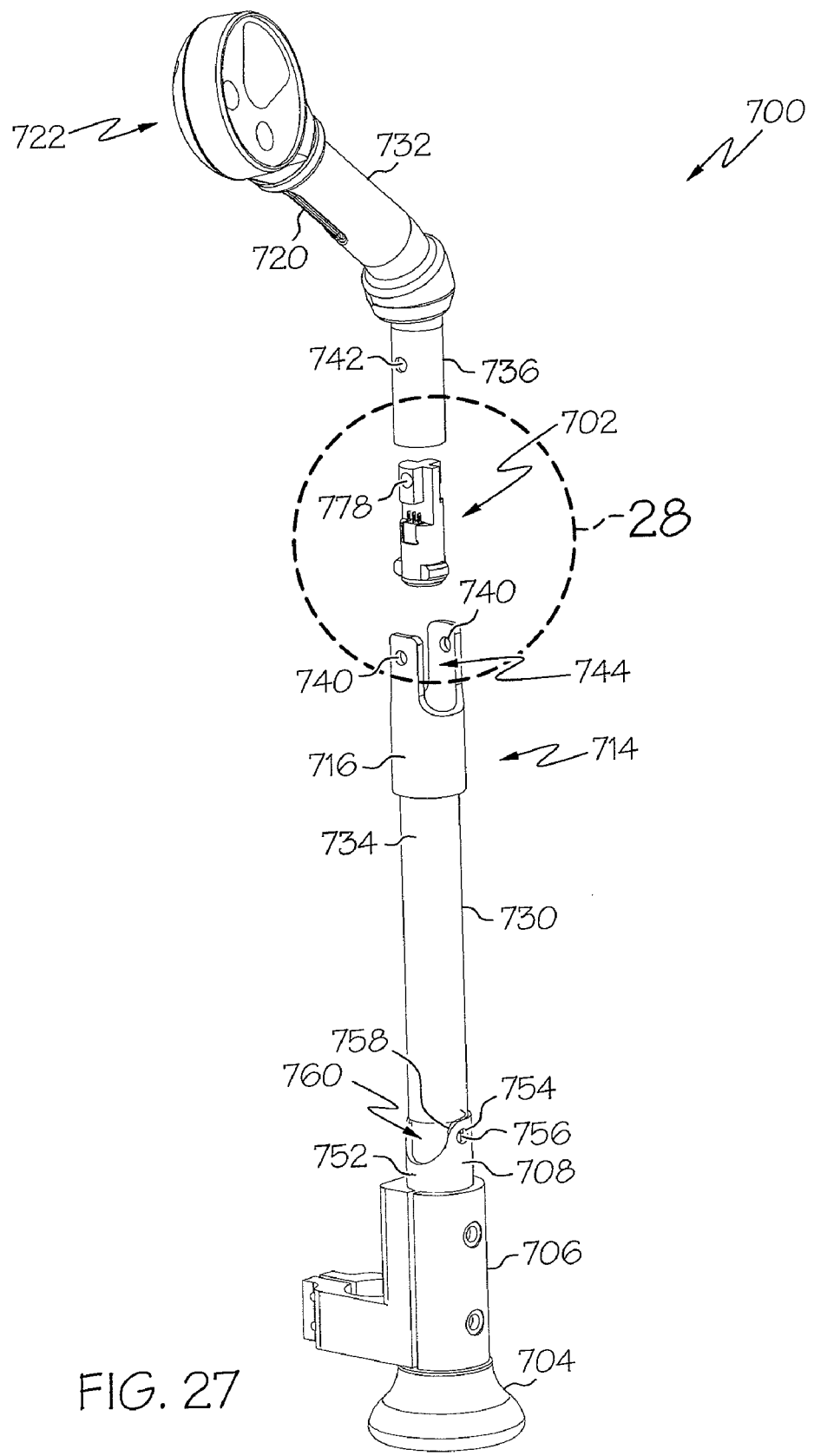
FIG. 27 is a partially exploded perspective view of the push handle assembly of FIG. 26 showing an SPDT switch assembly disposed between an upper portion of the push handle and a lower portion of the push handle.
Figure 28:
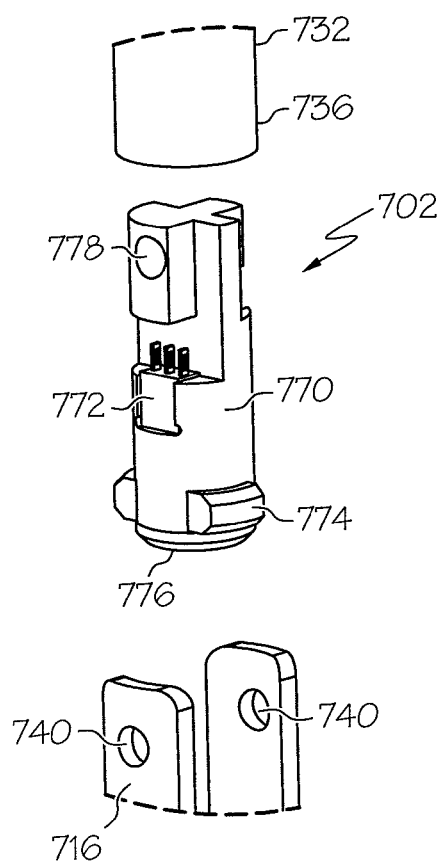
FIG. 28 is an enlarged perspective view of the SPDT switch assembly of FIG. 27.
Figure 29:
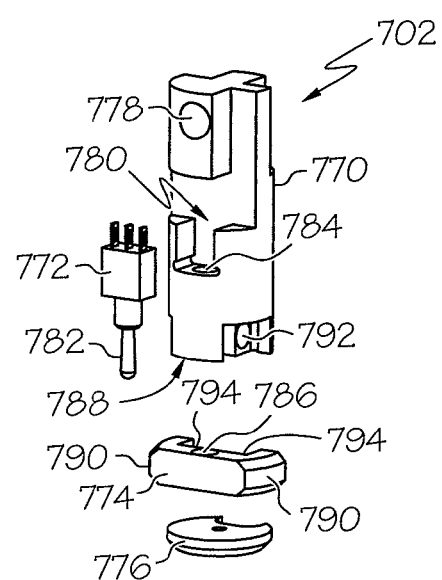
FIG. 29 is an exploded perspective view of the SPDT switch assembly of FIGS. 27-28 showing a switch housing, an SPDT switch to the left of the switch housing, a slider below the switch housing, and retainer below the slider.

As shown in FIGS. 27-29, the switch assembly 702 includes a switch housing 770, an SPDT switch 772, a slider 774, and retainer 776. As indicated above, the switch assembly 702 is received in an interior region of the lower portion 736 of the bent tube 732 for pivoting movement therewith about the laterally-extending pivot pin 738. The lower portion 736 of the bent tube 732 is, in turn, received in an interior region of the pivot tube 716 coupled to the upper portion 734 of the straight tube 730. The housing 770 has a forwardly-facing switch-receiving cavity 780 for receiving the switch 772. The switch 772 has an actuator 782 that extends through a relatively large opening 784 in the housing 770 and an opening 786 in the slider 774. The slider 774 is received in a downwardly-facing slider-receiving cavity 788 in the housing 770 for side-to-side movement in a longitudinal direction in response to pivoting movement of the bent tube 732 about the laterally-extending pin 738. The retainer 776 is secured to an underside of the housing 770 by suitable fasteners to prevent the slider 774 from falling off. The slider 774 has laterally-extending outer walls 790 that abut associated laterally-extending inner walls of the pivot tube 716 when lower portion 736 of the bent tube 732 is received in the interior region of the pivot tube 716.

The switch assembly 702 includes compression springs (not shown) which are located in pockets 792 in the housing 770. Each spring is held in a state of compression between a wall of the housing 770 and a laterally extending inner wall 794 of the slider 774 to bias the bent tube 732, and the switch assembly 702 coupled thereto, to return to a neutral or off position when the user lets go of the push handle 714. When the push handle 714 is pushed forwardly, the slider 774 stays in place while the switch 772 pivots with the bent tube 732 of the push handle 714 about the laterally-extending pin 738 to cause the actuator 782 of the switch 772 to move in a first direction relative to the switch housing 770 to send a first input signal to the controller 30 (FIG. 3). On the other hand, when the push handle 714 is pulled rearwardly, the actuator 782 of the switch 772 moves in a second opposite direction relative to the switch housing 770 to send a second input signal to the controller 30. When the user lets go of the push handle 714, the compression springs cause to bent tube 732 of the push handle 714, and the switch assembly 702 coupled thereto, to return to the neutral or off position.

In some embodiments, the powered transport device 200 (FIGS. 11, 12A and 12B) has a transport mode of operation and an adjustment mode of operation. The transport mode consists of relatively long movements in the forward and reverse directions, such as those encountered between a patient room and a diagnostic area. The adjustment mode, on the other hand, consists of relatively short movements, typically two meters or less, to reposition the apparatus 10 within a patient room. In the transport mode, the device 200 is typically operable at different speeds, whereas, in the adjustment mode, the device 200 is typically operable only at a slow speed for precise positioning of the apparatus 10 in the room.

In some embodiments, in the transport mode, the controller 30 (FIG. 3) is configured to latch the activation of the forward and reverse switches, such as, for example, the forward and reverse switches 52, 54 (FIGS. 5A and 5B). Upon such latching and simultaneous activation of a push handle enable switch 520 (FIG. 14), the controller 30 signals the device 200 to command motion in the selected direction and at the selected speed. The controller 30 will continue to signal the device 200 at this speed and direction even if the latched direction switch 52, 54 becomes inactive as long as the push handle enable switch 520 is activated and as long as a direction switch 52, 54 that opposes the currently latched direction is not activated. If a different speed is selected while such motion is underway, the controller 30 will continue to signal motion to the device 200, but at the new speed.

Activation of a direction switch 52, 54 that opposes the currently latched direction cancels the latched direction and the controller 30 signals the device 200 for motion in the opposite direction at the selected speed. In the event of such a cancellation, a timer is started which prevents latching of the new direction. At this point, the direction switch 52, 54 will operate in an activate-to-run mode. In this case, as soon as the switch 52, 54 is no longer activated, the controller 30 signals the device 200 to stop. The timer duration is long enough to bring the apparatus 10 to a stop but not so long as to be a nuisance in the event that the user intends sustained motion in the new direction. In an illustrative embodiment, this is approximately two seconds. When the timer expires, the latching of the now current direction is permitted allowing motion in that direction, at the appropriate speed by maintaining only activation of the push button enable switch 520.

When a direction switch 52, 54 and the push button enable switch 520 are simultaneously activated, a timer, nominally 10 seconds, is reset. This timer is reset as long as motion is commanded by the user. If the user ceases to command motion, the timer begins to run. Until the timer expires, the selected speed is remembered so that if a user again commands motion within the duration of the timer, the controller 30 signals the device 200 to initiate motion at the previously selected speed. In some embodiments, if the timer expires before the user commands motion, the controller 30 resets the speed to the default (low) speed. Subsequent commanded motion causes the controller 30 to signal the device 200 to run at the default speed if a different speed is not selected.

In some embodiments, activation of a siderail enable key button 582 FIGS. 18-19) starts a timer, nominally 10 seconds, during which time the controller 30 will respond to activations of the siderail direction buttons 562, 564, 566, 568 (FIGS. 18-19). Activating a single siderail direction button 562, 564, 566, 568 while the timer is running causes the controller 30 to signal the device 200 with that direction and low speed. Simultaneous activation of multiple direction buttons 562, 564, 566, 568 causes the controller 30 to signal the device 200 to stop motion. Similarly, the release of all siderail direction buttons 562, 564, 566, 568 causes the controller 30 to signal the device 200 to stop motion. Activation of any of the siderail direction buttons 562, 564, 566, 568 before the timer expires will restart the timer. If the timer expires, subsequent activation of siderail direction buttons 562, 564, 566, 568 will not cause the controller 30 to signal the device 200 to command motion.

In some embodiments, both the left and right push handles 414 near the head end 152 have user interfaces 522 (FIGS. 16-17) and, in addition, both the left and right siderails 90 have user interfaces 560, 590 (FIGS. 18-19). In other embodiments, only the left and right push handles 414 have user interfaces 522 (FIGS. 36-37) and the left and right siderail user interfaces 560, 590 are dispensed with. In still other embodiments, only one push handle 414, such as, for example, the push handle 414 on the right side 158, has a user interface 522.

As indicated above, each handle post 478 carries the associated user interface 522 at its distal end. In the illustrative embodiment, 1) in the plan view, the angle between each handle post 478 and a lateral axis 163 is about 30° as shown in FIG. 36, 2) in the end view, the angle between each handle post 478 and a horizontal axis 164 is about 44° as shown in FIG. 37, and 3) in the side view, the angle between each handle post 478 and a longitudinal axis 161 is about 59° as shown in FIG. 38. In other embodiments, these angles may be different. In FIGS. 36-37, the user interface 522 is facing rearwardly so that a caregiver standing at the head end 152 of the apparatus 10 has access to the user interface controls 552 as shown in FIG. 32. In FIG. 38, however, the user interface is facing upwardly so that a caregiver standing alongside the right side 158 of the apparatus 10 has access to the user interface controls 552 as shown in FIG. 33.

The left and right push handle user interfaces 522 are mirror images of each other. Thus, the description that follows of the right push handle user interface 522 is applicable to both. As indicated above, the rotatable push handle user interface 522 allows access to the push handle user interface controls 552 from both the head end 152 and the left and right sides 156, 158 of the apparatus 10. This feature is especially useful where the siderail user interfaces 560, 590 (FIGS. 18-19) are dispensed with, since the rotatable push handle user interfaces 522 provide access to the user interface controls 552 from both the head end 152, as well as the left and right sides 156, 158 of the apparatus 10, as shown, for example, in FIGS. 32-33, respectively, without requiring siderail user interfaces 560, 590.

Figure 30:
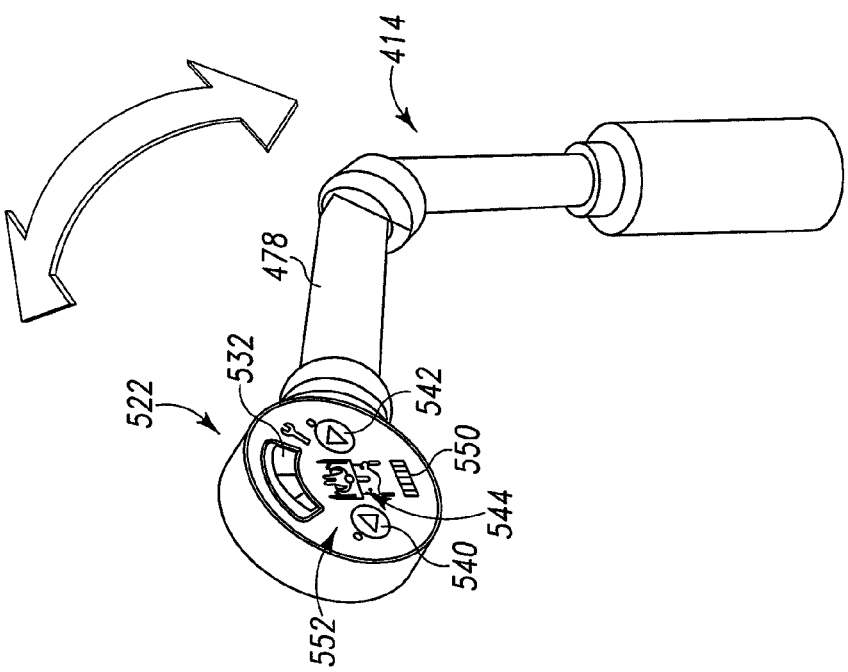
FIG. 30 is a perspective view of a push handle user interface, similar to the user interface shown in FIGS. 16 and 17, coupled to a handle post of a push handle located at the head end of the apparatus on the right side thereof showing the user interface facing generally rearwardly so that a caregiver standing at the head end of the apparatus can grasp the handle post with her right hand as shown, for example, in FIG. 32 and operate the controls on the right hand user interface with her right thumb.

In the illustrative embodiment, the user interfaces 522 are rotatable about 90° between a position where the user interfaces 522 face generally rearwardly as shown in FIGS. 30 and 36-37 and a position where the user interfaces 522 face generally upwardly as shown in FIGS. 31 and 38. As used in the subject specification and claims, the user interface 522 is "facing rearwardly" when the user interface 522 is facing a caregiver standing at the head end 152 of the apparatus 10 and facing toward the apparatus 10. When the user interfaces 522 are facing generally rearwardly as shown in FIGS. 30 and 37, the push handle user interface controls 552 are presented to a caregiver standing at the head end 152 of the apparatus 10 so that she can grasp one or both handle posts 478 with her hands as shown, for example, in FIG. 32 and operate the push handle controls 552 on one of the push handle user interfaces 522 with her thumb. Likewise, when the user interfaces 522 are facing generally upwardly as shown in FIGS. 31 and 38, the push handle user interface controls 552 are presented to a caregiver standing alongside one of the sides 156, 158 of the apparatus 10 so that she can grasp the associated handle post 478 with her hand (as shown, for example, in FIG. 33 with respect to the right handle post 478) and operate the push handle controls 552 on the push handle user interface 522 with her thumb from the associated side 156, 158 (as shown, for example, in FIG. 33 with respect to the right side 158).

When a caregiver is standing on the right side 158 of the apparatus 10 as shown, for example, in FIG. 33, the user interface 522 carried by the right push handle 414 is rotated upwardly and the caregiver grasps the right handle post 478 with her left hand as shown, for example, in FIG. 33 and operates the push handle user interface controls 552 with her left thumb. Likewise, when the caregiver is standing on the left side 158 of the apparatus 10, the user interface 522 carried by the left push handle 414 is rotated upwardly and the caregiver grasps the left handle post 478 with her right hand and operates the push handle controls 552 with her right thumb.

Figure 34:
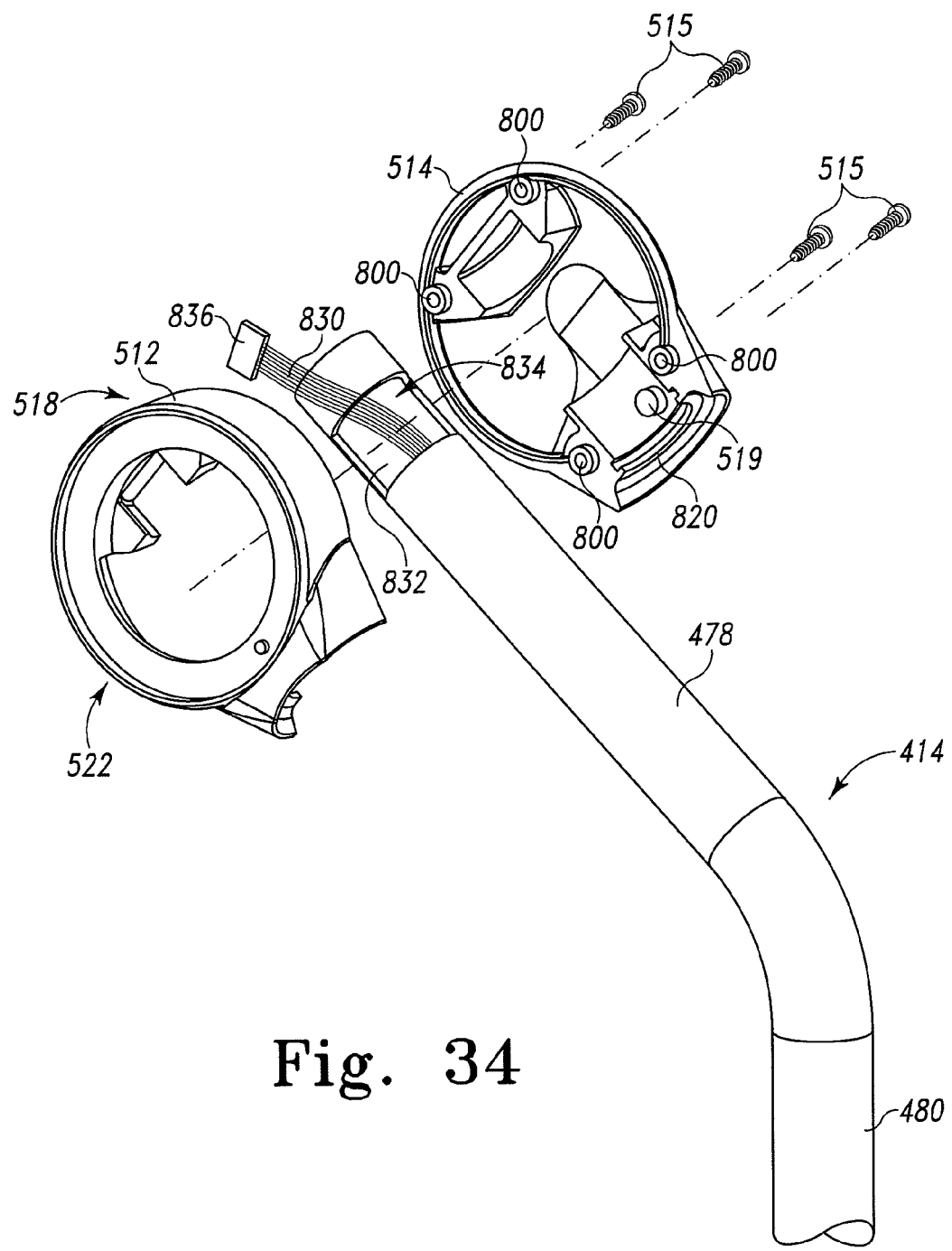
FIGS. 34 and 35 are exploded perspective views showing top and bottom halves of the user interface housing arranged on opposite sides of the handle post to which they are secured by suitable fasteners.
Figure 35:
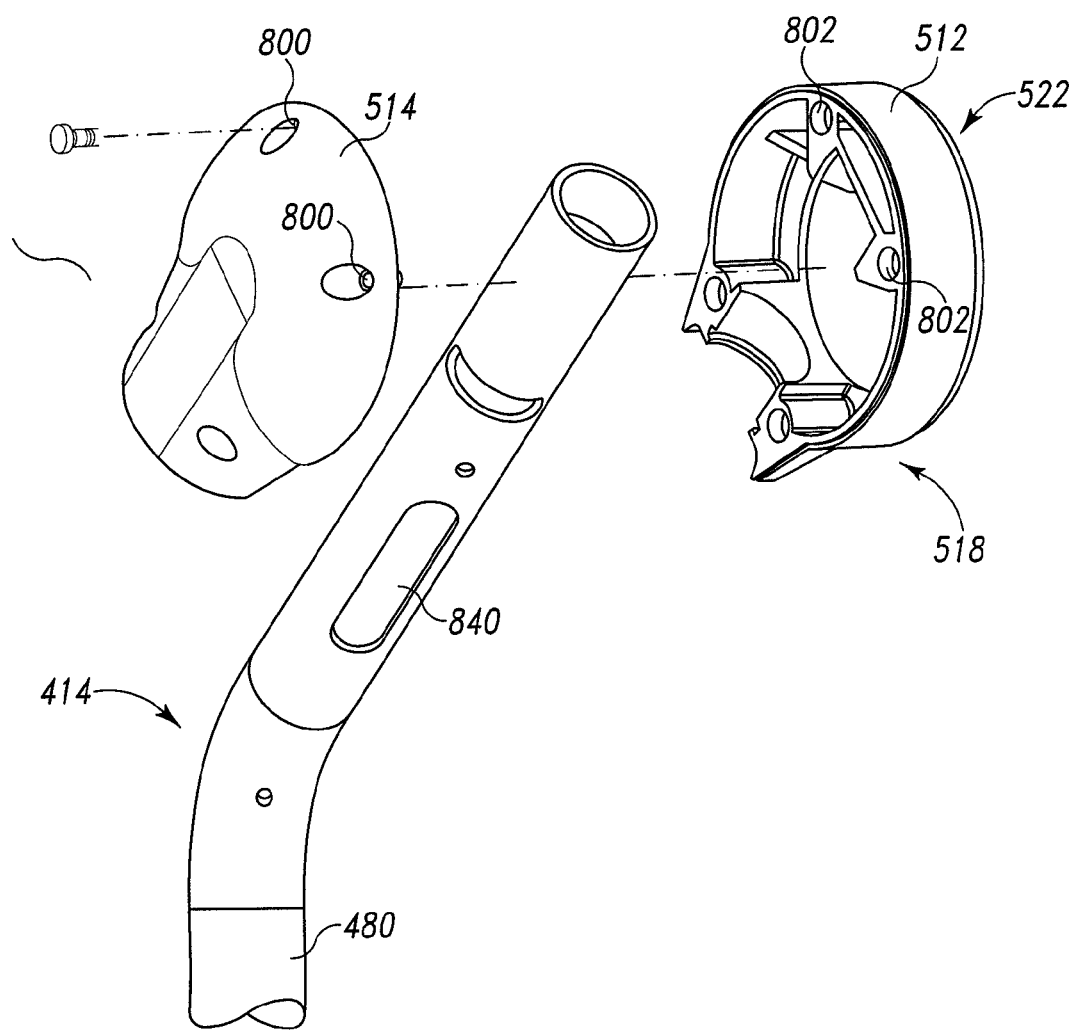

FIGS. 34-35 are exploded perspective views showing the top and bottom halves 512, 514 of the user interface housing 518 arranged on opposite sides of the handle post 478 to which they are secured by suitable fasteners, such as screws 515. The handgrip 510 (FIGS. 13-15) is omitted in FIGS. 34-35 to promote clarity. The screws 515 extend through slightly-oversized openings 800 (FIG. 34) in the bottom housing 514 and then screwed into respective threaded openings 802 (FIG. 35) in the top housing 512. The bottom housing 514 has an upwardly-extending post or lug 519 (FIG. 34) that is received in a radial slot 479 (FIG. 35) formed on the back side of the handle post 478. The reception of the post 519 in the radial slot 479 in the handle post 478 limits the rotation of the user interface housing 518 relative to the handle post 478 and, in addition, prevents the user interface housing 518 from sliding off the end of the handle post 478.

The side edges 810, 812 (FIG. 35) of the radial slot 479 in the handle post 478 define the generally rearward and generally upward positions of the user interface housing 518 shown in FIGS. 30 and 31, respectively. In the illustrative embodiment, the user interface housings 518 rotate about 90° relative to the respective handle posts 478. In other embodiments, however, the user interface housings 518 may rotate less than or more than 90° relative to the respective handle posts 478. An O-Ring 526 (FIG. 15) is interposed between the top and bottom housings 512, 514 of the user interface 522 and the handle post 478 to provide resistance to the rotation of the user interface 522 relative to the handle post 478. The top and bottom housings 512, 514 cooperate to define an annular recess 820 in which the O-ring 526 is captured when the top and bottom housings 512, 514 are attached to the handle post 478.

In the illustrative embodiment, each push handle 414 comprises a hollow tube. As shown in FIG. 34, the wires 830 from the push handle user interface controls 552, which are membrane switches in the illustrative embodiment, are routed from the respective controls 552 through a window 832 in the handle post 478 into an interior region 834 of the handle post 814 and then routed downwardly through the hollow tube. The wires 830 are coupled to the controls 552 via a membrane switch connector 836 (FIG. 34). The wires 830 exit through an opening in the bottom portion of the push handle 414 and are then routed to the controller 30. As shown in FIG. 35, the handle post 478 has a slot 840 for receiving the enable switch actuation button 508 (FIG. 14).

Although certain illustrative embodiments have been described in detail above, variations and modifications exist within the scope and spirit of this disclosure as described and as defined in the following claims.

The invention claimed is:

1. A patient support apparatus comprising
a frame,
a push handle coupled to the frame and having a handle post,
a power transport system coupled to the frame and operable to propel the apparatus along a floor, and
a user interface coupled to the handle post, the user interface having at least one user input that is engageable to provide a signal to the power transport system, the user interface being rotatable relative to the handle post about an axis between a first position presenting the at least one user input to a caregiver standing at an end of the frame and a second position presenting the at least one user input to a caregiver standing alongside the frame,
wherein the power transport system has a wheel that is movable between a first orientation in which the power transport system is operable to propel the apparatus substantially parallel to a longitudinal dimension of the frame and a second orientation in which the power transport system is operable to propel the apparatus substantially parallel to a lateral dimension of the frame, and wherein the push handle is pushed forwardly and pulled rearwardly to signal the power transport system to propel the apparatus forwardly and rearwardly, respectively, and wherein the at least one user input is engageable to selectively toggle among a plurality of discrete speed settings at which the power transport system is operable.

2. The apparatus of claim 1, wherein the handle post defines an axis about which the user interface rotates.

3. The apparatus of claim 1, wherein the user interface faces generally rearwardly when the user interface is in the first position and faces generally upwardly when the user interface is in the second position.

4. The apparatus of claim 1, further comprising an enable switch coupled to the handle post, wherein the at least one user input and the enable switch are engageable simultaneously to signal the power transport system to propel the apparatus along the floor.

5. The apparatus of claim 1, wherein the at least one user input comprises a membrane switch.

6. The apparatus of claim 1, wherein the push handle comprises a hollow tube and the user interface includes at least one wire routed from the at least one user input through the hollow tube.

7. The apparatus of claim 6, wherein the handle post includes an upper portion, and the at least one wire from the at least one user input is routed through an opening in the upper portion into an interior region of the handle post.

8. The apparatus of claim 6, wherein the push handle includes a bottom portion, and the at least one wire exits the push handle through an opening in the bottom portion of the push handle.

9. The apparatus of claim 1, wherein the at least one user input includes left and right switches that are engageable to signal the power transport system to propel the apparatus leftwardly and rightwardly, respectively.

10. The apparatus of claim 1, wherein the user interface includes a housing that is coupled to the handle post for rotation about the axis and the at least one user input is coupled to the user interface housing for rotation therewith.

11. The apparatus of claim 10, wherein the housing has a protrusion that is received in a radial slot formed in the handle post to limit the rotation of user interface.

12. The apparatus of claim 10, further comprising an O-Ring interposed between the user interface housing and an upper portion of the handle post to provide resistance to the rotation of the user interface housing relative to the upper portion of the handle post.

13. The apparatus of claim 1, wherein the axis extends generally perpendicularly to a longitudinal axis of the frame.

14. The apparatus of claim 1, wherein the push handle has a portion that extends upwardly from the frame and the handle post is coupled to an upper end of the upwardly-extending portion.

15. The apparatus of claim 14, wherein the handle post is integrally formed with the upwardly-extending portion of the push handle.

16. A patient support apparatus comprising
a frame,
a push handle coupled to the frame and having a handle post,
a power transport system coupled to the frame and operable to propel the apparatus along a floor, and
a user interface coupled to the handle post, the user interface having at least one user input that is engageable to provide a signal to the power transport system, the user interface being rotatable about an axis between a first position presenting the at least one user input to a caregiver standing at an end of the frame and a second position presenting the at least one user input to a caregiver standing alongside the frame, wherein the push handle comprises a hollow tube and the user interface includes at least one wire routed from the at least one user input through the hollow tube.

17. The apparatus of claim 16, wherein the handle post defines an axis about which the user interface rotates.

18. The apparatus of claim 16, wherein the user interface faces generally rearwardly when the user interface is in the first position and faces generally upwardly when the user interface is in the second position.

19. The apparatus of claim 16, further comprising an enable switch coupled to the handle post, wherein the at least one user input and the enable switch are engageable simultaneously to signal the power transport system to propel the apparatus along the floor.

20. The apparatus of claim 16, wherein the at least one user input comprises a membrane switch.

21. The apparatus of claim 16, wherein the user interface includes a housing that is coupled to the handle post for rotation about the axis and the at least one user input is coupled to the user interface housing for rotation therewith.

22. The apparatus of claim 16, wherein the axis extends generally perpendicularly to a longitudinal axis of the frame.

23. The apparatus of claim 16, wherein the push handle has a portion that extends upwardly from the frame and the handle post is coupled to an upper end of the upwardly-extending portion.

24. A patient support apparatus comprising
a frame,
a push handle coupled to the frame and having a handle post,
a power transport system coupled to the frame and operable to propel the apparatus along a floor, and
a user interface coupled to the handle post, the user interface having at least one user input that is engageable to provide a signal to the power transport system, the user interface being rotatable about an axis between a first position presenting the at least one user input to a caregiver standing at an end of the frame and a second position presenting the at least one user input to a caregiver standing alongside the frame, wherein the power transport system has a wheel that is movable between a first orientation in which the power transport system is operable to propel the apparatus substantially parallel to a longitudinal dimension of the frame and a second orientation in which the power transport system is operable to propel the apparatus substantially parallel to a lateral dimension of the frame, wherein the push handle is pushed forwardly and pulled rearwardly to signal the power transport system to propel the apparatus forwardly and rearwardly, respectively, and wherein the at least one user input is engageable to selectively toggle among a plurality of discrete speed settings at which the power transport system is operable.

25. A patient support apparatus comprising
a frame,
a push handle coupled to the frame and having a handle post,
a power transport system coupled to the frame and operable to propel the apparatus along a floor, and
a user interface coupled to the handle post, the user interface having at least one user input that is engageable to provide a signal to the power transport system, the user interface being rotatable about an axis between a first position presenting the at least one user input to a caregiver standing at an end of the frame and a second position presenting the at least one user input to a caregiver standing alongside the frame, wherein the user interface includes a housing that is coupled to the handle post for rotation about the axis and the at least one user input is coupled to the user interface housing for rotation therewith, and wherein the housing has a protrusion that is received in a radial slot formed in the handle post to limit the rotation of user interface.

26. A patient support apparatus comprising a frame, a push handle coupled to the frame and having a handle post, a power transport system coupled to the frame and operable to propel the apparatus along a floor, a user interface coupled to the handle post, the user interface having at least one user input that is engageable to provide a signal to the power transport system, the user interface being rotatable about an axis between a first position presenting the at least one user input to a caregiver standing at an end of the frame and a second position presenting the at least one user input to a caregiver standing alongside the frame, and an O-Ring interposed between the user interface housing and an upper portion of the handle post to provide resistance to the rotation of the user interface housing relative to the upper portion of the handle post, wherein the user interface includes a housing that is coupled to the handle post for rotation about the axis and the at least one user input is coupled to the user interface housing for rotation therewith.

* * * * *